United States Patent
Kanai et al.

(10) Patent No.: US 7,464,379 B2
(45) Date of Patent: Dec. 9, 2008

(54) METHOD AND SYSTEM FOR PERFORMING REAL-TIME OPERATION

(75) Inventors: Tatsunori Kanai, Yokohama (JP); Seiji Maeda, Kawasaki (JP); Hirokuni Yano, Tokyo (JP); Kenichiro Yoshii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 828 days.

(21) Appl. No.: 10/902,938

(22) Filed: Aug. 2, 2004

(65) Prior Publication Data

US 2005/0066330 A1 Mar. 24, 2005

(30) Foreign Application Priority Data

Aug. 14, 2003 (JP) ............................. 2003-207572

(51) Int. Cl.
- G06F 9/46 (2006.01)
- G06F 1/04 (2006.01)
- G06F 1/12 (2006.01)
- G06F 15/16 (2006.01)

(52) U.S. Cl. ...................................... 718/100; 713/375

(58) Field of Classification Search ................. 718/100, 718/106; 713/375
See application file for complete search history.

(56) References Cited

U.S. PATENT DOCUMENTS

| | | | |
|---|---|---|---|
| 6,430,694 B1 | 8/2002 | Hosein et al. | |
| 6,513,124 B1 * | 1/2003 | Furuichi et al. | ............. 713/322 |
| 2002/0029353 A1 | 3/2002 | Hwang | |
| 2003/0028816 A1 | 2/2003 | Bacon | |
| 2003/0115239 A1 * | 6/2003 | Togawa | ...................... 709/102 |
| 2005/0066330 A1 | 3/2005 | Kanai et al. | |

FOREIGN PATENT DOCUMENTS

| | | |
|---|---|---|
| EP | 1 115 051 A1 | 7/2001 |
| JP | 8-180025 | 7/1996 |
| JP | 10-143380 | 5/1998 |
| JP | 2000-122747 | 4/2000 |
| JP | 2002-215599 | 8/2002 |

(Continued)

OTHER PUBLICATIONS

U.S. Appl. No. 10/902,938, filed Aug. 2, 2004, Kanai et al.

(Continued)

*Primary Examiner*—Meng-Ai An
*Assistant Examiner*—Eric C Wai
(74) *Attorney, Agent, or Firm*—Oblon, Spivak, McClelland, Maier & Neustadt, P.C.

(57) ABSTRACT

An information processing system performs a real-time operation periodically at specific time intervals. The system includes a unit for performing a scheduling operation of assigning the real-time operation to a processor to perform the real-time operation periodically at the specific time intervals by the processor, a unit for computing a ratio of an execution time of the real-time operation to be performed by the processor at a first operating speed, based on the specific time intervals and cost information concerning a time required to perform the real-time operation by the processor at the first operating speed, and a unit for performing an operating speed control operation to operate the processor at a second operating speed that is lower than the first operating speed, the second operating speed being determined based on the computed ratio.

10 Claims, 35 Drawing Sheets

FOREIGN PATENT DOCUMENTS

| | | |
|---|---|---|
| JP | 2003-99148 | 4/2003 |
| KR | 2002-0018309 | 3/2002 |

OTHER PUBLICATIONS

U.S. Appl. No. 10/935,188, filed Sep. 8, 2004, Kanai et al.
U.S. Appl. No. 10/808,320, filed Mar. 25, 2004, Kanai et al.
U.S. Appl. No. 10/808,470, filed Mar. 25, 2004, Kanai et al.
U.S. Appl. No. 10/808,280, filed Mar. 25, 2004, Kanai et al.
U.S. Appl. No. 10/895,040, filed Jul. 21, 2004, Kanai et al.
U.S. Appl. No. 10/902,938, filed Aug. 2, 2004, Kanai et al.
U.S. Appl. No. 10/935,188, filed Sep. 8, 2004, Kanai et al.
Jiong Luo, et al "Static and Dynamic Variable Voltage Scheduling Algorithms For Real-Time Heterogeneous Distributed Embedded Systems", Proceedings of the 15$^{th}$ International Conference on VLSI Design (VLSID'02) 2002 XP-002447056 pp. 719-726.
Dakai Zhu, et al. "Scheduling with Dynamic Voltage/Speed Adjustment Using Slack Reclamation in Multi-Processor Real-Time Systems" 22$^{nd}$ IEEE Real-Time Systems Symposium, Dec. 2001, XP002447057 pp. 84-94.

Ali Manzak, et al. "Variable Voltage Task Scheduling Algorithms for Minimizing Energy/Power" IEEE transactions on Very Large Scale Intergration (VLSI) Systems. vol. 11 No. 2, Apr. 2003 XP-002447059, pp. 270-276.
Inki Hong, et al. "On-Line Scheduling of Hard Real-Time Tasks on variable Voltage Processor" IEEE/ACM International Conference on Computer-Aided Design, 1998. ICCAD 98. Digest of Technical Papers, Nov. 1998, XP-002447058, pp. 653-656.
Jia Xu, et al. "On Satisfying Timing Constraints in Hard-Real-Time Systems" 8198 IEEE Transactions on Software engineering Jan. 19, 1993, New York, US, vol. 19, No. 1, XP-000359099, pp. 70-84.
Gregory F. Welch "A Survey of Power Management Techniques in Mobile Computing Operating Systems" 8283 Operation Systems Review (SIGOPS) Oct. 1995, vol. 29, No. 4, New York, US, XP 000555162, pp. 47-56.
U.S. Appl. No. 11/232,984, filed Sep. 23, 2005, Maeda et al.
U.S. Appl. No. 11/233,026, filed Sep. 23, 2005, Maeda et al.

* cited by examiner

Structural description 117

| Number | Program | Input | Output | Cost | Buffer |
|---|---|---|---|---|---|
| (1) | DEMUX | Received signal | (2) (3) (4) | 5 | 100KB 1MB 10KB |
| (2) | A-DEC | (1) | Audio output | 10 | — |
| (3) | V-DEC | (1) | (5) | 50 | 1MB |
| (4) | TEXT | (1) | (6) | 5 | 10KB |
| (5) | PROG | (3) | (6) | 20 | 1MB |
| (6) | BLEND | (4) (5) | Video output | 10 | — |

Thread parameters
( · Tightly coupled thread group :
 · Loosely coupled thread group : )

Others

FIG. 8

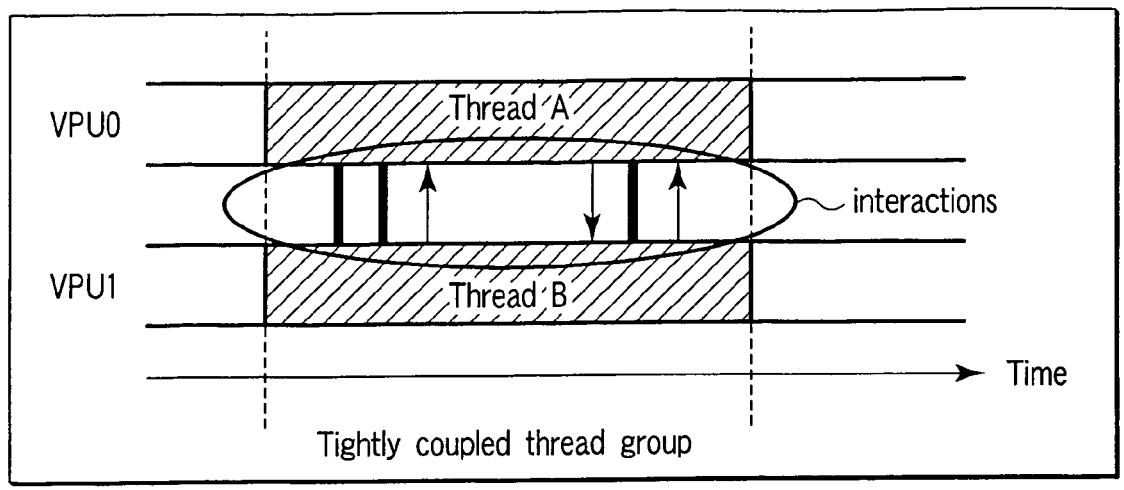
F I G. 31
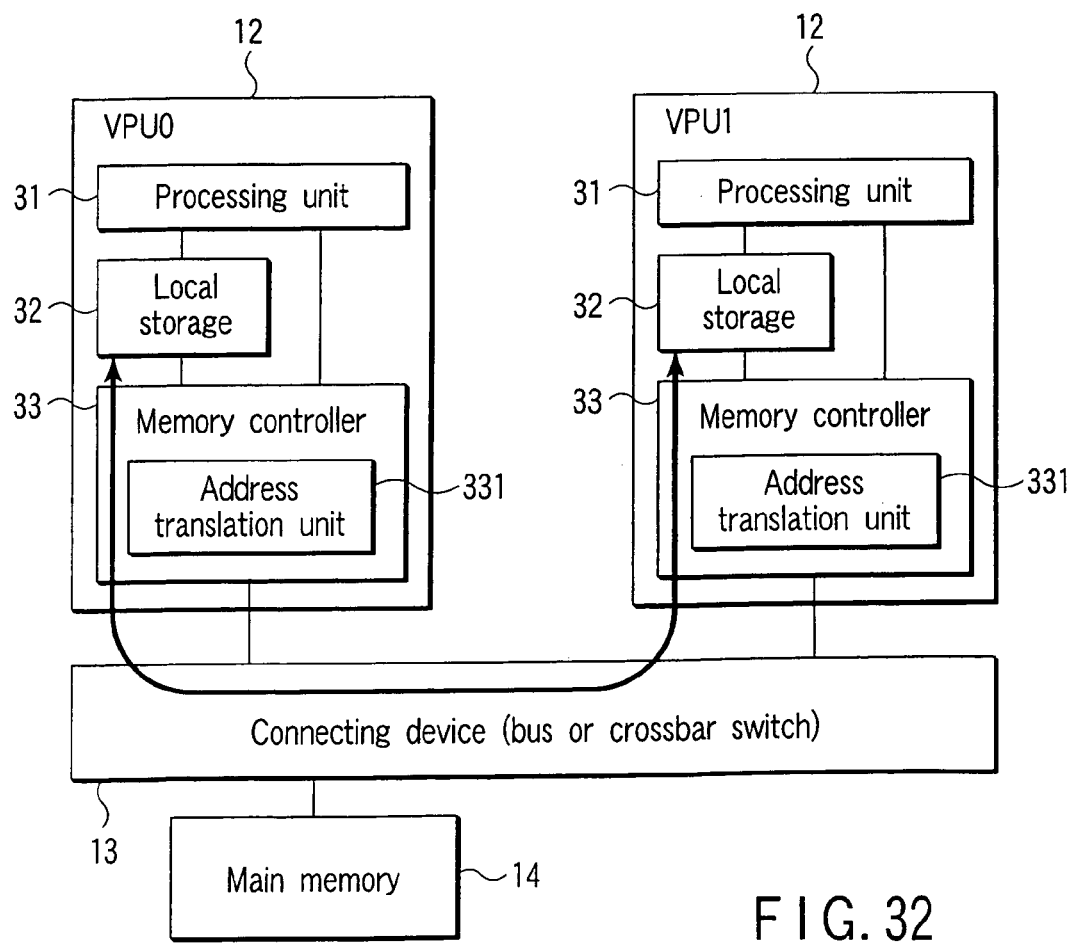
F I G. 32

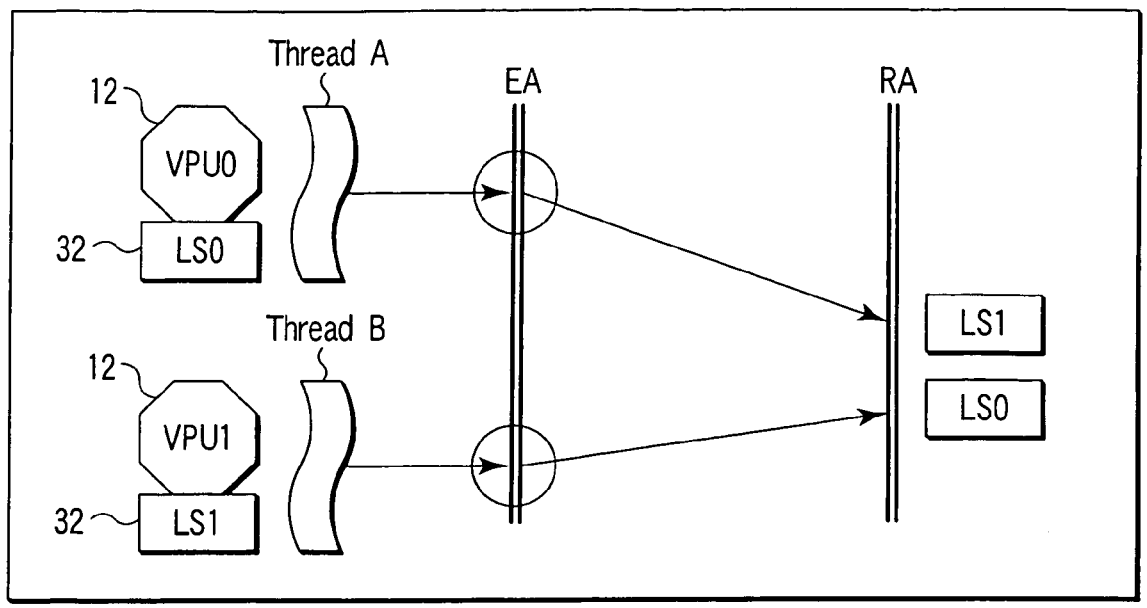
F I G. 33
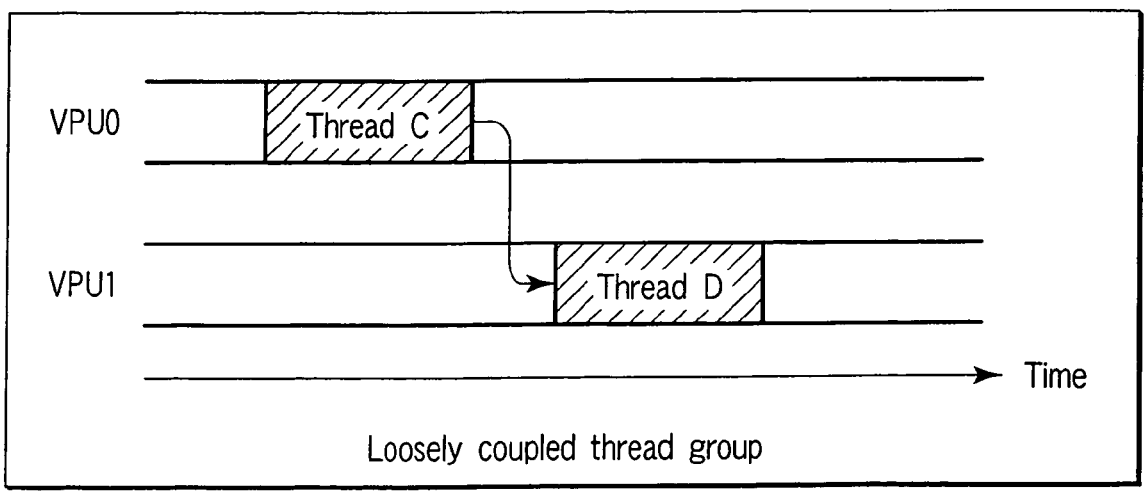
F I G. 34

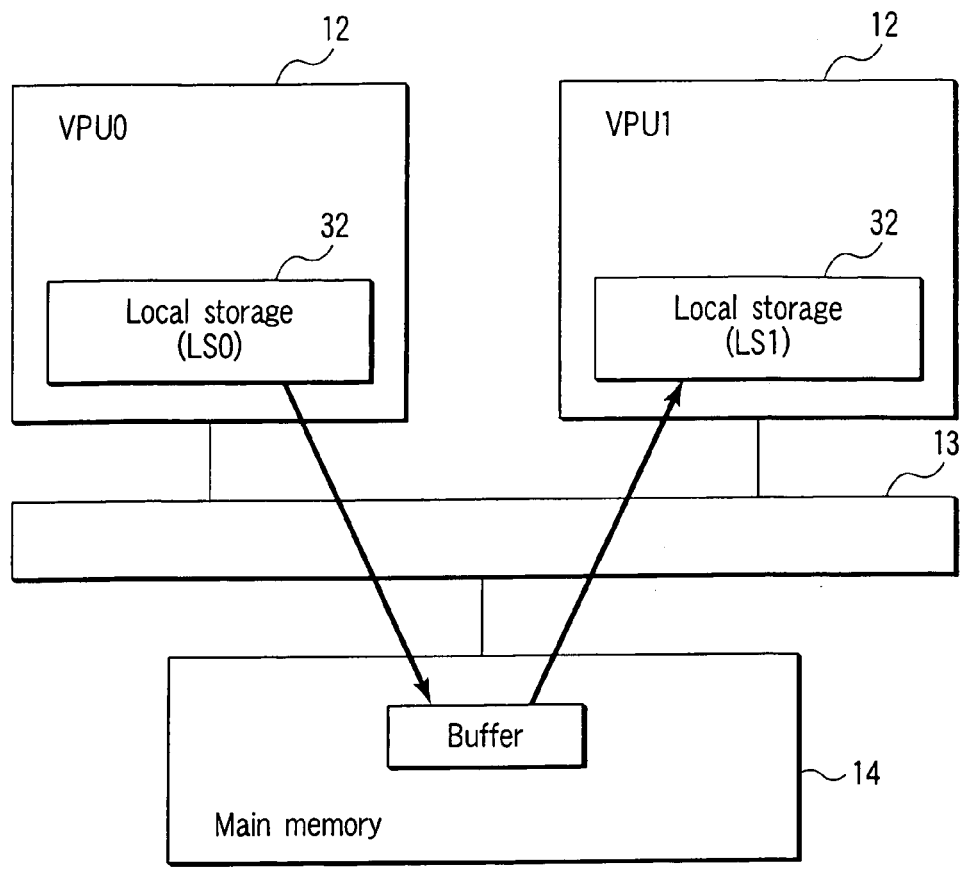
F I G. 35
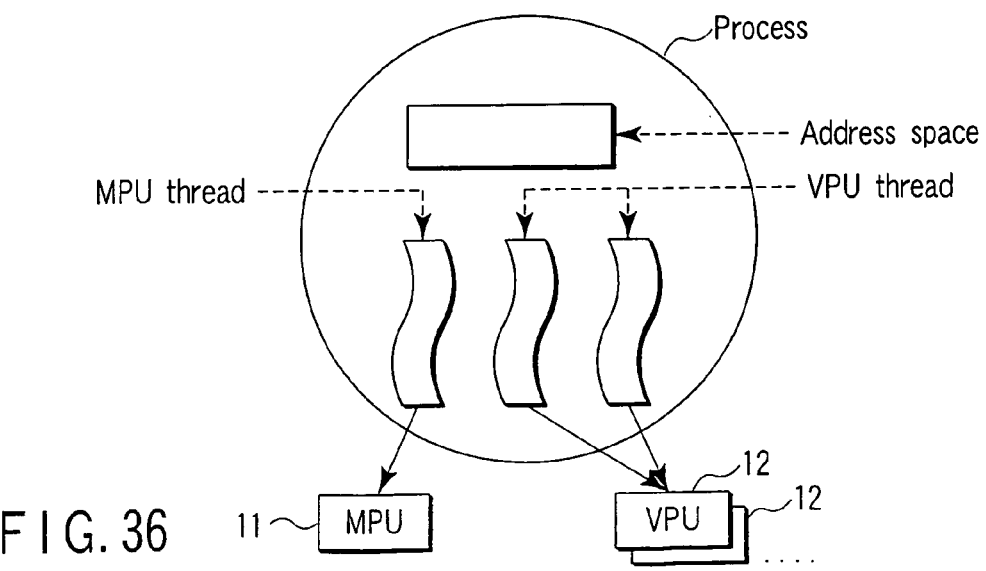
F I G. 36

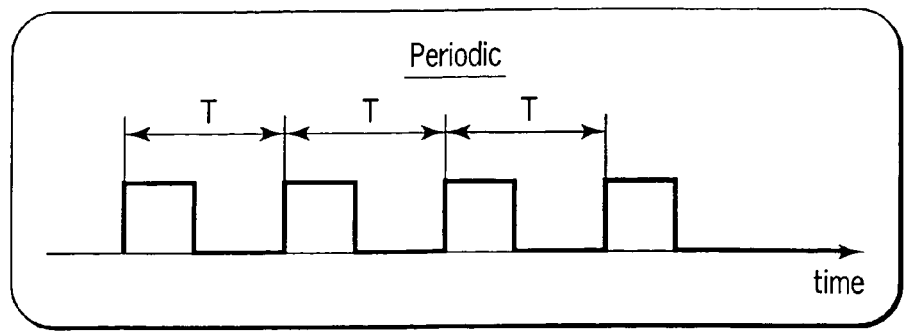
F I G. 41
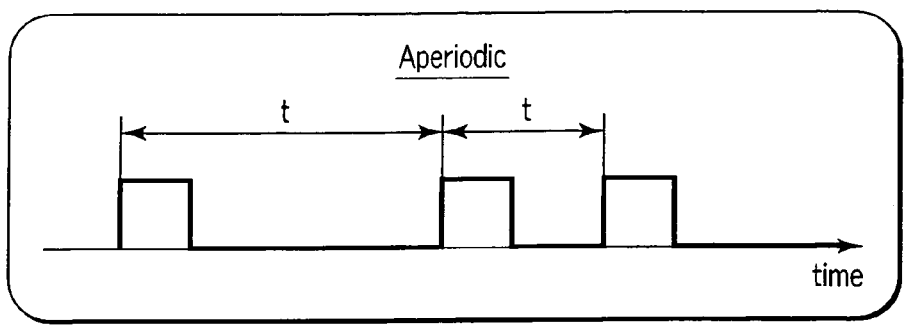
F I G. 42
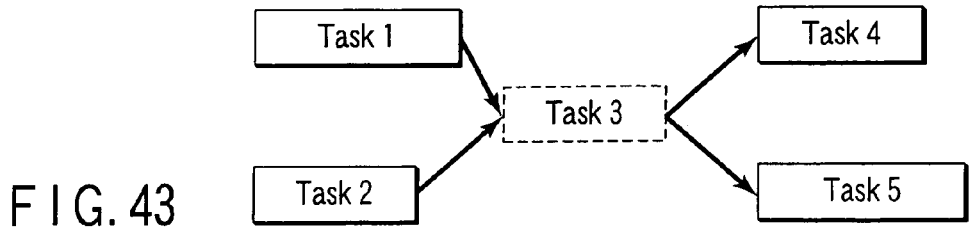
F I G. 43
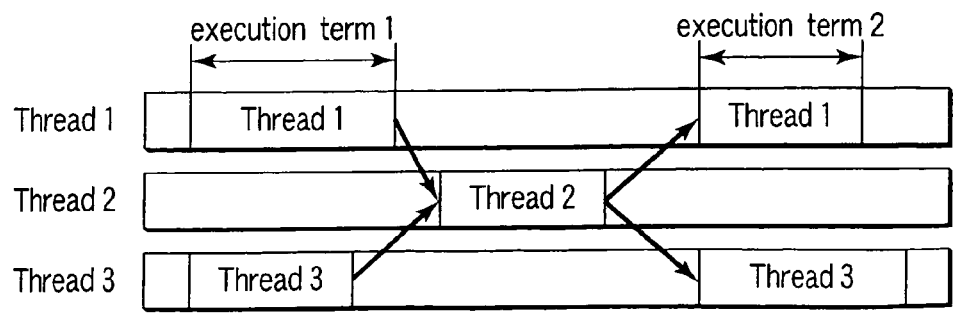
F I G. 44

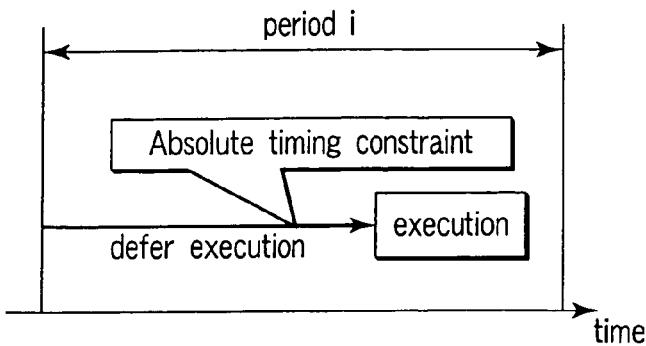
FIG. 48
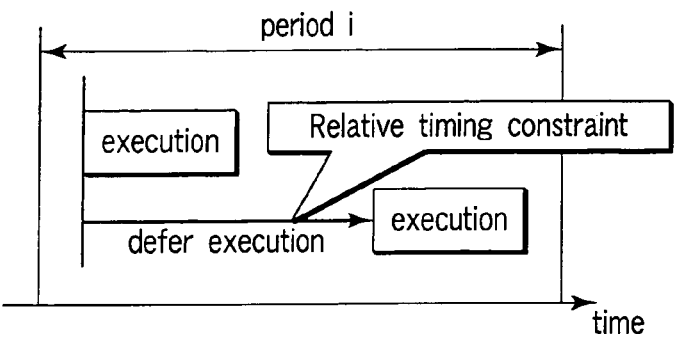
FIG. 49
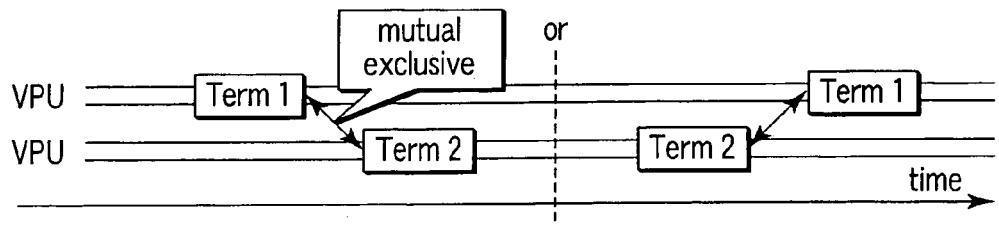
FIG. 50
|  |  | Tightly coupled thread group | Loosely coupled thread group |
|---|---|---|---|
| On memory | LS | Can use | Cannot use |
|  | MS | Can use | |
| Other | | Should use hardware primitives | Should use mechanisms provided by VPU Runtime Environment |
FIG. 51

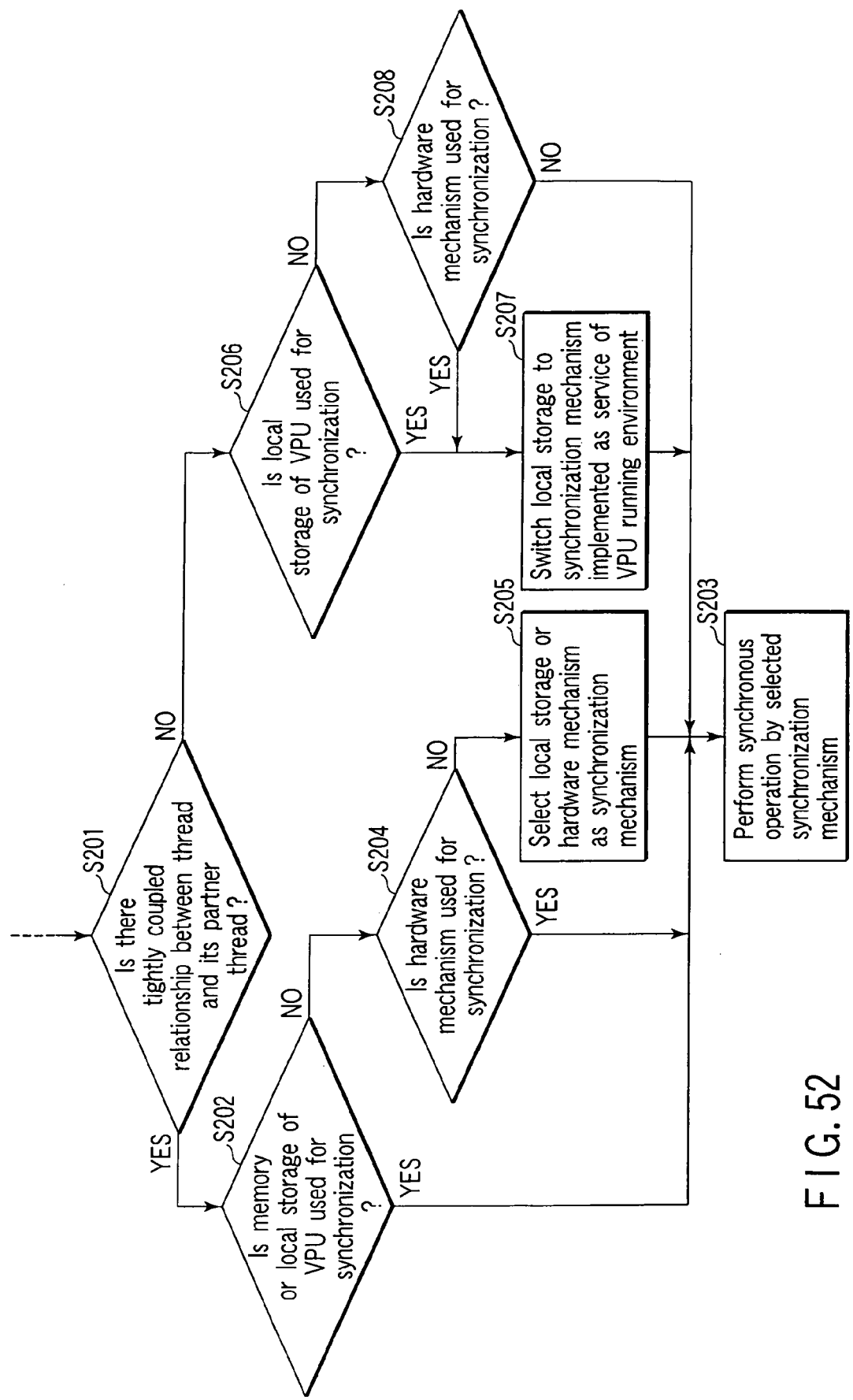
F I G. 52

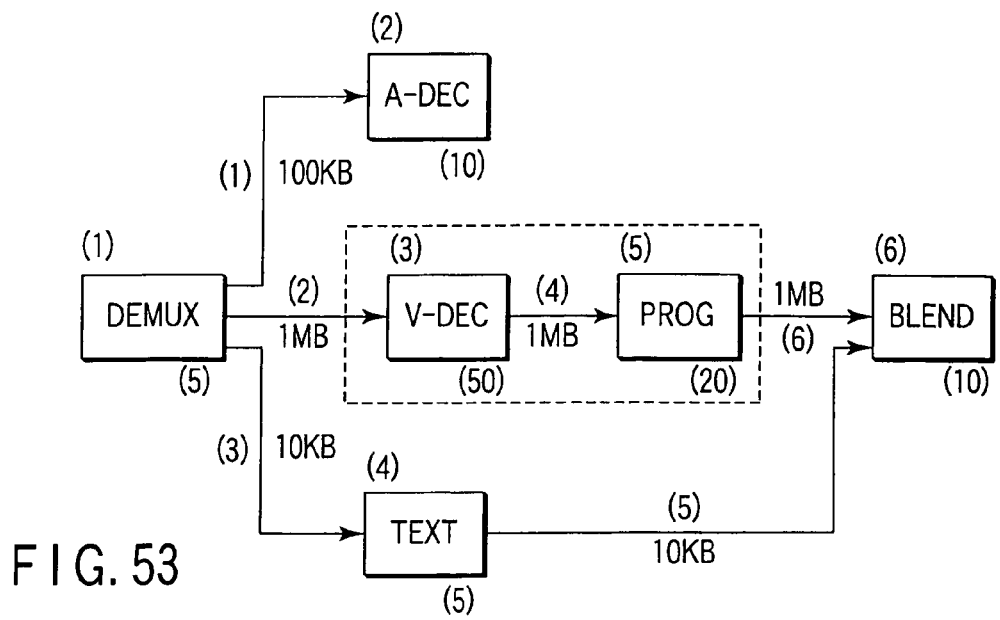
F I G. 53
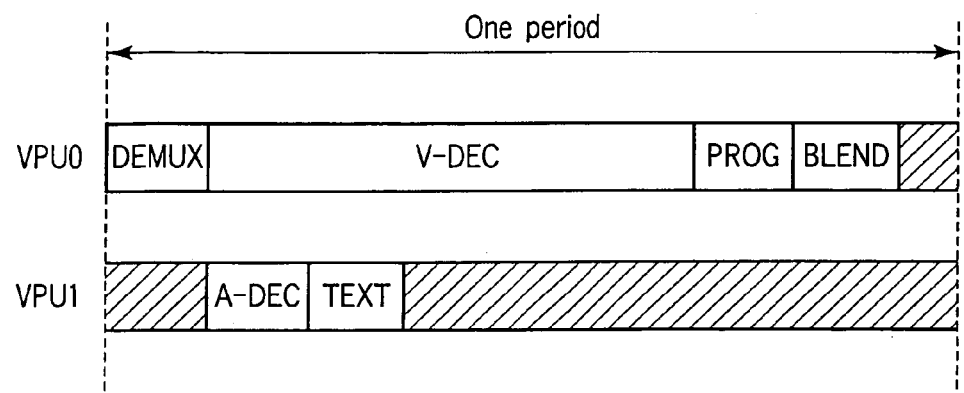
F I G. 55
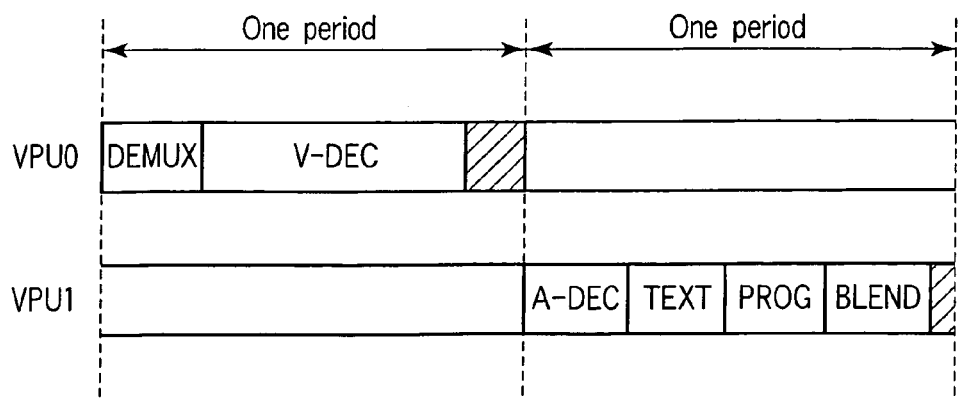
F I G. 56

| BUFFER | Id : 1 | |
|---|---|---|
| Size : 100KB | SrcTask : 1 | DstTask : 2 |
| BUFFER | Id : 2 | |
| Size : 1MB | SrcTask : 1 | DstTask : 3 |
| BUFFER | Id : 3 | |
| Size : 10KB | SrcTask : 1 | DstTask : 4 |
| BUFFER | Id : 4 | |
| Size : 1MB | SrcTask : 3 | DstTask : 5 |
| BUFFER | Id : 5 | |
| Size : 10KB | SrcTask : 4 | DstTask : 6 |
| BUFFER | Id : 6 | |
| Size : 1MB | SrcTask : 5 | DstTask : 6 |

TASK    Id : 1    Class : VPU,HRT
ThreadContext : DEMUX    Cost : 5
Constraint : Precede : 2,3,4
InputBuffer :    OutputBuffer : 1,2,3

TASK    Id : 2    Class : VPU,HRT
ThreadContext : A-DEC    Cost : 10
Constraint : Precede :
InputBuffer : 1    OutputBuffer :

TASK    Id : 3    Class : VPU,HRT
ThreadContext : V-DEC    Cost : 50
Constraint : Precede : 5
InputBuffer : 2    OutputBuffer : 4

TASK    Id : 4    Class : VPU,HRT
ThreadContext : TEXT    Cost : 5
Constraint : Precede : 6
InputBuffer : 3    OutputBuffer : 5

TASK    Id : 5    Class : VPU,HRT
ThreadContext : PROG    Cost : 20
Constraint : Precede : 6
InputBuffer : 4    OutputBuffer : 6

TASK    Id : 6    Class : VPU,HRT
ThreadContext : BLEND    Cost : 10
Constraint : Precede : 5
InputBuffer : 5,6    OutputBuffer :

F I G. 54

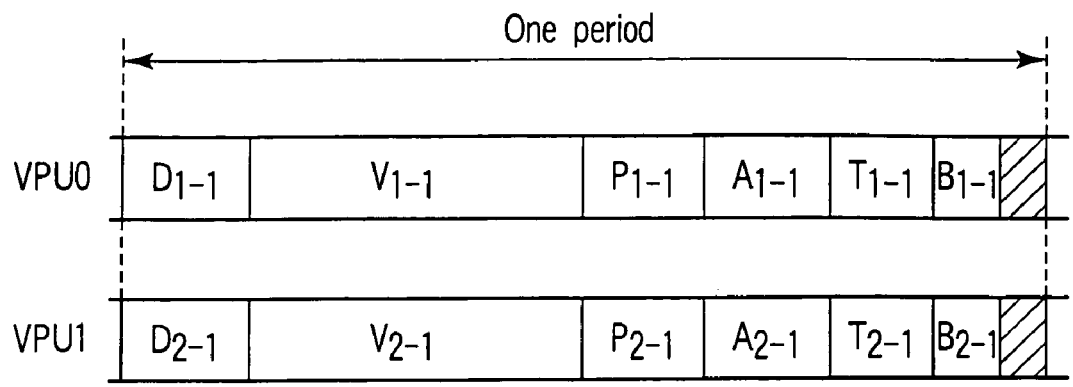
F I G. 60
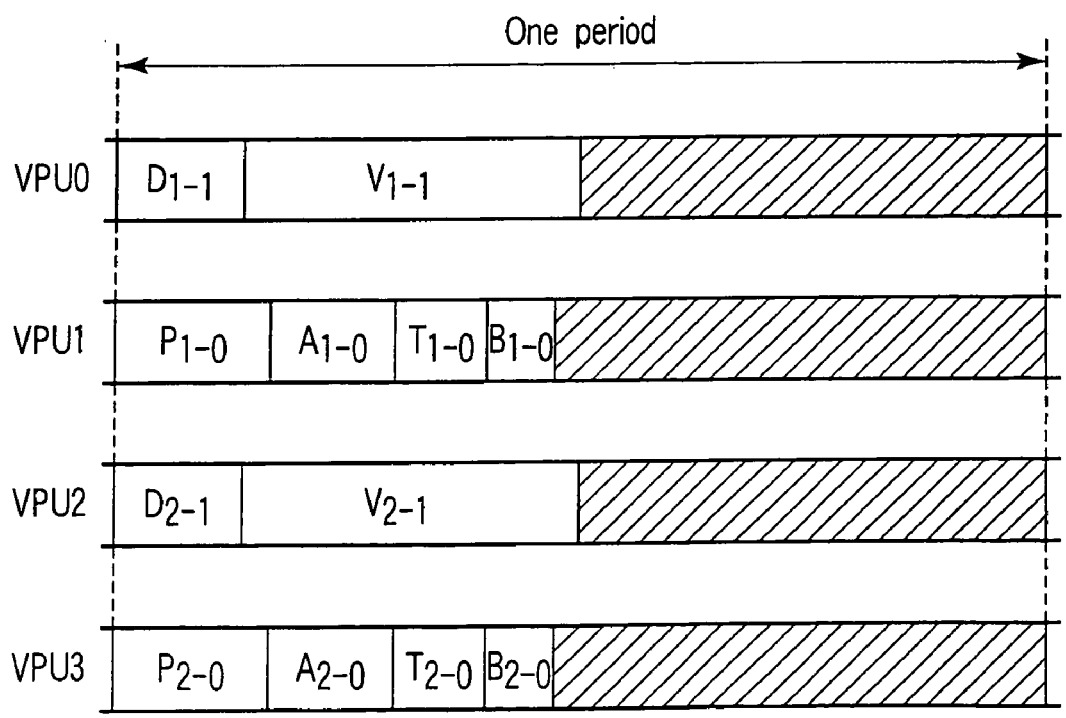
F I G. 61

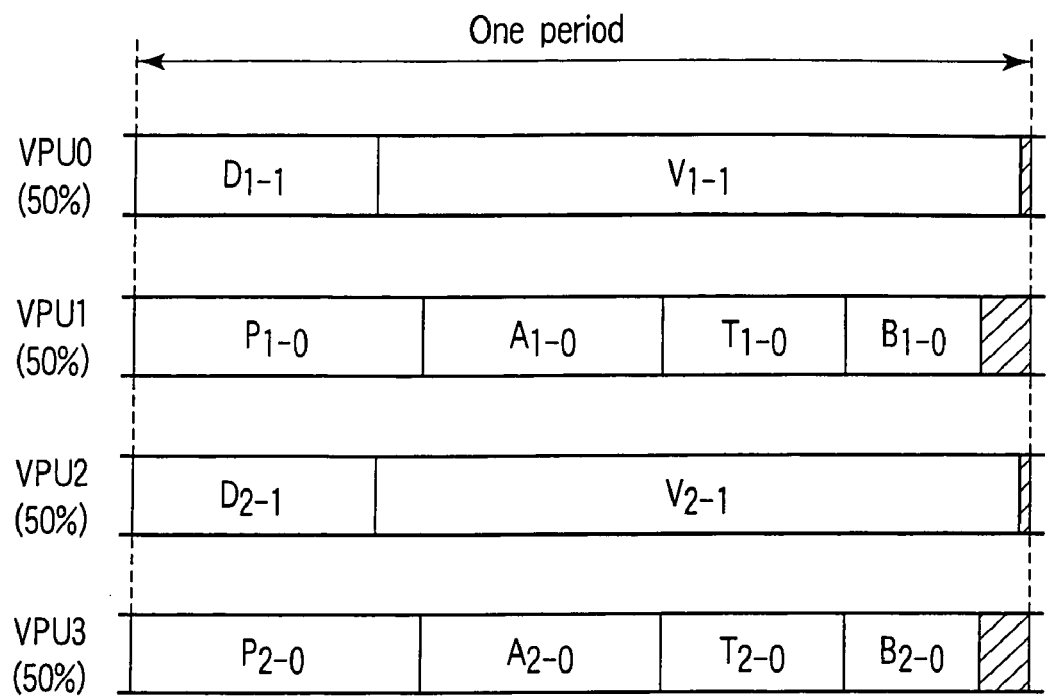
F I G. 62
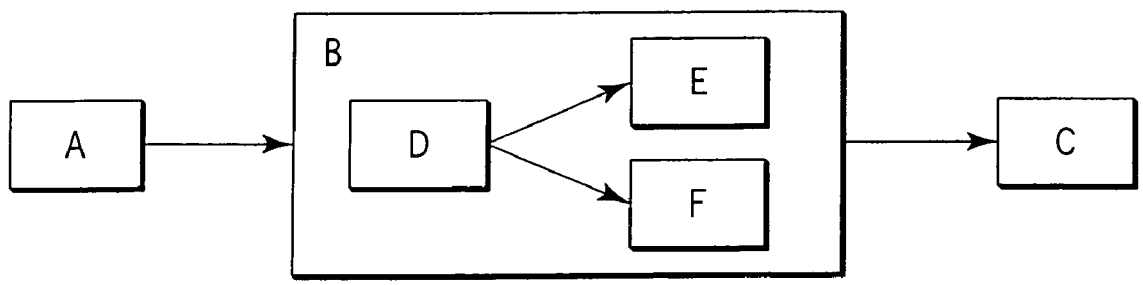
F I G. 63

| BUFFER | Id : 1 | |
|---|---|---|
| Size : 100KB | SrcTask : 1 | DstTask : 2 |

| BUFFER | Id : 2 | |
|---|---|---|
| Size : 1MB | SrcTask : 1 | DstTask : 3 |

| BUFFER | Id : 3 | |
|---|---|---|
| Size : 10KB | SrcTask : 1 | DstTask : 4 |

| BUFFER | Id : 4 | |
|---|---|---|
| Size : 10KB | SrcTask : 4 | DstTask : 6 |

| BUFFER | Id : 5 | |
|---|---|---|
| Size : 1MB | SrcTask : 5 | DstTask : 6 |

TASK     Id : 1     Class : VPU,HRT
ThreadContext : DEMUX     Cost : 5
Constraint : Precede : 2,3,4
InputBuffer :     OutputBuffer : 1,2,3

TASK     Id : 2     Class : VPU,HRT
ThreadContext : A-DEC     Cost : 10
Constraint : Precede :
InputBuffer : 1     OutputBuffer :

TASK     Id : 3     Class : VPU,HRT
ThreadContext : V-DEC     Cost : 50
Constraint : Precede : 5     TightlyCoupled : 5
InputBuffer : 2     OutputBuffer :

TASK     Id : 4     Class : VPU,HRT
ThreadContext : TEXT     Cost : 5
Constraint : Precede : 6
InputBuffer : 3     OutputBuffer : 4

TASK     Id : 5     Class : VPU,HRT
ThreadContext : PROG     Cost : 50
Constraint : Precede : 6     TightlyCoupled : 3
InputBuffer :     OutputBuffer : 5

TASK     Id : 6     Class : VPU,HRT
ThreadContext : BLEND     Cost : 10
Constraint : Precede : 5
InputBuffer : 4,5     OutputBuffer :

F I G. 64

METHOD AND SYSTEM FOR PERFORMING REAL-TIME OPERATION

CROSS-REFERENCE TO RELATED APPLICATIONS

This application is based upon and claims the benefit of priority from prior Japanese Patent Application No. 2003-207572, filed Aug. 14, 2003, the entire contents of which are incorporated herein by reference.

BACKGROUND OF THE INVENTION

1. Field of the Invention

The present invention relates to a scheduling method and an information processing system for performing a real-time operation periodically at specific time intervals.

2. Description of the Related Art

Conventionally, computer systems such as server computers have utilized system architecture such as a multiprocessor and a parallel processor in order to improve in throughput. Both of the processors achieve a parallel computing operation using a plurality of processing units.

Jpn. Pat. Appln. KOKAI Publication No. 10-143380 discloses a system having a plurality of processing units. This system includes a single high-speed CPU, a plurality of low-speed CPUs and a shared memory. Processes are assigned to the high-speed and low-speed CPUs in consideration of parallelism and execution time of each process.

Jpn. Pat. Appln. KOKAI Publication No. 8-180025 discloses a scheduling technique of scheduling threads such that the same processor executes threads belonging to the same process.

Not only the computer system but also an embedded device that needs to process a large amount of data such as AV (audio video) data in real time has recently required that system architecture such as a multiprocessor and a parallel processor be introduced to improve in throughput.

Under the present circumstances, however, a real-time processing system that is predicated on the above system architecture is hardly reported.

In the real-time processing system, each operation needs completing within the limit of allowed time. In order to perform a real-time operation including a combination of a plurality of chained tasks periodically at specific time intervals, all the chained tasks need completing within the time interval of each period.

Since the real-time processing system is often used as an embedded system, its serious problem is to reduce power consumption. The larger the number of processing units included in the system, the higher the power consumption. When system architecture such as a multiprocessor and a parallel processor is applied to the real-time processing system, a new mechanism is required to save power of the processors while completing a real-time operation within a given period of time.

In a non-real-time processing system, usually, power of a computer system is saved by decreasing the operating frequency of processors. In the real-time processing system, however, an operation that needs to be performed in real time cannot be done within a given timing constraint if the operating frequency decreases, thereby causing a problem of impairing a real-time operation.

BRIEF SUMMARY OF THE INVENTION

An object of the present invention is to provide a method and an information processing system capable of saving power of processors without impairing any real-time operation.

According to an embodiment of the present invention, there is provided a method of performing a real-time operation periodically at specific time intervals, the method comprising: performing a scheduling operation of assigning the real-time operation to a processor to perform the real-time operation periodically at the specific time intervals by the processor; computing a ratio of an execution time of the real-time operation to be performed by the processor at a first operating speed to each of the specific time intervals, based on the specific time intervals and cost information concerning a time required to perform the real-time operation by the processor at the first operating speed; and performing an operating speed control operation to operate the processor at a second operating speed that is lower than the first operating speed, the second operating speed being determined based on the computed ratio.

According to an another embodiment of the present invention, there is provided a method of performing a real-time operation including a plurality of chained tasks periodically at specific time intervals using a plurality of processors, the method comprising: dividing the chained tasks into a plurality of task groups which are executable in parallel, based on a relationship among the tasks in order of task execution; performing a scheduling operation of determining execution start timing of each of the task groups in each time period of time periods corresponding to the specific time intervals and one of the processors which executes a corresponding one of the task groups in the each time period; selecting one of the task groups whose time interval from start of the each time period to completion of an execution time in the each time period is longest, based on the execution start timing of each of the task groups and cost information concerning a time required to execute each of the task groups by a corresponding one of the processors at a first operating speed; computing a ratio of the time interval corresponding to the selected one of the task groups to each of the specific time intervals; and performing an operating speed control operation to operate each of the processors at a second operating speed that is lower than the first operating speed, the second operating speed being determined based on the computed ratio.

BRIEF DESCRIPTION OF THE SEVERAL VIEWS OF THE DRAWING

FIG. 8 is a table showing an example of a structural description included in the program module shown in FIG. 7.

FIG. 31 is an illustration of threads belonging to a tightly coupled thread group and executed by different processors in the real-time processing system according to the embodiment of the present invention.

FIG. 32 is an illustration of interaction between tightly coupled threads in the real-time processing system according to the embodiment of the present invention.

FIG. 33 is an illustration of mapping of local storages of VPUs executing partner threads in effective address spaces of the tightly coupled threads in the real-time processing system according to the embodiment of the present invention.

FIG. 34 is an illustration of allocation of processors to threads belonging to a loosely coupled thread group in the real-time processing system according to the embodiment of the present invention.

FIG. 35 is an illustration of interaction between loosely coupled threads in the real-time processing system according to the embodiment of the present invention.

FIG. 36 is an illustration of a relationship between processes and threads in the real-time processing system according to the embodiment of the present invention.

FIG. 41 is a chart showing a periodic execution model in the real-time processing system according to the embodiment of the present invention.

FIG. 42 is a chart showing an aperiodic execution model in the real-time processing system according to the embodiment of the present invention.

FIG. 43 is an illustration of a task graph.

FIG. 44 is an illustration of the principle of a reservation graph used in the real-time processing system according to the embodiment of the present invention.

FIG. 48 is an illustration of absolute timing constraint used in the real-time processing system according to the embodiment of the present invention.

FIG. 49 is an illustration of relative timing constraint used in the real-time processing system according to the embodiment of the present invention.

FIG. 50 is an illustration of mutual exclusive constraint used in the real-time processing system according to the embodiment of the present invention.

FIG. 51 is a table illustrating synchronization mechanisms in the real-time processing system according to the embodiment of the present invention.

FIG. 52 is a flowchart showing a procedure for selectively using the synchronization mechanisms in the real-time processing system according to the embodiment of the present invention.

FIG. 53 is a diagram showing an example of a reservation graph used in the real-time processing system according to the embodiment of the present invention.

FIG. 54 is a diagram showing an example of a reservation request created in the real-time processing system according to the embodiment of the present invention.

FIG. 55 is a chart showing an example of scheduling performed by the real-time processing system according to the embodiment of the present invention on the basis of the reservation request shown in FIG. 54.

FIG. 56 is a chart illustrating a first example of scheduling of software pipeline type performed by the real-time processing system according to the embodiment of the present invention.

FIG. 60 is a chart of scheduling to execute two programs by two VPUs at once in the real-time processing system according to the embodiment of the present invention.

FIG. 61 is a chart of scheduling to execute two programs in pipeline mode by four VPUs in the real-time processing system according to the embodiment of the present invention.

FIG. 62 is a chart in which the four VPUs decrease in operating speed on the basis of scheduling results shown in FIG. 61.

FIG. 63 is a diagram showing an example of a reservation graph having a hierarchical structure used in the real-time processing system according to the embodiment of the present invention.

FIG. 64 is a diagram showing an example of a reservation request which is created by the real-time processing system according to the embodiment of the present invention and which takes into consideration of the tightly coupled thread group.

DETAILED DESCRIPTION OF THE INVENTION

An embodiment of the present invention will now be described with reference to the accompanying drawings.

Figure 1:
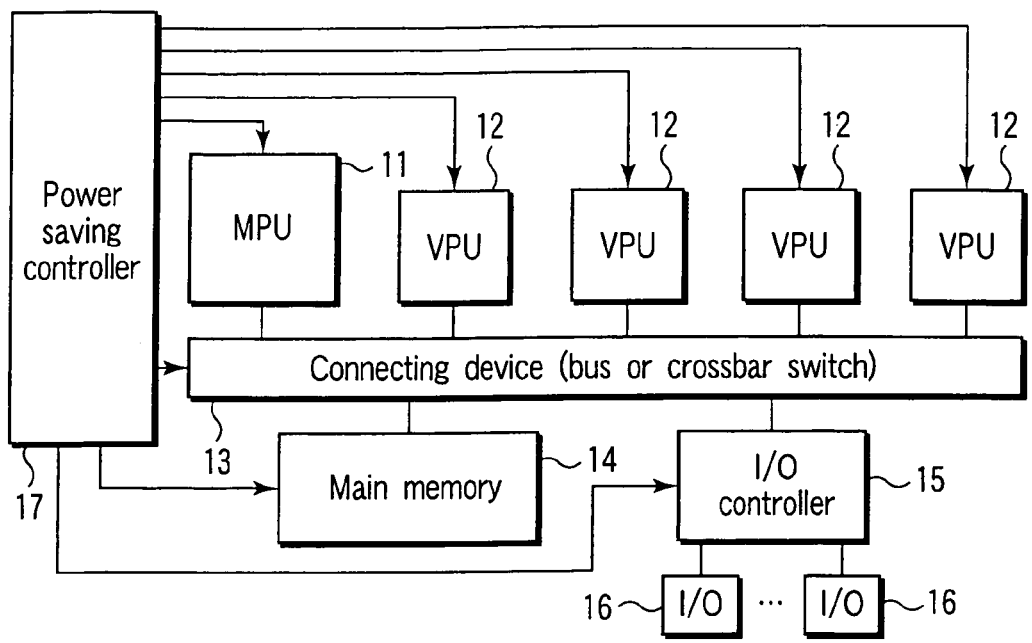
FIG. 1 is a block diagram showing an example of a computer system that configures a real-time processing system according to an embodiment of the present invention.

FIG. 1 shows an example of a configuration of a computer system for achieving a real-time processing system according to an embodiment of the present invention. The computer system is an information processing system that performs various operations, which need to be done in real time, under timing constraint. The computer system can be used as not only a general-purpose computer but also an embedded system for various electronic devices to perform operations that need to be done in real time. Referring to FIG. 1, the computer system comprises an MPU (master processing unit) 11, a plurality of VPUs (versatile processing units) 12, a connecting device 13, a main memory 14 and an I/O (input/output) controller 15. The MPU 11, VPUs 12, main memory 14 and IO controller 15 are connected to each other by the connecting device 13. The connecting device 13 is formed of a bus or an inter-connection network such as a crossbar switch. If a bus is used for the connecting device 13, it can be shaped like a ring. The MPU 11 is a main processor that controls an operation of the computer system. The MPU 11 mainly executes an OS (operating system). The VPUs 12 and IO controller 15 can execute some functions of the OS. Each of the VPUs 12 is a processor for performing various operations under the control of the MPU 11. The MPU 11 distributes the operations (tasks) to the VPUs 12 in order to perform these operations (tasks) in parallel. The operations can thus be performed at high speed and with high efficiency. The main memory 14 is a storage device (shared memory) that is shared by the MPU 11, VPUs 12 and I/O controller 15. The main memory 14 stores the OS and application programs. The I/O controller 15 is connected to one or more I/O devices 16. The controller 15 is also referred to as a bridge device.

The connecting device 13 has a QoS (quality of service) function that guarantees a data transfer rate. The QoS function is fulfilled by transferring data through the connecting device 13 at a reserved bandwidth (transfer rate). The QoS function is used when write data is transmitted to the memory 14 from one VPU 12 at 5 Mbps or when it is done between one VPU 12 and another VPU 12 at 100 Mbps. Each of the VPUs 12 designates (reserves) a bandwidth (transfer rate) for the connecting device 13. The connecting device 13 assigns the designated bandwidth to the VPU 12 by priority. If a bandwidth is reserved for data transfer of a VPU 12, it is secured even though another VPU 12, MPU 11 or IO controller 15 transfers a large amount of data during the data transfer of the former VPU 12. The QoS function is particularly important to computers that perform real-time operations.

The computer system shown in FIG. 1 comprises one MPU 11, four VPUs 12, one memory 14 and one IO controller 15. The number of VPUs 12 is not limited. The system need not comprise any MPU and, in this case, one VPU 12 performs the operation of the MPU 11. In other words, one VPU 12 serves as a virtual MPU 11.

The computer system also comprises a power saving controller 17. This controller 17 controls the computer system as follows in order to lower the power consumption of all or part of the system.

1. Decrease the clock frequency of the entire computer system.

2. Lower the power supply voltage of the entire computer system.

3. Turn off the power of the entire computer system.

4. Decrease the clock frequency of one or more modules (MPU, VPU, memory, I/O controller, etc.).

5. Lower the power supply voltage of one or more modules (MPU, VPU, memory, I/O controller, etc.).
6. Turn off the power of one or more modules (MPU, VPU, memory, I/O controller, etc.).
7. Lower the clock frequency of the connecting device.
8. Decrease the transfer speed of the connecting device.
9. Narrow the bandwidth of the connecting device.
10. Turn off the power of the connecting device.
11. Turn off the power in units of memory bank.
12. Stop refresh in units of memory bank.
13. Reduce function modules operated at once in MPU and VPU. (If the processor includes a plurality of operation units, the number of the operation units used at once is restricted.)

The power saving functions can be fulfilled under the control of software. The above power saving control operations 1 to 13 can be carried out alone or in combination.

Figure 2:
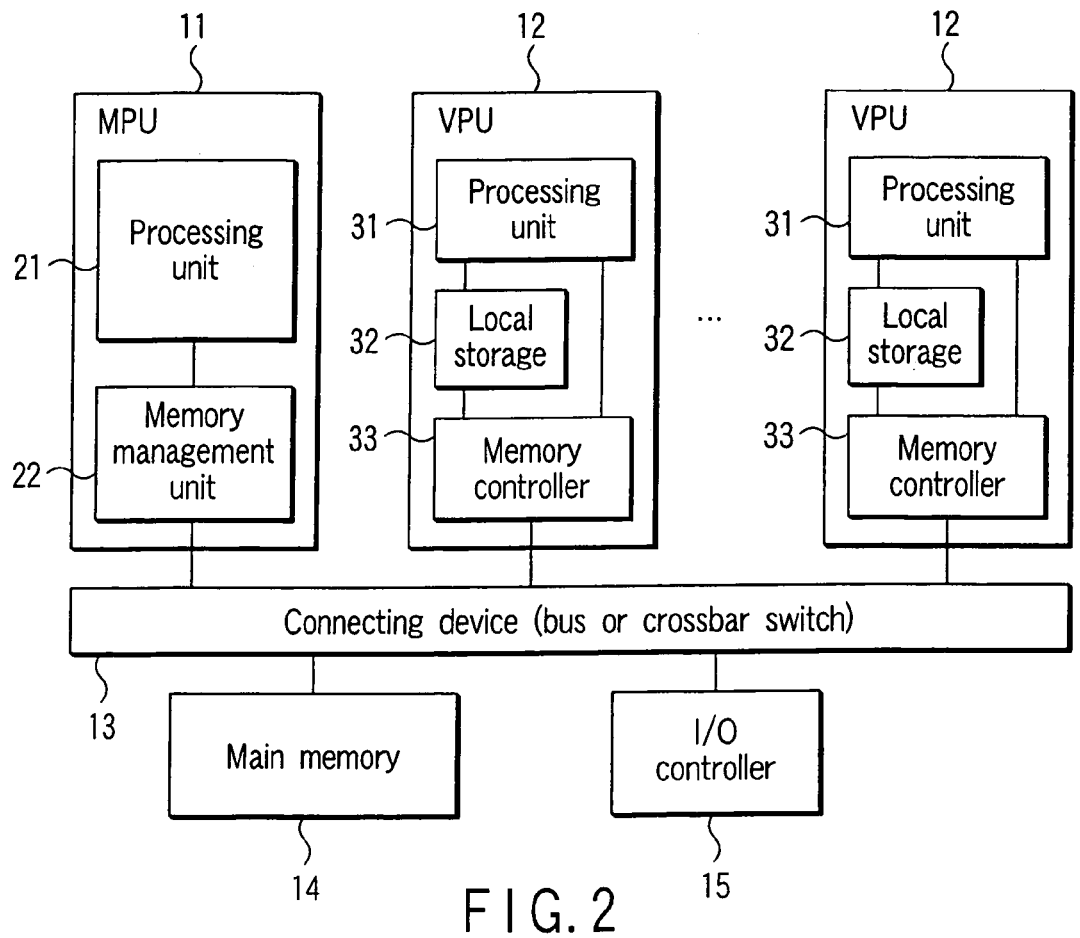
FIG. 2 is a block diagram of an MPU (master processing unit) and VPUs (versatile processing units) provided in the real-time processing system according to the embodiment of the present invention.

FIG. 2 shows an MPU 11 and VPUs 12. The MPU 11 includes a processing unit 21 and a memory management unit 22. The processing unit 21 accesses the memory 14 through the memory management unit 22. The memory management unit 22 performs a virtual memory management function and manages a cache memory in the memory management unit 22. Each of the VPUs 12 includes a processing unit 31, a local storage (local memory) 32 and a memory controller 33. The processing unit 31 can gain direct access to the local storage 32 in the same VPU 12. The memory controller 33 serves as a DMA (direct memory access) controller that transfers data between the local storage 32 and memory 14. The memory controller 33 utilizes the QoS function of the connecting device 13 and has a function of designating a bandwidth and that of inputting/outputting data at the designated bandwidth. The memory controller 33 also has the same virtual memory management function as that of the memory management unit 22 of the MPU 11. The processing unit 31 uses the local storage 32 as a main memory. The processing unit 31 does not gain direct access to the memory 14 but instructs the memory controller 33 to transfer the contents of the memory 14 to the local storage 32. The processing unit 31 accesses the local storage 32 to read/write data. Moreover, the processing unit 31 instructs the memory controller 33 to write the contents of the local storage 32 to the memory 14.

Figure 3:
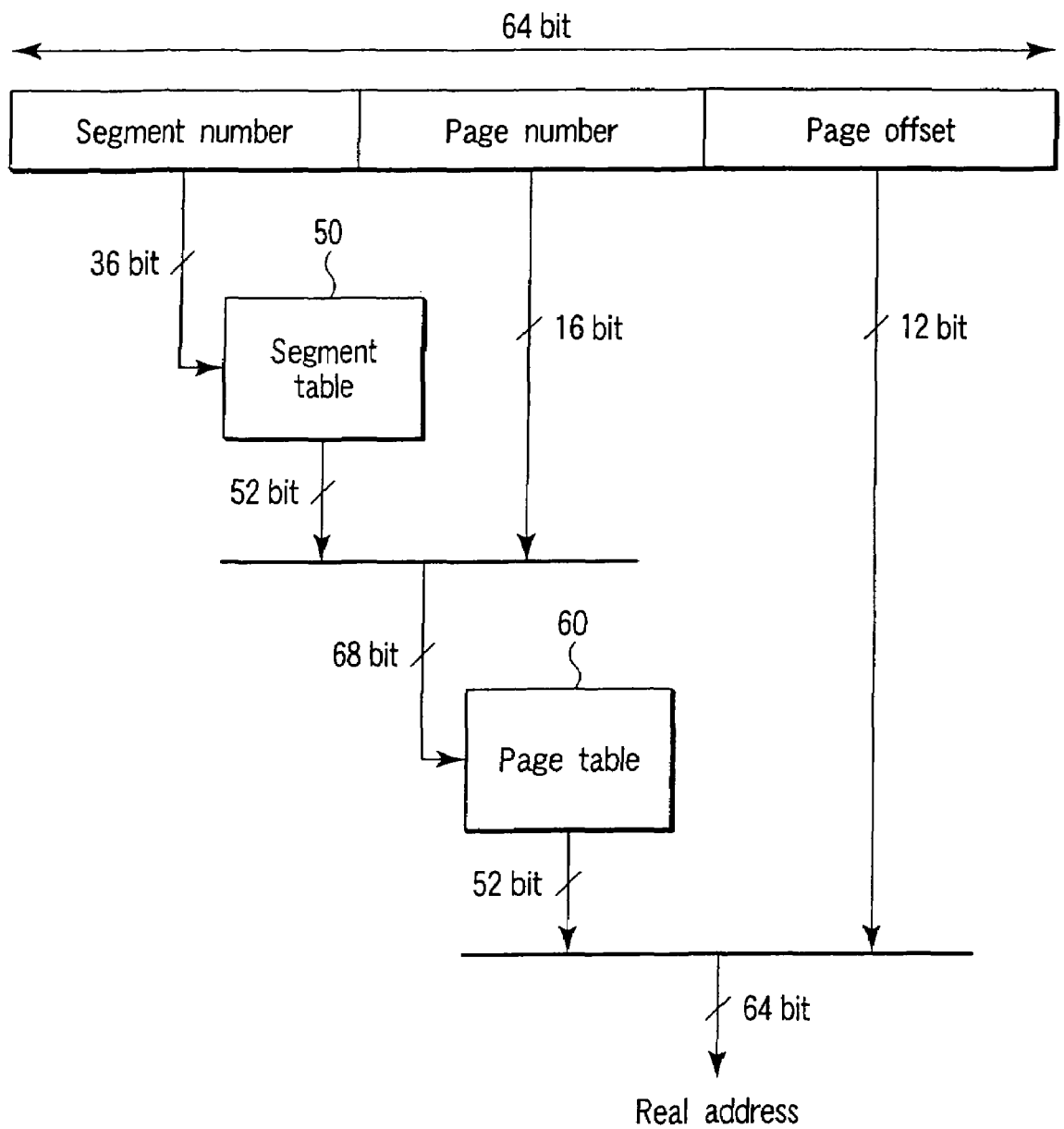
FIG. 3 is a diagram showing an example of a virtual address translation mechanism used in the real-time processing system according to the embodiment of the present invention.

The memory management unit 22 of the MPU 11 and the memory controllers 33 of the VPUs 12 perform virtual memory management as shown in FIG. 3. The address viewed from the processing unit 21 of the MPU 11 or the memory controllers 33 of the VPUs 12 is a 64-bit address as indicated in the upper part of FIG. 3. In the 64-bit address, an upper 36-bit portion indicates a segment number, a middle 16-bit portion indicates a page number, and a lower 12-bit portion indicates a page offset. The memory management unit 22 and memory controllers 33 each include a segment table 50 and a page table 60. The segment table 50 and page table 60 convert the 64-bit address into the real address space that is actually accessed through the connecting device 13.

Figure 4:
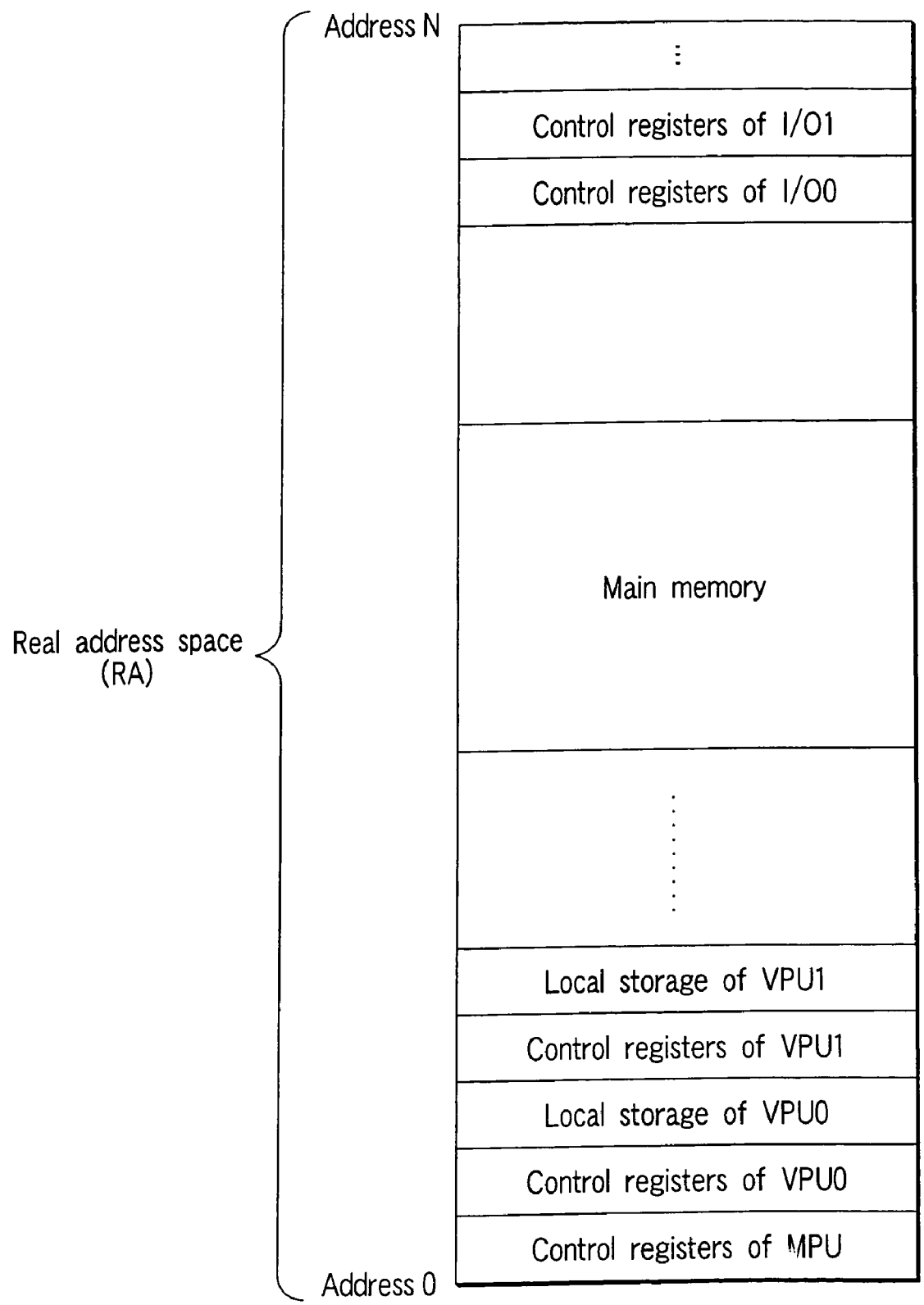
FIG. 4 is a diagram showing an example of data mapped in real address space in the real-time processing system according to the embodiment of the present invention.

For example, the following data items are mapped in the real address (RA) space viewed from the MPU 11 and each VPU 12, as shown in FIG. 4.

1. Memory 14 (main storage device)
2. Control registers of MPU 11
3. Control registers of VPUs 12
4. Local storages of VPUs 12
5. Control registers of I/O devices (including control registers of I/O controller 15)

The MPU 11 and VPUs 12 can access any address in the real address space to read/write data items 1 to 5. It is particularly important to be able to access the real address space and thus access the local storage 32 of any VPU 12 from the MPU 11 and VPUs 12 and even from the I/O controller 15. Furthermore, the segment table 50 or page table 60 can prevent the contents of the local storage 32 of each VPU 12 from being read or written freely.

Figure 5:
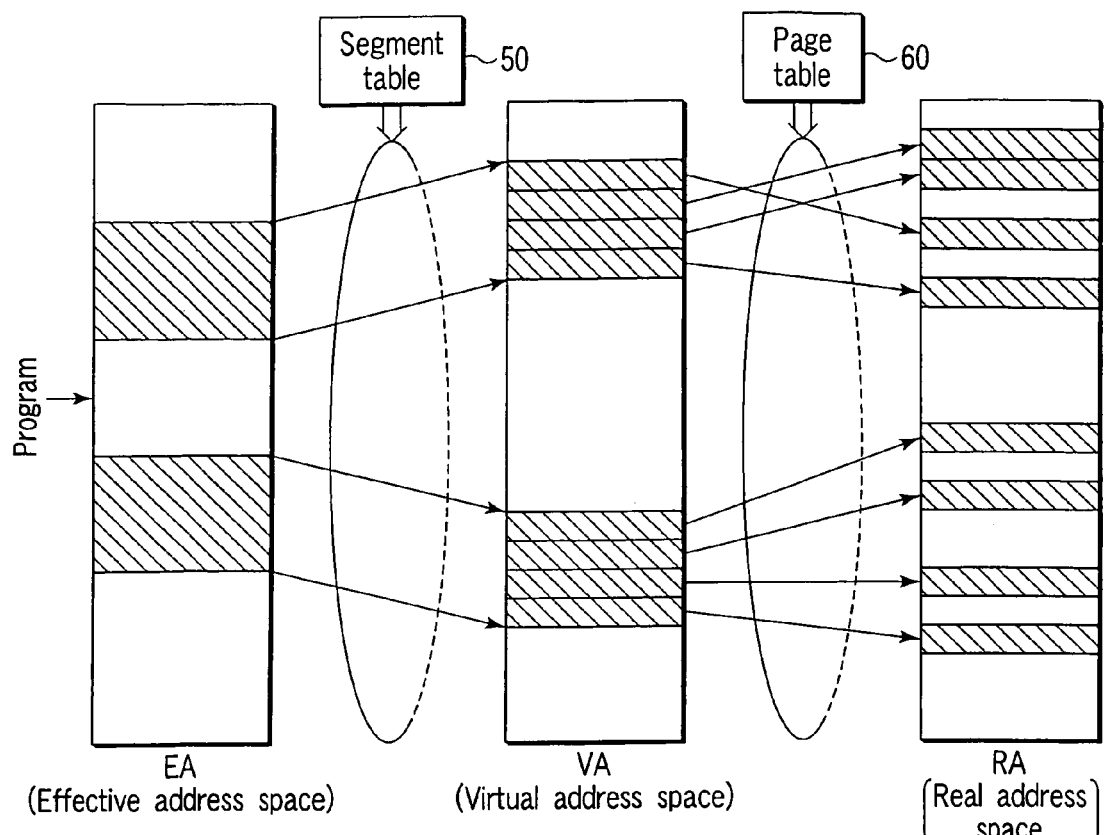
FIG. 5 is an illustration of effective address space, virtual address space and real address space in the real-time processing system according to the embodiment of the present invention.

FIG. 5 shows memory address spaces managed by the virtual memory management function shown in FIG. 3. It is the EA (effective address) space that is viewed directly from the programs executed on the MPU 11 or VPUs 12. An effective address is mapped in the VA (virtual address) space by the segment table 50. A virtual address is mapped in the RA (real address) space by the page table 60. The RA space has a structure as shown in FIG. 4.

The MPU 11 can manage the VPUs 12 using a hardware mechanism such as a control register. For example, the MPU 11 can read/write data from/to the register of each VPU 12 and start/stop each VPU 12 to execute programs. Communication and synchronization between the MPU 11 and each of the VPUs 12 can be performed by means of a hardware mechanism such as a mailbox and an event flag, as can be communication and synchronization between the VPUs 12.

The computer system according to the present embodiment allows software to perform such an operation of an electric device that makes a stringent demand on real-time operations as conventionally implemented. For example, one VPU 12 carries out a computation corresponding to some hardware components that compose the electric device and concurrently another VPU 12 carries out a computation corresponding to other hardware components that compose the electric device.

Figure 6:
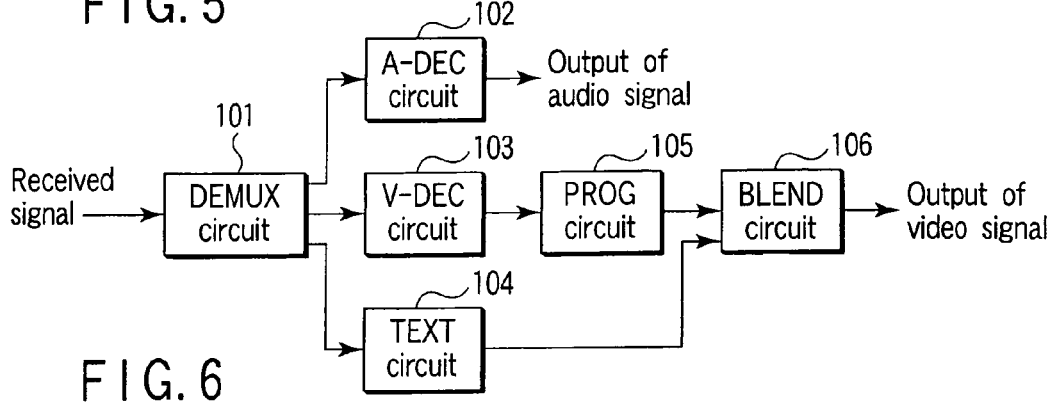
FIG. 6 is a block diagram of a receiver for digital TV broadcast.

FIG. 6 simply shows a hardware structure of a receiver for digital TV broadcast. In this receiver, a DEMUX (demultiplexer) circuit 101 divides a received broadcast signal into compressing-encoded data streams corresponding to audio data, video data and subtitle data. An A-DEC (audio decoder) circuit 102 decodes the compressing-encoded audio data stream. A V-DEC (video decoder) circuit 103 decodes the compressing-encoded video data stream. The decoded video data stream is sent to a PROG (progressive conversion) circuit 105 and converted into a progressive video signal. The progressive video signal is sent to a BLEND (image blending) circuit 106. A TEXT (subtitle data processing) circuit 104 converts the compressing-encoded subtitle data stream into a subtitle video signal and sends it to the BLEND circuit 106. The BLEND circuit 106 blends the video signal sent from the PROG circuit 105 and the subtitle video signal sent from the TEXT circuit 104 and outputs the blended signal as a video stream. A series of operations as described above is repeated at a video frame rate (e.g., 30, 32 or 60 frames per second).

Figure 7:
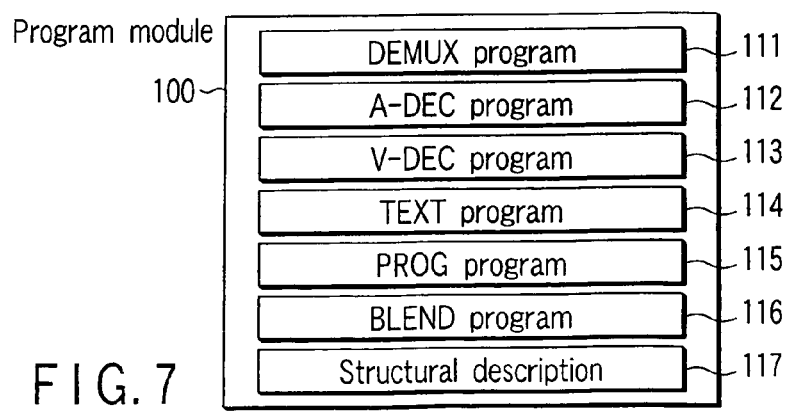
FIG. 7 is a diagram showing an example of a program module executed by the real-time processing system according to the embodiment of the present invention.

In order to perform operations of the hardware shown in FIG. 6 by software, the present embodiment provides a program module 100 as shown in FIG. 7. The program module 100 is an application program for causing the computer system to perform the operations of the DEMUX circuit 101, A-DEC circuit 102, V-DEC circuit 103, TEXT circuit 104, PROG circuit 105 and BLEND circuit 106 shown in FIG. 6. The application program is described by multi-thread programming, and is structured as a group of threads for executing a real-time operation. The real-time operation includes a combination of a plurality of tasks. The program module 100 contains a plurality of programs (a plurality of routines) each executed as a thread. Specifically, the program module 100 contains a DEMUX program 111, an A-DEC program 112, a V-DEC program 113, a TEXT program 114, a PROG program 115 and a BLEND program 116. These programs 111 to 116 are programs describing procedures of tasks corresponding to operations (DMUX operation, A-DEC operation, V-DEC operation, TEXT operation, PROG operation, BLEND operation) of the circuits 101 to 106. More specifically, when the program module 100 runs, a thread corresponding to each of the programs 111 to 116 is generated, and dispatched to one or more VPUs 12 and executed thereon. A program corresponding to the thread dispatched to the VPU 12 is loaded to the local storage 32 of the VPU 12, and the thread executes the program on the local storage 32. The program module 100 is obtained by packaging the programs 111 to 116, which correspond to hardware modules for configuring a receiver for digital TV broadcast, with data called a structural description 117.

The structural description 117 is information indicative of how the programs (threads) in the program module 100 are combined and executed. The structural description 117 includes information indicative of a relationship in input/output (in chain) between chained programs 111 to 116 and costs (time) necessary for executing each of the programs 111 to 116. FIG. 8 shows an example of the structural description 117.

Figure 9:
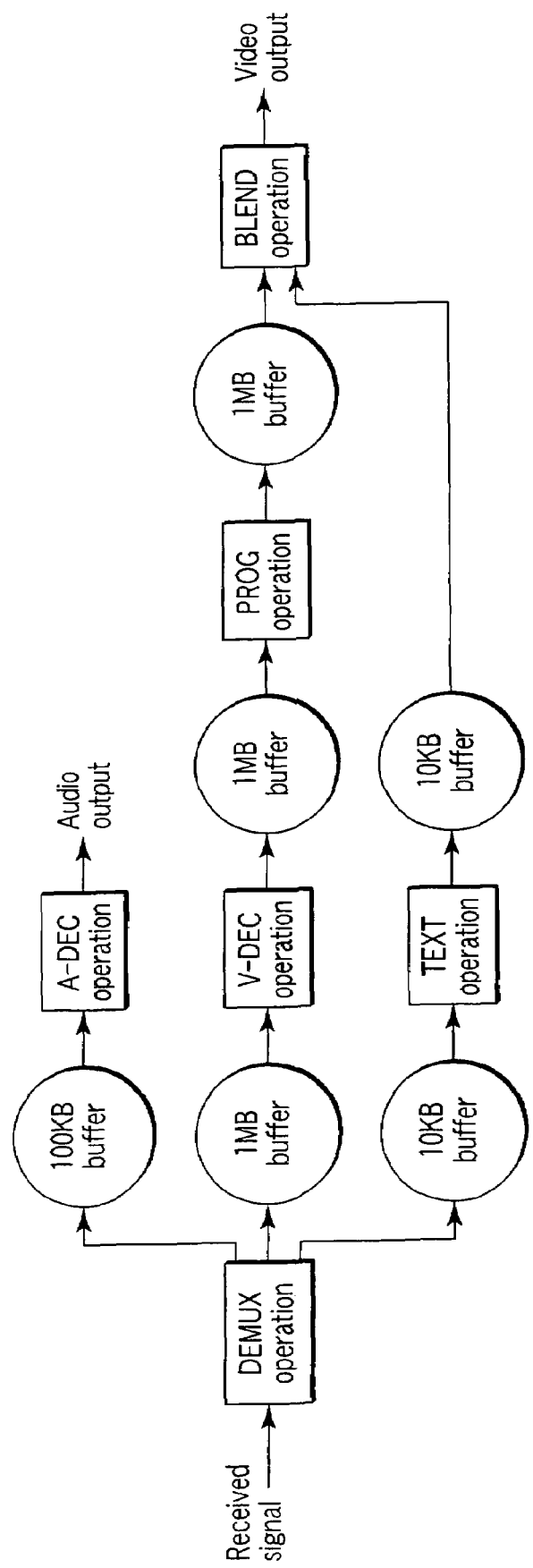
FIG. 9 is a chart showing a flow of data among programs corresponding to the program module shown in FIG. 7.

The structural description 117 shows modules (programs in the program module 100) each executed as a thread and their corresponding inputs, outputs, execution costs, and buffer sizes necessary for the outputs. For example, the V-DEC program of No. (3) receives the output of the DEMUX program of No. (1) as an input and transmits its output to the PROG program of No. (5). The buffer necessary for the output of the V-DEC program is 1 MB and the cost for executing the V-DEC program in itself is 50. The cost can be described in units of time (time period) necessary for executing the program, or step number of the program. It also can be described in units of time required for executing the program by a virtual processor having some virtual specifications. Since the VPU specifications and performance may vary from computer to computer, it is desirable to describe the cost in such virtual units. If the programs are executed according to the structural description 117 shown in FIG. 8, data flows among the programs as illustrated in FIG. 9.

The structural description 117 also shows coupling attribute information which indicates a coupling attribute between threads corresponding to the programs 111 to 116 as thread parameters. The coupling attribute includes two different attributes of a tightly coupled attribute and a loosely coupled attribute. A plurality of threads having the tightly coupled attribute are executed in cooperation with each other and referred to as a tightly coupled thread group. The computer system of the present embodiment schedules the threads belonging to each tightly coupled thread group such that the threads belonging to the same tightly coupled thread group can simultaneously be executed by different VPUs. A plurality of threads having the loosely coupled attribute is referred to as a loosely coupled thread group. A programmer can designate a coupling attribute between threads corresponding to the programs 11 to 16 using thread parameters. The tightly and loosely coupled thread groups will be described in detail with reference to FIG. 25 et seq. The thread parameters including the coupling attribute information can be described directly as codes in the programs 111 to 116, not as the structural description 117.

Figure 10:
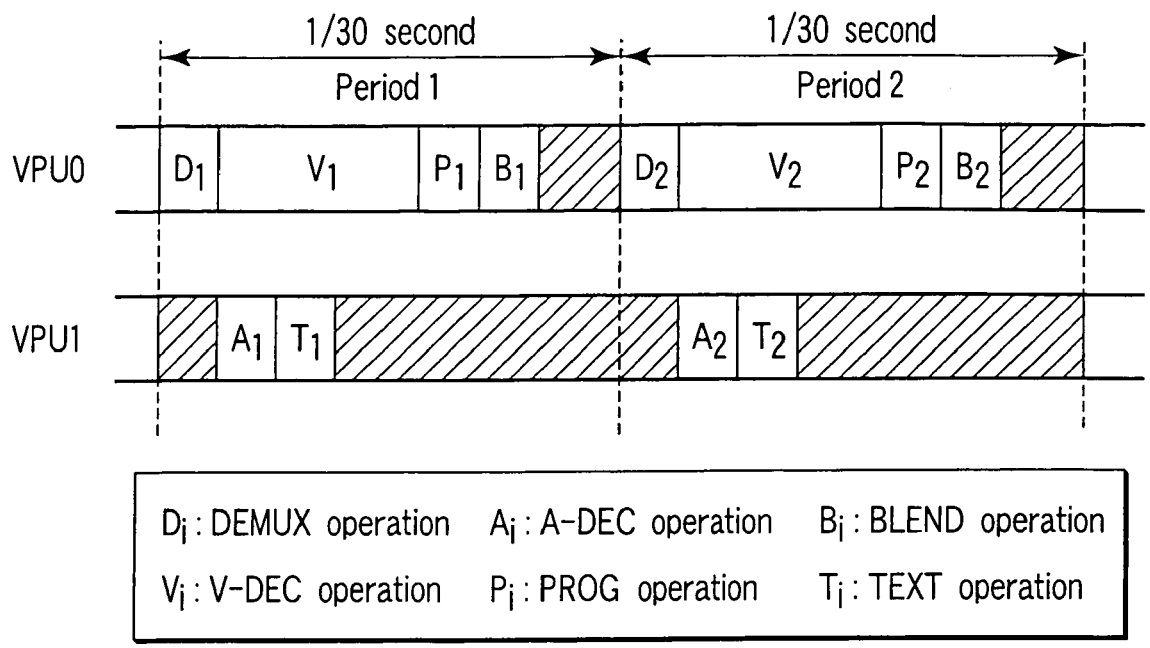
FIG. 10 is a chart showing a parallel operation of the program module shown in FIG. 7, which is performed by two VPUs.
Figure 11:
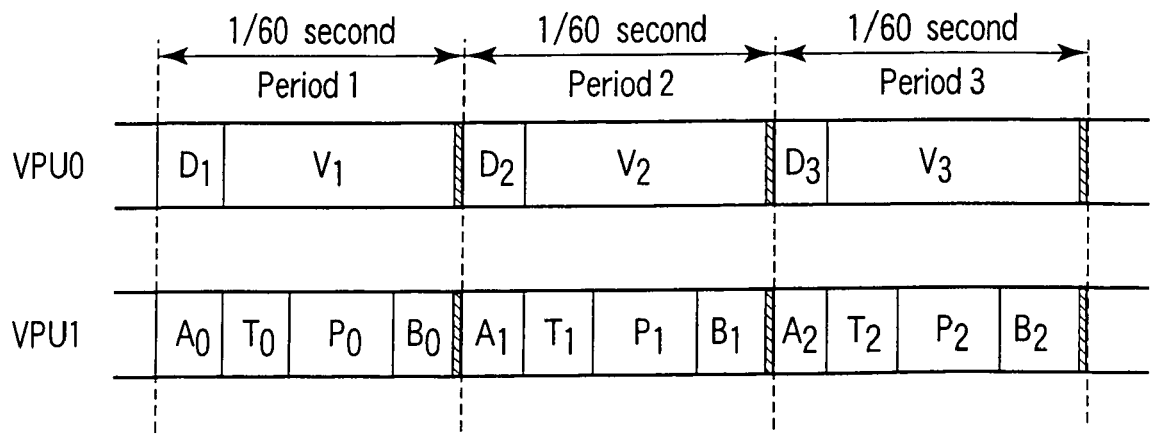
FIG. 11 is a chart showing a pipeline operation of the program module shown in FIG. 7, which is performed by two VPUs.

Referring to FIGS. 10 and 11, there now follows descriptions as to how the computer system of the present embodiment executes the programs 111 to 116. Assume here that the computer system includes two VPUs of VPU0 and VPU1. FIG. 10 shows time for assigning the programs to each of the VPUs when video data of 30 frames is displayed per second. Audio and video data for one frame is output within a time interval corresponding to one period (one time period). First, the VPU0 executes the DEMUX program to perform the DEMUX operation and writes its resultant audio, video and subtitle data to the buffers. After that, the VPU1 executes the A-DEC program and TEXT program to perform the A-DEC operation and the TEXT operation in sequence and writes their results to the buffers. Then, the VPU0 executes the V-DEC program to perform the V-DEC operation and writes its result to the buffer. The VPU0 executes the PROG program to perform the PROG operation and writes its result to the buffer. Since the VPU1 has already completed the TEXT program at this time, the VPU0 executes the last BLEND program to perform the BLEND operation, in order to create final video data. The above processing is repeated for every time period.

An operation to determine which program is executed by each of the VPUs and when it is done to perform a desired operation without delay is called scheduling. A module to carry out the scheduling is called a scheduler. In the present embodiment, the scheduling is carried out based on the above structural description 117 contained in the program module 100. In the scheduling operation, both execution start timing and execution term of each of threads that execute the programs 111 to 116 are determined based on the structural description 117, thereby to assign each of the threads to one or more VPUs 12. The following operations are performed when the program module 100 is to be executed.

1. The operating system receives the program module 100 from an external storage or the memory 14, and reads a plurality of programs 111 to 116 and the structural description 117 from the program module 100.

2. Based on the structural description 117, the scheduler in the operating system determines both execution start timing and execution term of each of threads (DEMUX, V-DEC, A-DEC, TEXT, PROG and BLEND) for executing the programs 111 to 116 in the program module 100 to assign the threads (DEMUX, V-DEC, A-DEC, TEXT, PROG and BLEND) to one or more VPUs.

As described above, in the real-time processing system, the execution start timing and execution term of each of threads (DEMUX, V-DEC, A-DEC, TEXT, PROG and BLEND) that executes the chained programs 111 to 116 in the program module 100 are determined based on the structural description 117. Thus, the threads for performing a real-time operation can efficiently be scheduled without describing timing constraint conditions of each operation in codes of a program.

FIG. 11 shows the programs executed when video data of 60 frames is displayed per second. FIG. 11 differs from FIG. 10 as follows. In FIG. 11, data of 60 frames needs to be processed per second, whereas in FIG. 10, data of 30 frames is processed per second and thus data processing for one frame can be completed in one period (⅓₀ second). In other words, one-frame data processing cannot be completed in one period (⅟₆₀ second) and thus a software pipeline operation that spans a plurality of (two) periods is performed in FIG. 11. For example, in period 1, the VPU0 executes the DEMUX program and V-DEC program for the input signal. After that, in period 2, the VPU1 executes the A-DEC, TEXT, PRCG and BLEND programs and outputs final video data. In period 2, the VPU0 executes the DEMUX and V-DEC programs in the next frame. The DEMUX and V-DEC programs of the VPU0 and the A-DEC, TEXT, PROG and BLEND programs of the VPU1 are executed over two periods in pipeline mode.

In order to carry out the above pipeline operation, the following operations are performed when the program module 100 is executed:

1. The operating system receives the program module 100 from the external storage or memory 14 and reads the structural description 117 from the program module 100.

2. The scheduler in the operating system determines the order in which a plurality of tasks DEMUX, V-DEC, A-DEC, TEXT, PROG and BLEND are executed by the programs 111 to 116 in the program module 100 based on the structural description 117. The scheduler then divides the tasks into a first task group and a second task group. The second task group follows the first task group. For example, the tasks DEMUX and V-DEC belong to the first task group and the tasks A-DEC, TEXT, PROG and BLEND belong to the second task group.

3. The scheduler uses at least two processors VPU0 and VPU1 and periodically allocates at least one of the processors to each of the first and second task groups to periodically execute the first task group (DEMUX and V-DEC) and the second task group (A-DEC, TEXT, PROG and BLEND) in pipeline mode. If the scheduler performs a pipeline operation using two processors VPU0 and VPU1, it periodically assigns the first task group (DEMUX and V-DEC) to the VPU0 such that the VPU0 executes the first task group periodically at time intervals of 1/60 second. The scheduler periodically assigns the second task group (A-DEC, TEXT, PROG and BLEND) to the VPU1 such that the VPU1 executes the second task group periodically at time intervals of 1/60 second with a one-period delay relative to the first task group.

The two processors VPU1 and VPU2 can execute the second task group in parallel. For example, while the VPU1 executes the tasks A-DEC and TEXT, the VPU2 executes the tasks PROG and BLEND.

In the program module 100 shown in FIG. 7, a plurality of tasks DEMUX, V-DEC, A-DEC, TEXT, PROG and BLEND are executed by different threads. The above task groups can thus be referred to as thread groups.

The program module 100 shown in FIG. 7 can be prerecorded in a flash ROM and a hard disk in a device incorporating the computer system of the present embodiment, or circulated through a network. In this case, the contents of operations to be performed by the computer system vary according to the type of a program module downloaded through the network. Thus, the device incorporating the computer system can perform the real-time operation corresponding to each of various pieces of dedicated hardware. If new player software, decoder software and encryption software necessary for reproducing new contents are distributed together with the contents as program modules executable by the computer system, any device incorporating the computer system can reproduce the contents within acceptable limits of ability.

Power Saving Control

Figure 12:
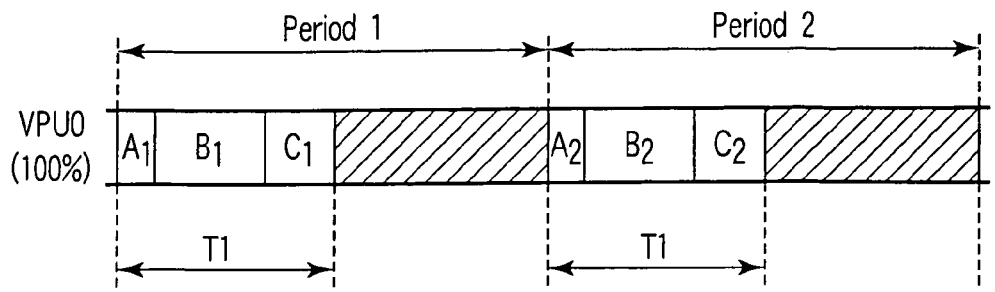
FIG. 12 is a chart of scheduling to periodically execute threads for a real-time operation.

The computer system according to the embodiment of the present invention performs power saving control to decrease in power consumption, making sure that a real-time operation such as the above program module 100 is completed within a limited time period. When a real-time operation needs to be periodically performed at specific time intervals, the operating speed of each of VPUs used for performing the real-time operation is minimized under the condition that the execution of the real-time operation in a period corresponding to each of the specific time intervals is completed before the start timing of the next period. FIG. 12 shows an example of scheduling to periodically perform a real-time operation including three tasks A, B and C by the VPU0. In the scheduling, execution start timing is determined for each of the tasks A, B and C in each period corresponding to each of specific time intervals, based on cost information indicative of times (execution terms) required to perform the tasks and a relationship among the tasks in order of task execution, in such a manner that the VPU0 periodically performs the real-time operation at the specific time intervals. The execution term of each of the tasks, which is taken into consideration in the scheduling, is applied to the case where the VPU0 operates at the maximum (100%) speed.

Figure 13:
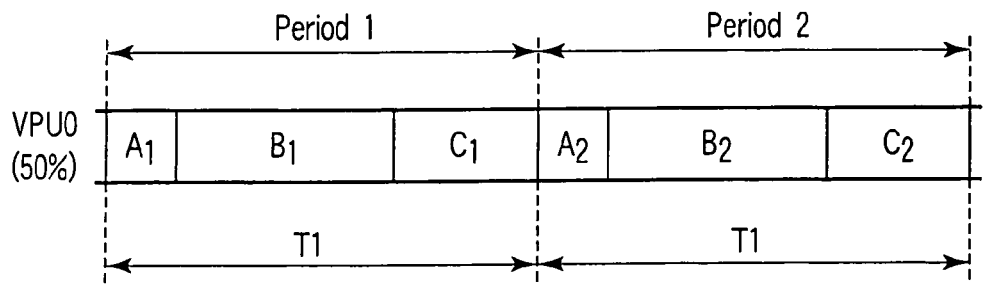
FIG. 13 is a chart of an example in which the VPU decreases in operating speed on the basis of scheduling results shown in FIG. 12.

The VPU0 performs no operations from the end of execution terms A1, B1 and C1 of tasks A, B and C in period 1 to the start of period 2. This spare time is used to decrease the operating speed of the VPU0, without impairing the real-time operation. In other words, the VPU0 decreases in operating speed such that a term T1 from the start of period 1 to the completion of tasks A, B and C is lengthened to the time interval of each period, as shown in FIG. 13. If the term T1 is half the period 1, an operating speed control operation is carried out to decrease the operating speed of the VPU0 by half. The VPU0 operates at 50% operating speed and thus decreases in power consumption. The power consumption can thus be decreased, assuring a real-time operation to execute the tasks A, B and C periodically at specific time intervals.

Figure 14:
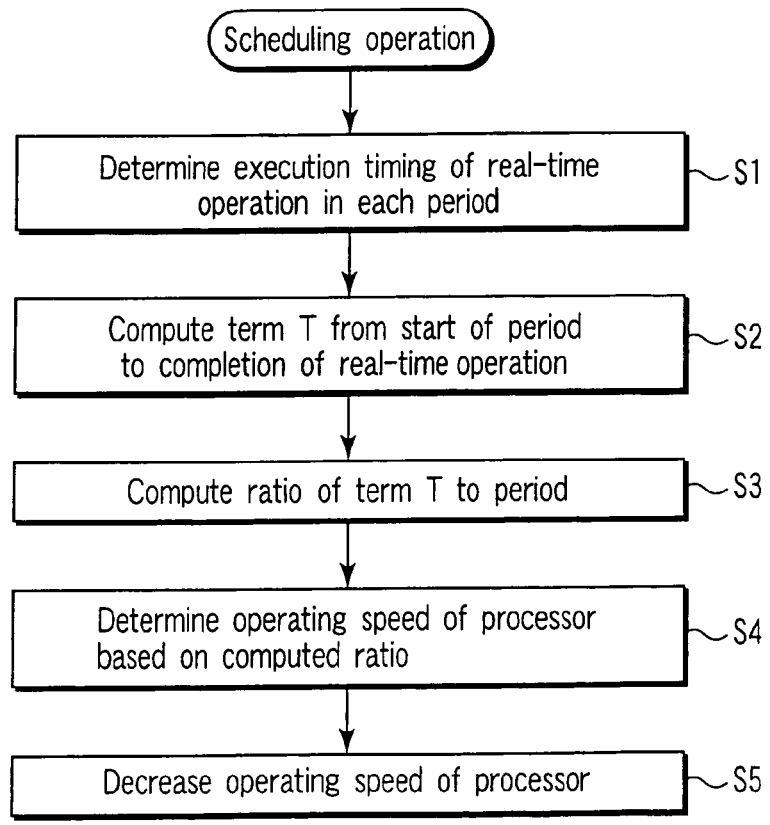
FIG. 14 is a flowchart showing an example of steps for a power saving control operation performed by the real-time processing system according to the embodiment of the present invention.

A procedure for the power saving control operation will be described with reference to the flowchart shown in FIG. 14.

Step S1: The operating system carries out a scheduling operation to periodically assign the real-time operation at specific time intervals to the VPU0. In this case, the operating system determines execution start timing of each of a plurality of tasks in each period corresponding to each of specific time intervals such that the VPU0 periodically performs a real-time operation including the tasks at the specific time intervals.

Step S2: The operating system computes time interval T from the start of each period to the completion of the execution term of the real-time operation based on cost information concerning time required for performing the real-time operation by the VPU0 at the maximum (100%) operating speed. If a real-time operation starts with the start timing of each period, the time interval T coincides with the execution time (execution term) of the real-time operation. The cost information is provided by the foregoing structural description 117. If a real-time operation includes a plurality of tasks, the execution term of the real-time operation is a sum of execution terms of the respective tasks. The execution term of the real-time operation can thus be determined based on the costs for executing the tasks, provided by the structural description 117.

Step S3: The operating system computes a ratio of time interval T to a time interval corresponding to one period, or a ratio of time interval T to a specific time interval defining one period.

Steps S4 and S5: The operating system carries out an operating speed control operation to operate the VPU0 at operating speed that is lower than the maximum operating speed (100%) based on the ratio computed in step S3.

In step S4, the operating system determines the operating speed of the VPU0. Based on the ratio of time interval T to the time interval corresponding to one period, the operating system determines an operating speed (clock frequency) of the VPU0 to complete the execution term of a real-time operation in each period before the next period starts at latest and lengthen the time interval T1 from the start of each period to the completion of the execution term of the real-time operation. The operating speed (clock frequency) of the VPU0 can be computed by multiplying the maximum speed (100%) of the VPU0 by the computed ratio. If the time interval T is half the time interval corresponding to one period, the settable lowest speed of the VPU0 is half (50%) the maximum speed (100%) thereof. In step S5, the operating system transmits a command indicative of the clock frequency of the VPU0 to the power saving controller 17 through the connecting device 13. The controller 17 includes a circuit for controlling the frequency of clock signal supplied to each VPU and sets the frequency of clock signal supplied to a VPU designated by a command from the operating system to a frequency designated by the command. Thus, the operating speed of the VPU0 is set at that determined in step S4. Consequently, the real-time operation is performed slowly and the time interval T is lengthened to the boundary between periods.

Figure 15:
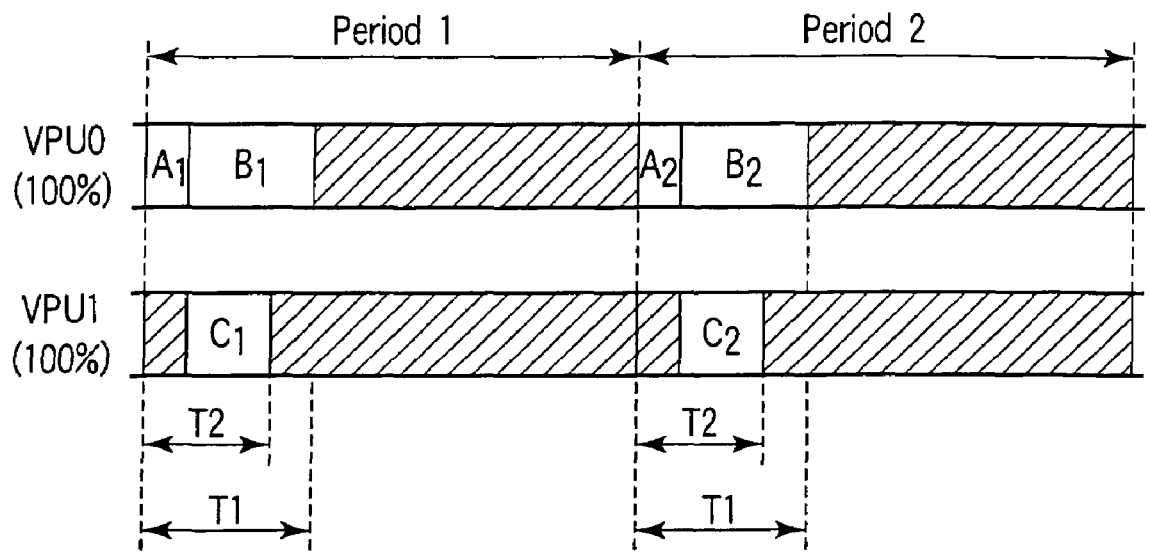
FIG. 15 is a chart of scheduling to periodically execute threads of a real-time operation by two VPUs.

The feature of the power saving control lies in that a power saving effect can be improved by scheduling to secure a longer spare time of a VPU. It is thus desirable to minimize the execution term of a real-time operation within one period by equally assigning the execution terms of tasks of the real-time operation to as many VPUs as possible. FIG. 15 shows an example of scheduling to execute three chained tasks A, B and C by VPU0 and VPU1. Now assume that the tasks A, B and C are subjected to the constraint that the task A has to be executed before the tasks B and C. The three tasks A, B and C are divided into first and second task groups that can be executed in parallel in each period. The first task group includes the tasks A and B and the second task group includes the task C. The first task group (A, B) is assigned to the VPU0 such that it can periodically be executed at specific time intervals, while the second task group (C) is assigned to the VPU1 such that it can periodically be executed at specific time intervals. The execution start timing of the task C on the VPU1 is determined such that the task C on the VPU1 starts after the task A on the VPU0.

Figure 16:
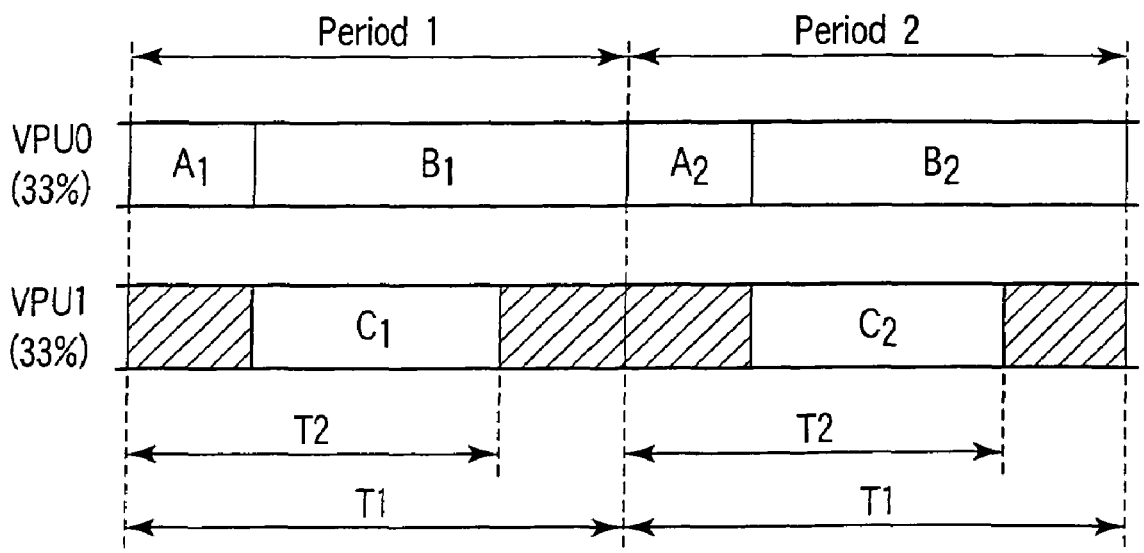
FIG. 16 is a chart of an example in which the two VPUs decreases in operating speed on the basis of scheduling results shown in FIG. 15.

Time interval T1 from the start of each period to the completion of execution of the first task group (A, B) is longer than time interval T2 from the start of each period to the completion of execution of the second task group (C). In this case, as shown in FIG. 16, the VPU0 and VPU1 decrease in operating speed at the same rate such that the time interval T1 is lengthened to a boundary between periods. If the time interval T1 is one-third the time interval of each period, the operating speed of each of VPU0 and VPU1 decreases to one-third. Since the VPU0 and VPU1 operate at 33% operating speed, they can reduce in power consumption. Since they decrease in operating speed at the same rate, the constraint that the task C on VPU1 starts after the task A in VPU0 is never broken.

Figure 17:
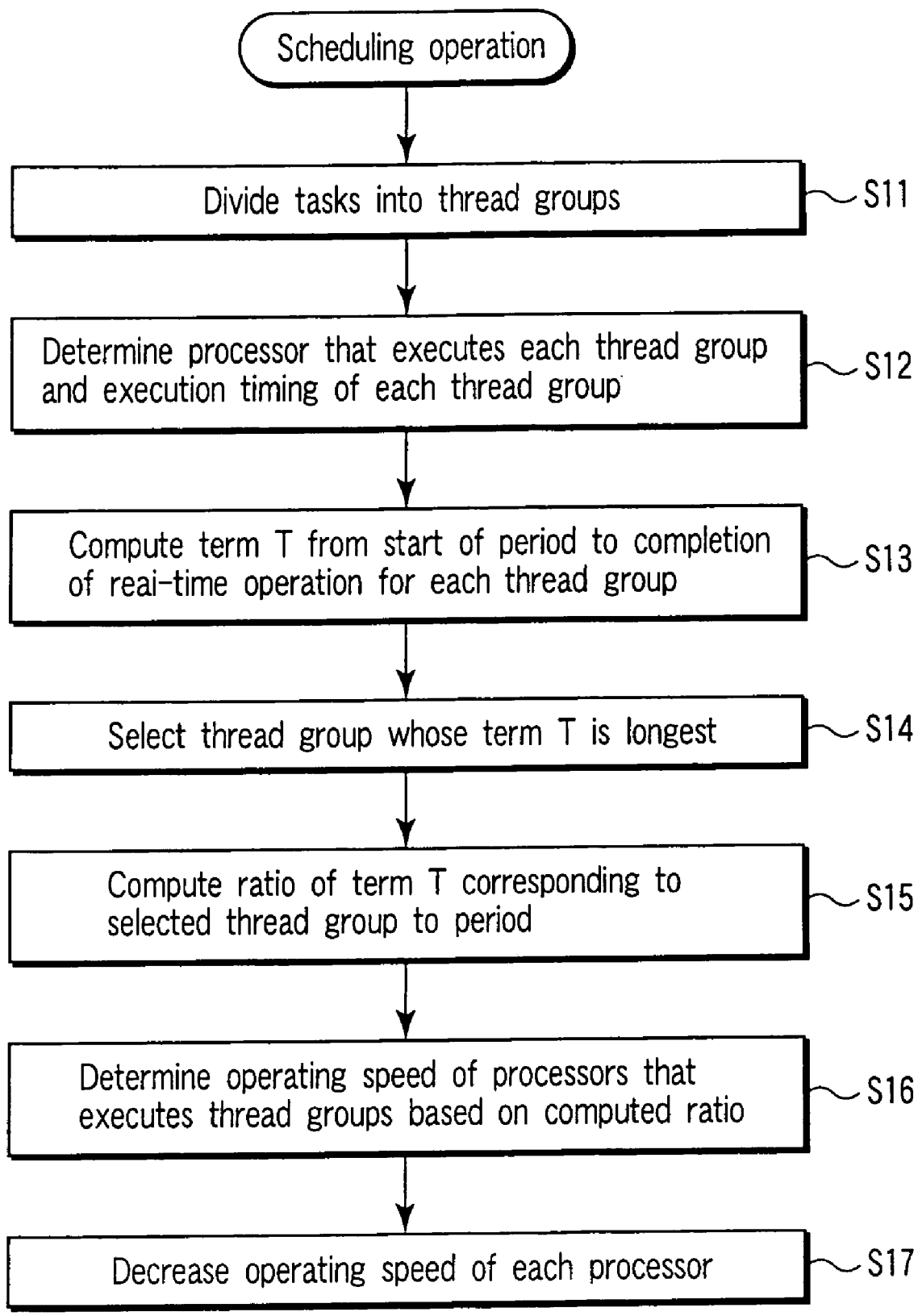
FIG. 17 is a flowchart showing another example of steps for a power saving control operation performed by the real-time processing system according to the embodiment of the present invention.

A procedure of a power saving control operation applied to a real-time operation performed by a plurality of VPUs will be described with reference to the flowchart shown in FIG. 17. Hereinafter the above tasks are referred to as threads.

Step S11: The operating system divides a plurality of chained threads of a real-time operation into a plurality of thread groups that can be executed in parallel, based on a relationship among the tasks in order of task execution, in order to complete the real-time operation within each period in as short time as possible. Assume that the chained threads are divided into three thread groups, i.e., first, second and third thread groups.

Step S12: The operating system carries out a scheduling operation to determine both execution start timing of each of the first to third thread groups in each period and a VPU that executes each of the first to third thread groups in each period in such a manner that the first to third thread groups are executed in parallel by different VPUs for each period corresponding to one of specific time intervals. For example, the first thread group is scheduled such that the first thread group is periodically executed by the VPU0, the second thread group is scheduled such that the second thread group is periodically executed by the VPU1, and the third thread group is scheduled such that the third thread group is periodically executed by the VPU2.

Step S13: The operating system computes a time interval T from the start of each period to the completion of each thread group based on both the execution start timing of each of the first to third thread groups and cost information indicative of time required for executing each of the first to third thread groups by the VPU at the maximum (100%) operating speed.

Step S14: The operating system selects one from the first to third thread groups in which the completion of the execution term in each period is the latest, or the time interval T is the longest in each period.

Step S15: The operating system computes a ratio of the time interval T corresponding to the selected one of the thread groups to the time interval corresponding to one period.

Step S16: The operating system determines an operating speed (clock frequency) of each of the VPU0, VPU1 and VPU2 for executing the first, second and third thread groups, based on the computed ratio. The operating speed is determined to meet the conditions that the execution term of the selected one of the thread groups is completed at latest before the next period starts, and the time interval from the start of each period to the completion of the execution term of the first thread group, the time interval from the start of each period to the completion of the execution term of the second thread group, and the time interval from the start of each period to the completion of the execution term of the third thread group are lengthened at the same rate.

Step S17: The operating system transmits commands indicative of clock frequencies of the VPU0, VPU1 and VPU2 to the power saving controller 17. The controller 17 includes a circuit for controlling the frequencies of clocks supplied to the VPUS. The controller 17 sets clock frequency corresponding to each of the VPU0, VPU1 and VPU2 to a clock frequency designated by the command from the operating system.

Operating System

Figure 18:
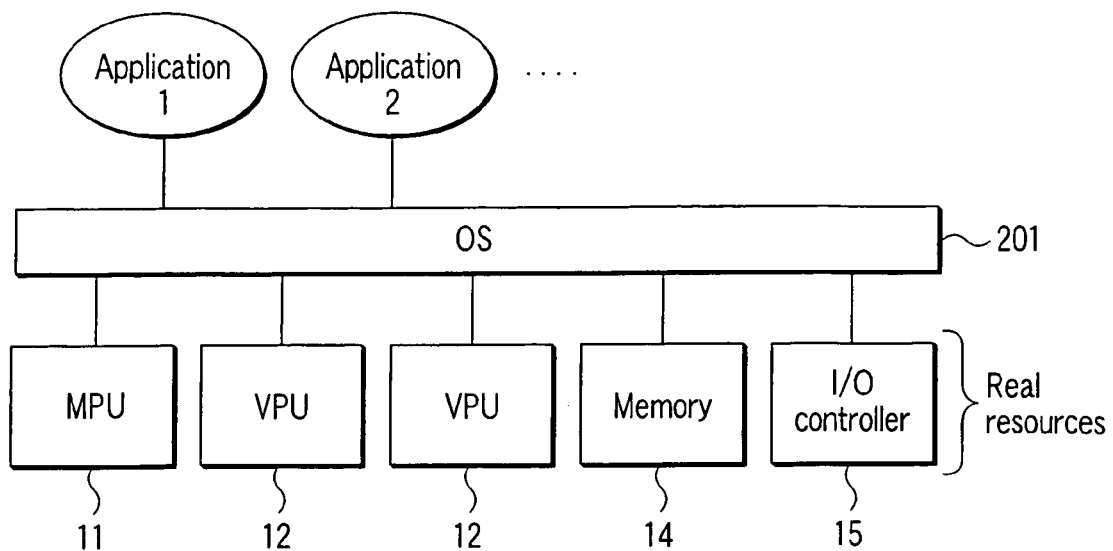
FIG. 18 is a diagram showing an example of an operating system in the real-time processing system according to the embodiment of the present invention.

When only one OS (operating system) 201 is loaded into the computer system of the present embodiment, it manages all real resources (MPU 11, VPUs 12, memory 14, I/O controller 15, I/O device 16, etc.), as shown in FIG. 18.

Figure 19:
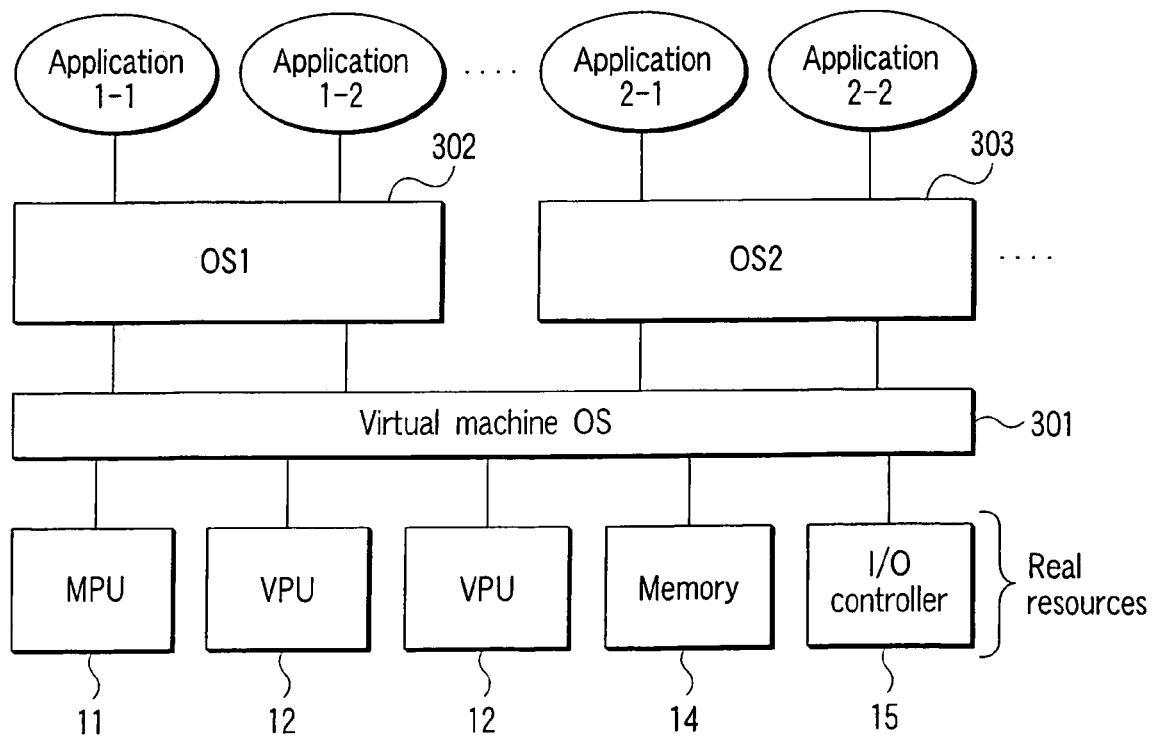
FIG. 19 is a diagram showing another example of the operating system in the real-time processing system according to the embodiment of the present invention.
Figure 20:
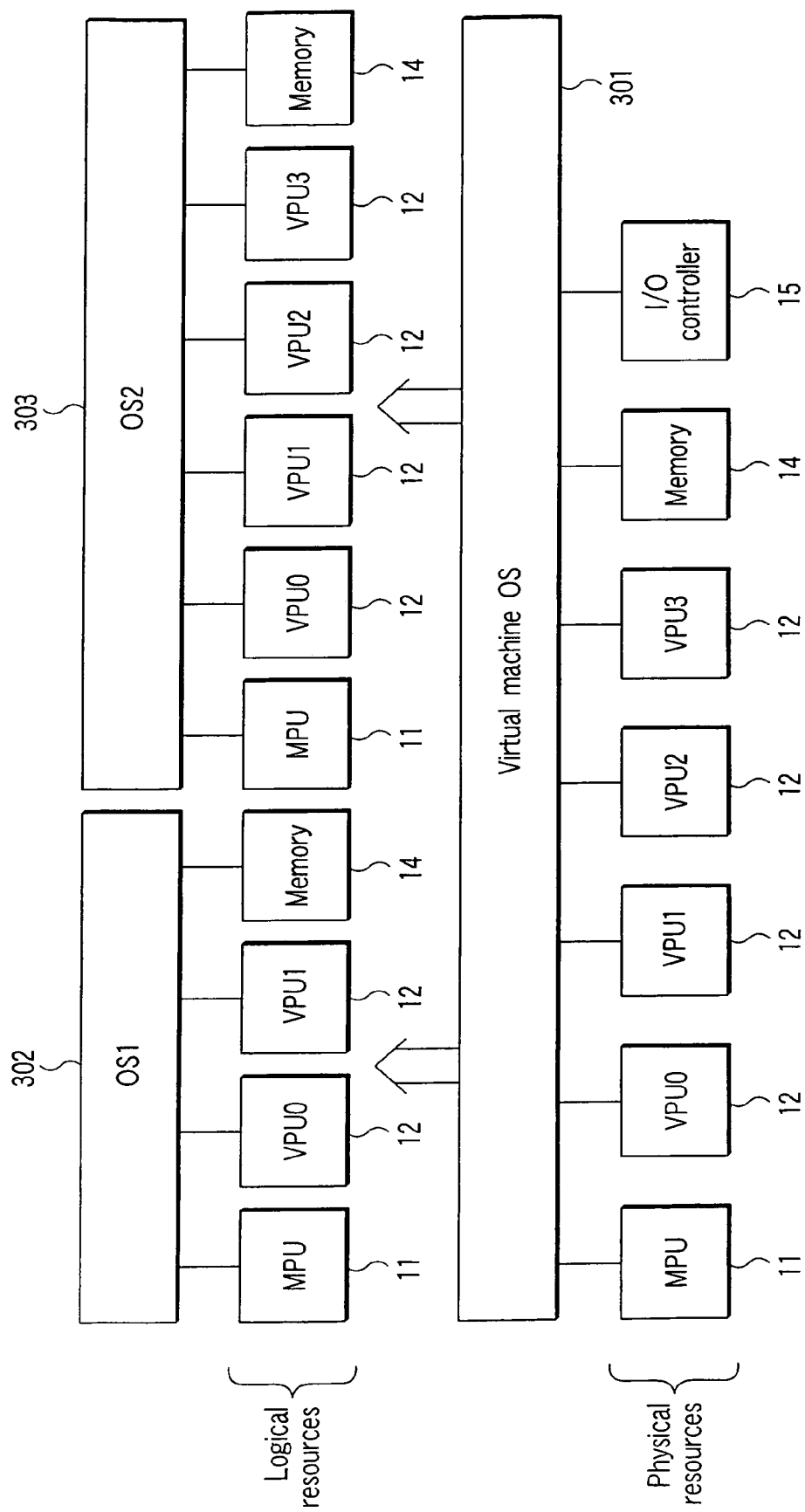
FIG. 20 is a diagram showing a relationship between a virtual machine OS and a guest OS in the real-time processing system according to the embodiment of the present invention.

On the other hand, a virtual machine system can perform a plurality of OSes at once. In this case, as shown in FIG. 19, a virtual machine OS 301 is loaded into the computer system to manage all real resources (MPU 11, VPUs 12, memory 14, I/O controller 15, I/O device 16, etc.). The virtual machine OS 301 is also referred to as a host OS. One or more OSes 302 and 303 that are also referred to as guest OSes are loaded on the virtual machine OS 301. Referring to FIG. 20, the guest OSes 302 and 303 each run on a computer including virtual machine resources given by the virtual machine OS 301 and provide various services to application programs managed by the guest OSes 302 and 303. In the example of FIG. 20, the guest OS 302 appears as if it operated on a computer including one MPU 11, two VPUs 12 and one memory 14, and the guest OS 303 appears as if it operated on a computer including one MPU 11, four VPUs 12 and one memory 14. The virtual machine OS 301 manages which one of VPUs 12 of the real resources actually corresponds to a VPU 12 viewed from the guest OS 302 and a VPU 12 viewed from the guest OS 303. The guest OSes 302 and 303 need not be aware of the correspondence.

Figure 21:
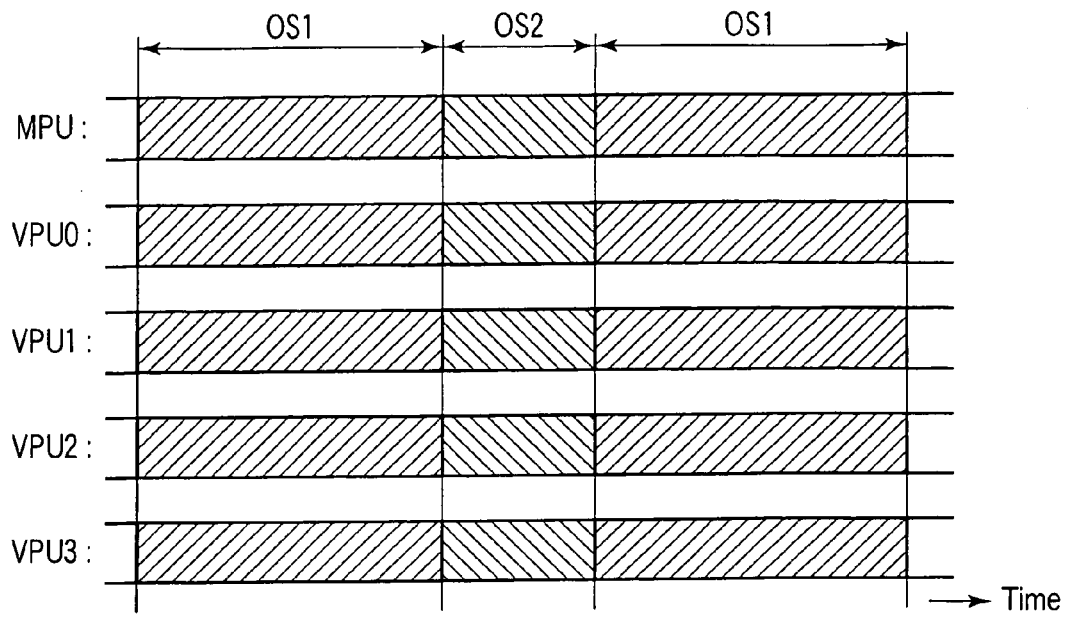
FIG. 21 is a chart showing resources that are time-divisionally assigned to a plurality of guest OSes in the real-time processing system according to the embodiment of the present invention.

The virtual machine OS 301 schedules the guest OSes 302 and 303 to allocate all the resources in the computer system to the guest OSes 302 and 303 on a time-division basis. Assume that the guest OS 302 carries out a real-time operation. To perform the operation thirty times per second at an exact pace, the guest OS 302 sets its parameters to the virtual machine OS 301. The virtual machine OS 301 schedules the guest OS 302 to reliably assign necessary operation time to the guest OS 302 once per 1/30 second. The operation time is assigned to a guest OS that does not require a real-time operation by priority lower than a guest OS that requires a real-time operation. FIG. 21 shows that the guest OSes 302 and 303 run alternately, representing time by the horizontal axis. While the guest OS 302 (OS1) is running, the MPU 11 and all the VPUs 12 are used as resources of the guest OS 302 (OS1). While the guest OS 303 (OS2) is running, the MPU 11 and all the VPUs 12 are used as resources of the guest OS 303 (OS2).

Figure 22:
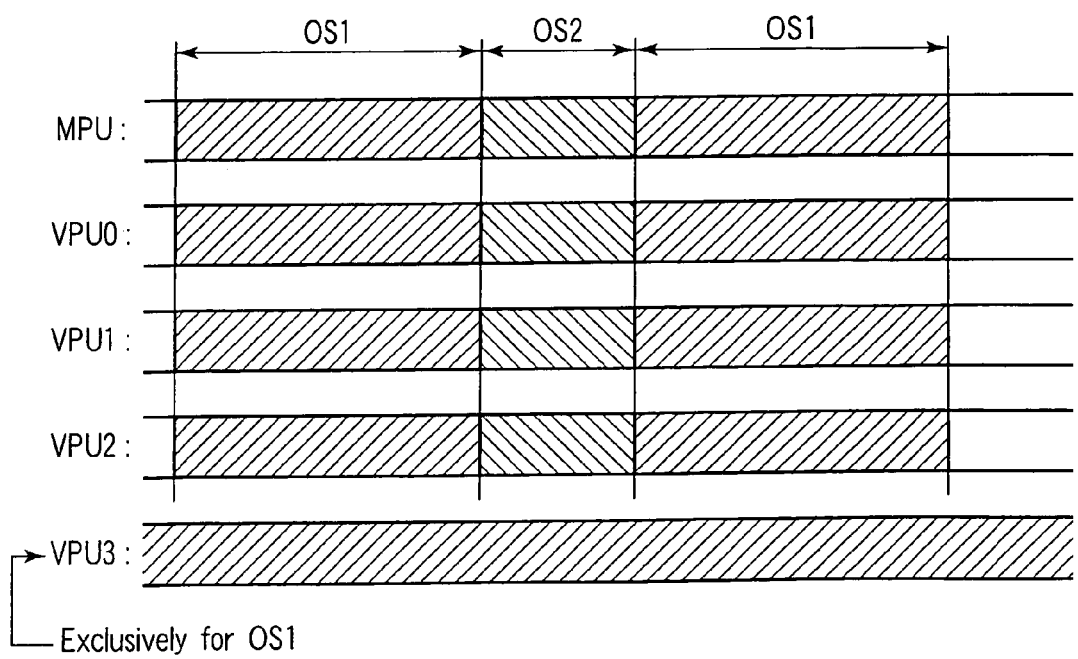
FIG. 22 is a chart showing specific resources that are occupied by a specific guest OS in the real-time processing system according to the embodiment of the present invention.

FIG. 22 shows a different operation mode. There is a case where it is to be wished that a VPU 12 be used continuously according to target applications. This case corresponds to, for example, an application that necessitates continuing to monitor data and events all the time. The scheduler of the virtual machine OS 301 manages the schedule of a specific guest OS such that the guest OS occupies a specific VPU 12. In FIG. 22, a VPU 3 is designated as a resource exclusively for a guest OS 302 (OS1). Even though the virtual machine OS 301 switches the guest OS 302 (OS1) and guest OS 303 (OS2) to each other, the VPU 3 always continues to operate under the control of the guest OS 302 (OS1).

Figure 23:
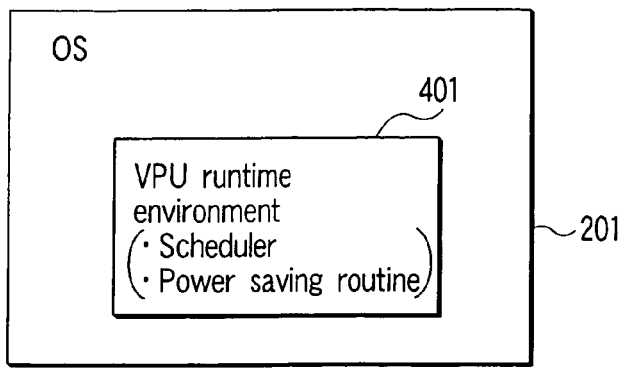
FIG. 23 is a diagram of VPU runtime environment used as a scheduler in the real-time processing system according to the embodiment of the present invention.

In order to execute programs using a plurality of VPUs 12 in the present embodiment, a software module called a VPU runtime environment is used. The software module includes a scheduler for scheduling threads to be assigned to the VPUs 12. When only one OS 201 is implemented on the computer system of the present embodiment, a VPU runtime environment 401 is implemented on the OS 201 as illustrated in FIG. 23.

Figure 24:
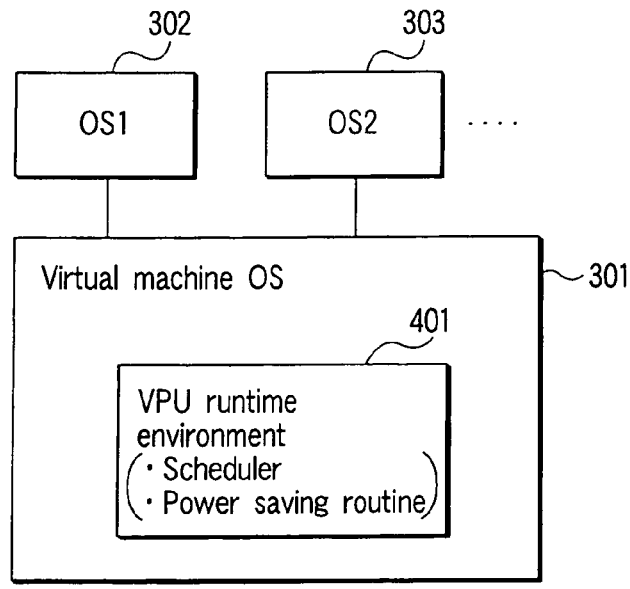
FIG. 24 is a diagram showing an example of VPU runtime environment that is implemented in the virtual machine OS used in the real-time processing system according to the embodiment of the present invention.

The VPU runtime environment 401 also includes a power saving routine for decreasing the operating speed of each VPU. The VPU runtime environment 401 can be implemented in the kernel of the OS 201 or in a user program. It can also be divided into two for the kernel and user program to run in cooperation with each other. When one or more guest OSes run on the virtual machine OS 301, the following modes are provided to implement the VPU runtime environment 401:

1. Mode of implementing the VPU runtime environment 401 in the virtual machine OS 301 (FIG. 24).

Figure 25:
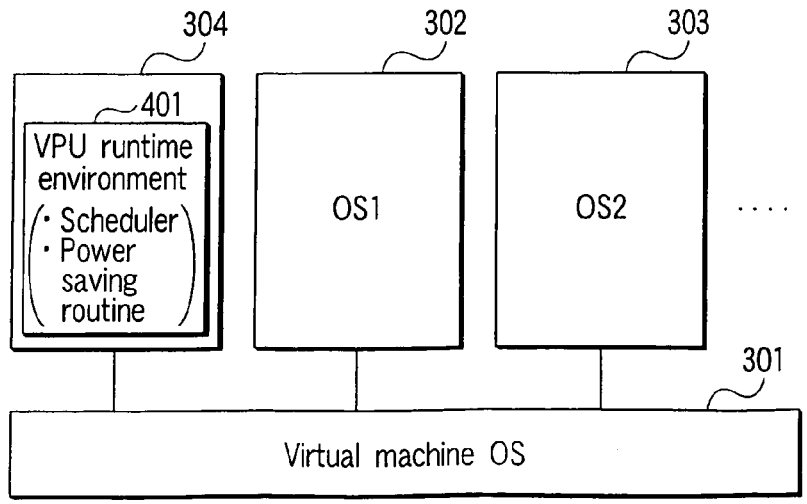
FIG. 25 is a diagram showing an example of VPU runtime environment that is implemented as a guest OS used in the real-time processing system according to the embodiment of the present invention.

2. Mode of implementing the VPU runtime environment 401 as one OS managed by the virtual machine OS 301 (FIG. 25). In FIG. 25, the guest OS 304 running on the virtual machine OS 301 is the VPU runtime environment 401.

Figure 26:
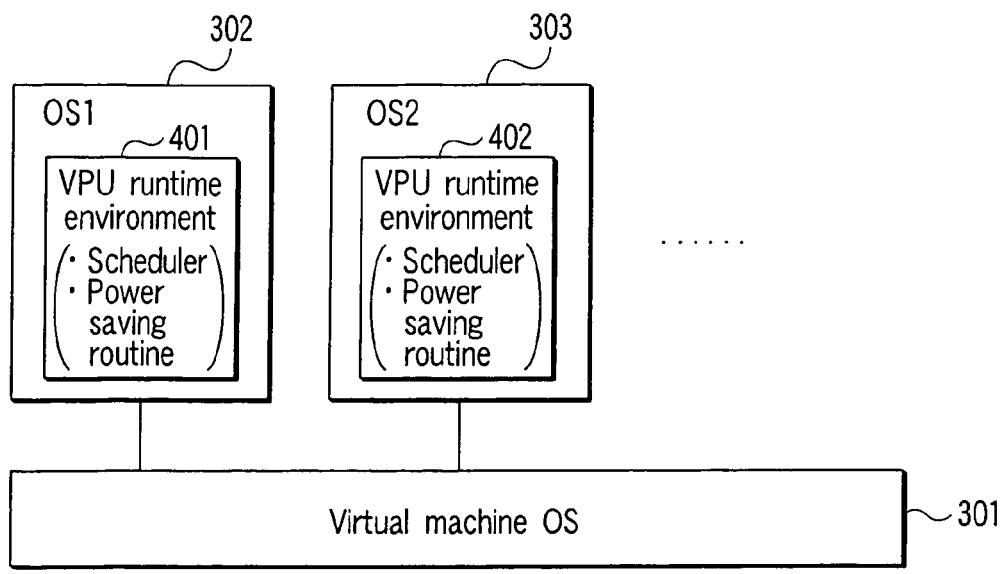
FIG. 26 is a diagram showing an example of VPU runtime environment that is implemented in each of the guest OSes used in the real-time processing system according to the embodiment of the present invention.

3. Mode of implementing a dedicated VPU runtime environment in each of the guest OSes managed by the virtual machine OS 301 (FIG. 26). In FIG. 26, the VPU runtime environments 401 and 402 are implemented in their respective guest OSes 302 and 303. The VPU runtime environments 401 and 402 run in association with each other, if necessary, using a function of communication between the guest OSes provided by the virtual machine OS 301.

Figure 27:
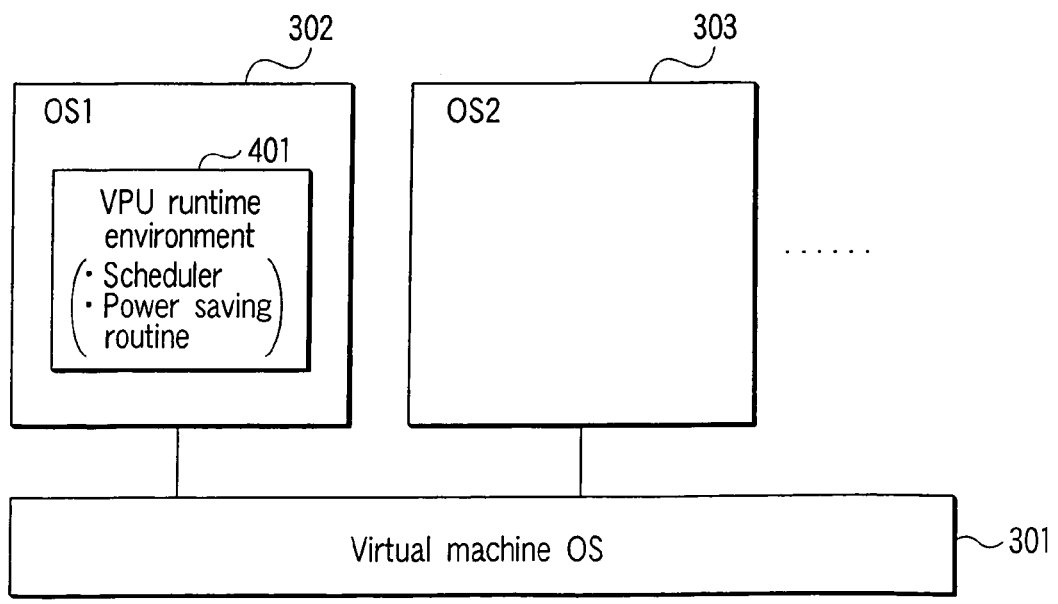
FIG. 27 is a diagram showing an example of VPU runtime environment that is implemented in one guest OS used in the real-time processing system according to the embodiment of the present invention.

4. Mode of implementing the VPU runtime environment 401 in one of the guest OSes managed by the virtual machine OS 301 (FIG. 27). A guest OS 303 having no VPU runtime environment utilizes the VPU runtime environment 401 of a guest OS 302 using a function of communication between the guest OSes provided by the virtual machine OS 301.

The above modes have the following merits:

Merits of Mode 1

The scheduling of a guest OS managed by the virtual machine OS 301 and that of the VPUs can be combined into one. Thus, the scheduling can be done efficiently and finely and the resources can be used effectively; and Since the VPU runtime environment can be shared among a plurality of guest OSes, a new VPU runtime environment need not be created when a new guest OS is introduced.

Merits of Mode 2

Since a scheduler for the VPUs can be shared among guest OSes on the virtual machine OS, the scheduling can be performed efficiently and finely and the resources can be used effectively;

Since the VPU runtime environment can be shared among a plurality of guest OSes, a new VPU runtime environment need not be created when a new guest OS is introduced; and Since the VPU runtime environment can be created without depending upon the virtual machine OS or a specific guest OS, it can be standardized easily and replaced with another. If a VPU runtime environment suitable for a specific embedded device is created to perform scheduling utilizing the characteristics of the device, the scheduling can be done with efficiency.

Merit of Mode 3

Since the VPU runtime environment can optimally be implemented in each guest OS, the scheduling can be performed efficiently and finely and the resources can be used effectively.

Merit of Mode 4

Since the VPU runtime environment need not be implemented in all the guest OSes, a new guest OS is easy to add.

As is evident from the above, all the modes 1 to 4 can be used to implement the VPU runtime environment. Any other modes can be used when the need arises.

Service Provider

In the computer system according to the present embodiment, the VPU runtime environment 401 provides various services (a communication function using a network, a function of inputting/outputting files, calling a library function such as a codec, interfacing with a user, an input/output operation using an I/O device, reading of date and time, etc.) as well as functions of managing and scheduling various resources (operation time of each VPU, a memory, bandwidth of a connection device, etc.) associated with the VPUs 12. These services are called from application programs running on the VPUs 12. If a simple service is called, it is processed by service programs on the VPUs 12. A service that cannot be processed only by the VPUs 12, such as communication processing and file processing, is processed by service programs on the MPU 11. The programs that provide such services are referred to as a service provider (SP).

Figure 28:
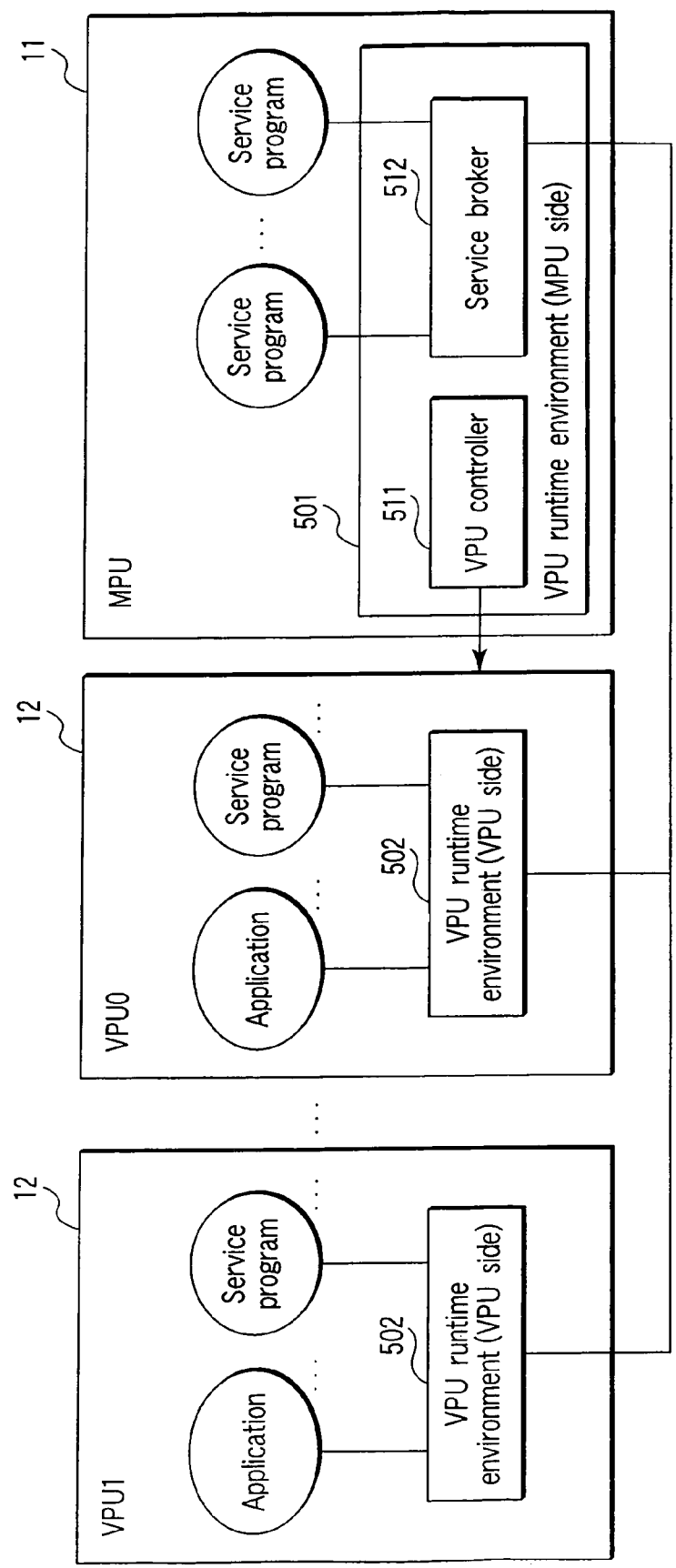
FIG. 28 is an illustration of MPU-side VPU runtime environment and VPU-side VPU runtime environment used in the real-time processing system according to the embodiment of the present invention.

FIG. 28 shows one example of the VPU runtime environment. The principal part of the VPU runtime environment is present on the MPU 11 and corresponds to an MPU-side VPU runtime environment 501. A VPU-side VPU runtime environment 502 is present on each of the VPUs 12 and has only the minimum function of carrying out a service that can be processed in the VPU 12. The function of the MPU-side VPU runtime environment 501 is roughly divided into a VPU controller 511 and a service broker 512. The VPU controller 511 chiefly provides a management mechanism, a synchronization mechanism, a security management mechanism and a scheduling mechanism for various resources (operation time of each VPU, a memory, a virtual space, bandwidth of a connection device, etc.) associated with the VPUs 12. It is the VPU controller 511 that dispatches programs to the VPUs 12 based on the results of scheduling. Upon receiving a service request called by the application program on each VPU 12, the service broker 512 calls an appropriate service program (service provider) and provides the service.

Upon receiving a service request called by the application program on each VPU 12, the VPU-side VPU runtime environment 502 processes only services that are processable in the VPU 12 and requests the service broker 512 to process services that are not processable therein.

Figure 29:
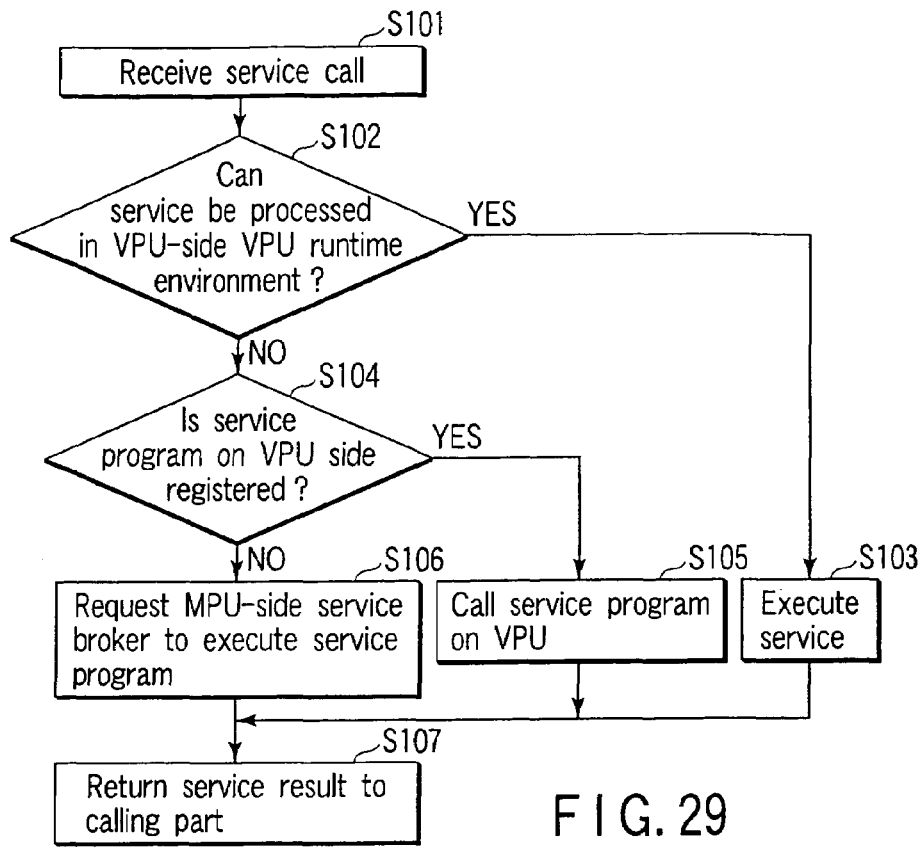
FIG. 29 is a flowchart showing a procedure performed by the VPU-side VPU runtime environment used in the real-time processing system according to the embodiment of the present invention.

FIG. 29 shows a procedure for processing a service request by the VPU-side VPU runtime environment 502. Upon receiving a service call from an application program (step S101), the VPU-side VPU runtime environment 502 determines whether the service can be processed therein (step S102). If the service can be processed, the VPU runtime environment 502 executes the service and returns its result to the calling part (steps S103 and S107). If not, the VPU runtime environment 502 determines whether a service program that can execute the service is registered as one executable on each VPU 12 (step S104). If the service program is registered, the VPU runtime environment 502 executes the service program and returns its result to the calling part (steps S105 and S107). If not, the VPU runtime environment 502 requests the service broker 512 to execute the service program and returns a result of the service from the service broker 512 to the calling part (steps S106 and S107).

Figure 30:
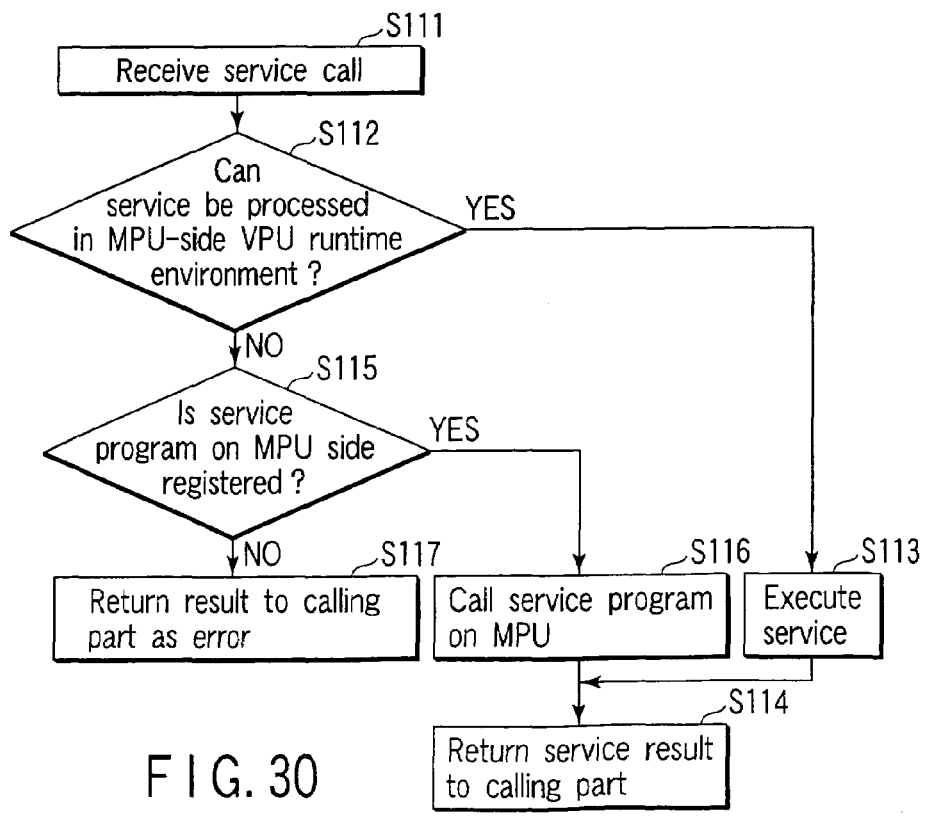
FIG. 30 is a flowchart showing a procedure performed by the MPU-side VPU runtime environment used in the real-time processing system according to the embodiment of the present invention.

FIG. 30 shows a procedure for processing a service that is requested by the VPU-side VPU runtime environment 502 by the service broker 512 of the MPU-side VPU runtime environment 501. Upon receiving a service call from the VPU-side VPU runtime environment 502 (step S111), the service broker 512 determines whether the VPU runtime environment 501 can process the service (step S112). If the service can be processed, the service broker 512 executes the service and returns its result to the VPU-side VPU runtime environment 502 of the calling part (steps S113 and S114). If not, the service broker 512 determines whether a service program that can execute the service is registered as one executable on the MPU 11 (step S114). If the service program is registered, the service broker 512 executes the service program and returns its result to the VPU-side VPU runtime environment 502 of the calling part (steps S116 and S114). If not, the service broker 512 returns an error to the VPU-side VPU runtime environment 502 of the calling part (step S117).

Results reply to some service requests issued from the program to be executed by each VPU 12, and no results reply to other service requests. The destination of the reply is usually a thread that issues a service request; however, another thread, a thread group or a process can be designated as the destination of the reply. It is thus favorable that the destination be included in a message to request a service. The service broker 512 can be realized using a widely used object request broker.

Real-time Operation

The computer system according to the present embodiment serves as a real-time processing system. The operations to be performed by the real-time processing system are roughly divided into the following three types:

1. Hard real-time operation
2. Soft real-time operation
3. Best effort operation (non-real-time operation)

The hard and soft real-time operations are a so-called real-time operation. The real-time processing system of the present embodiment has concepts of both thread and process like a number of existing OSes. First, the thread and process in the real-time processing system will be described.

The thread has the following three classes:

1. Hard Real-time Class

Timing requirements are very important. This thread class is used for such an important application as to cause a grave condition when the requirements are not met.

2. Soft Real-time Class

This thread class is used for an application whose quality simply lowers even if the timing requirements are not met.

3. Best Effort Class

This thread class is used for an application including no timing requirements.

In the present embodiment, the thread is a unit of execution for the real-time operation. The threads have their related programs that are to be executed by the threads. Each of the threads holds its inherent information that is called a thread context. The thread context contains, for example, information of a stack and values stored in the register of the processor.

In the real-time processing system, there are two different threads of MPU and VPU threads. These two threads are classified by processors (MPU 11 and VPU 12) that execute the threads and their models are identical with each other. The thread context of the VPU thread includes the contents of the local storage 32 of the VPU 12 and the conditions of a DMA controller of the memory controller 33.

A group of threads is called a thread group. The thread group has the advantage of efficiently and easily performing, e.g., an operation of giving the same attribute to the threads of the group. The thread group in the hard or soft real-time class is roughly divided into a tightly coupled thread group and a loosely coupled thread group. The tightly coupled thread group and loosely coupled thread group are discriminated from each other by attribute information (coupling attribute information) added to the thread groups. The coupling attribute of the thread groups can explicitly be designated by the codes in the application programs or the above-described structural description.

The tightly coupled thread group is a thread group that is made up of threads running in cooperation with each other. In other words, the threads belonging to the tightly coupled thread group tightly collaborate with each other. The tightly collaboration implies an interaction such as frequent communication and synchronization between threads or an interaction that decreases in latency. The threads belonging to the same tightly coupled thread group are always executed simultaneously. On the other hand, the loosely coupled thread group is a thread group that obviates a tightly collaboration between threads belonging to the group. The threads belonging to the loosely coupled thread group carry out communications for transferring data through the buffer on the memory 14.

Tightly Coupled Thread Group

As shown in FIG. 31, different VPUs are allocated to the threads of the tightly coupled thread group and the threads are executed at the same time. These threads are called tightly coupled threads. The execution terms of the tightly coupled threads are reserved in their respective VPUs, and the tightly coupled threads are executed at the same time. In FIG. 31, a tightly coupled thread group includes two tightly coupled threads A and B, and the threads A and B are executed at once by the VPU0 and VPU1, respectively. The real-time processing system of the present embodiment ensures that the threads A and B are executed at once by different VPUs. One of the threads can directly communicate with the other thread through a local storage or control register of the VPU that executes the other thread.

FIG. 32 illustrates communication between threads A and B, which is performed through the local storages of VPU0 and VPU1 that execute the threads A and B, respectively. In the VPU0 that executes the thread A, an RA space corresponding to the local storage 32 of the VPU1 that executes the thread B is mapped in part of an EA space of the thread A. For this mapping, an address translation unit 331 provided in the memory controller 33 of the VPU0 performs address translation using a segment table and page table. The address translation unit 331 converts (translates) a part of the EA space of the thread A to the RA space corresponding to the local storage 32 of the VPU1, thereby to map the RA space corresponding to the local storage 32 of the VPU1 in part of the EA space of the thread A. In the VPU1 that executes the thread B, an RA space corresponding to the local storage 32 of the VPU0 that executes the thread A is mapped in part of an EA space of the thread B. For this mapping, an address translation unit 331 provided in the memory controller 33 of the VPU1 performs address translation using the segment table and page table. The address translation unit 331 converts a part of the EA space of the thread B to the RA space corresponding to the local storage 32 of the VPU0, thereby to map the RA space corresponding to the local storage 32 of the VPU0 in part of the EA space of the thread B.

FIG. 33 shows mapping of local storage (LS1) 32 of the VPU1 executing the thread B in the EA space of the thread A executed by the VPU0 and mapping of local storage (LS0) 32 of the VPU0 executing the thread A in the EA space of the thread B executed by the VPU1. For example, when data to be transferred to the thread B is prepared on the local storage LS0, the thread A sets a flag indicative of this preparation in the local storage LS0 of the VPU0 or the local storage LS1 of the VPU1 that executes the thread B. In response to the setting of the flag, the thread B reads the data from the local storage LS0.

According to the present embodiment described above, tightly coupled threads can be specified by the coupling attribute information, and the tightly coupled threads A and B are sure to be executed at once by different VPUs, respectively. Thus, an interaction of communication and synchronization between the threads A and B can be performed more lightly without delay.

Loosely Coupled Thread Group

The execution term of each of threads belonging to the loosely coupled thread group depends upon the relationship in input/output between the threads. Even though the threads are subject to no constraints of execution order, it is not ensured that they are executed at the same time. The threads belonging to the loosely coupled thread group are called loosely coupled threads. FIG. 34 shows a loosely coupled thread group including two threads C and D as loosely coupled threads, which are executed by their respective VPU0 and VPU1. The threads C and D differ in execution term as is apparent from FIG. 34. Communication between the threads C and D is carried out by the buffer prepared on the main memory 14 as shown in FIG. 35. The thread C executed by the VPU0 writes data, which is prepared in the local storage LS0, to the buffer prepared on the main memory 14 by DMA transfer. The thread D executed by the VPU1 reads data from the buffer on the main memory 14 and writes it to the local storage LS1 by DMA transfer when the thread D starts to run.

Process and Thread

As shown in FIG. 36, a process includes one address space and one or more threads. The threads can be included in the process regardless of their number and type. For example, only VPU threads can be included in the process and so can be a mixture of VPU and MPU threads. As a thread holds a thread context as its inherent information, a process holds a process context as its inherent information. The process context contains both an address space inherent in the process and thread contexts of all threads included in the process. The address space can be shared among all the threads of the process. One process can include a plurality of thread groups, but one thread group cannot belong to a plurality of processes. Thus, a thread group belonging to a process is inherent in the process.

In the real-time processing system of the present embodiment, there are two models of a thread first model and an address space first model as method for creating a new thread. The address space first model is the same as that adopted in the existing OS and thus can be applied to both the MPU and VPU threads. On the other hand, the thread first model can be applied only to the VPU threads and is peculiar to the real-time processing system of the present embodiment. In the thread first model, the existing thread (which is one for creating a new thread, i.e., a parent thread of the new thread) first designates a program to be executed by a new thread and causes the new thread to start to execute the program. The program is then stored in the local storage of the VPU and starts to run from a given address. Since no address space is related to the new thread at this time, the new thread can gain access to the local storage of the VPU and not to the memory 14. After that, when the need arises, the new thread in itself calls a service of VPU runtime environment and creates an address space. The address space is related to the new thread, and the new thread can gain access to the memory 14. In the address space first model, the existing thread creates a new address space or designates the existing address space, and arranges program, which is to execute by the new thread, in the address space. Then, the new thread starts to run the programs. The merit of the thread first model is that a thread can be executed only by the local storage to reduce overhead costs required for generating, dispatching and exiting the thread.

Scheduling of Threads

Figure 37:
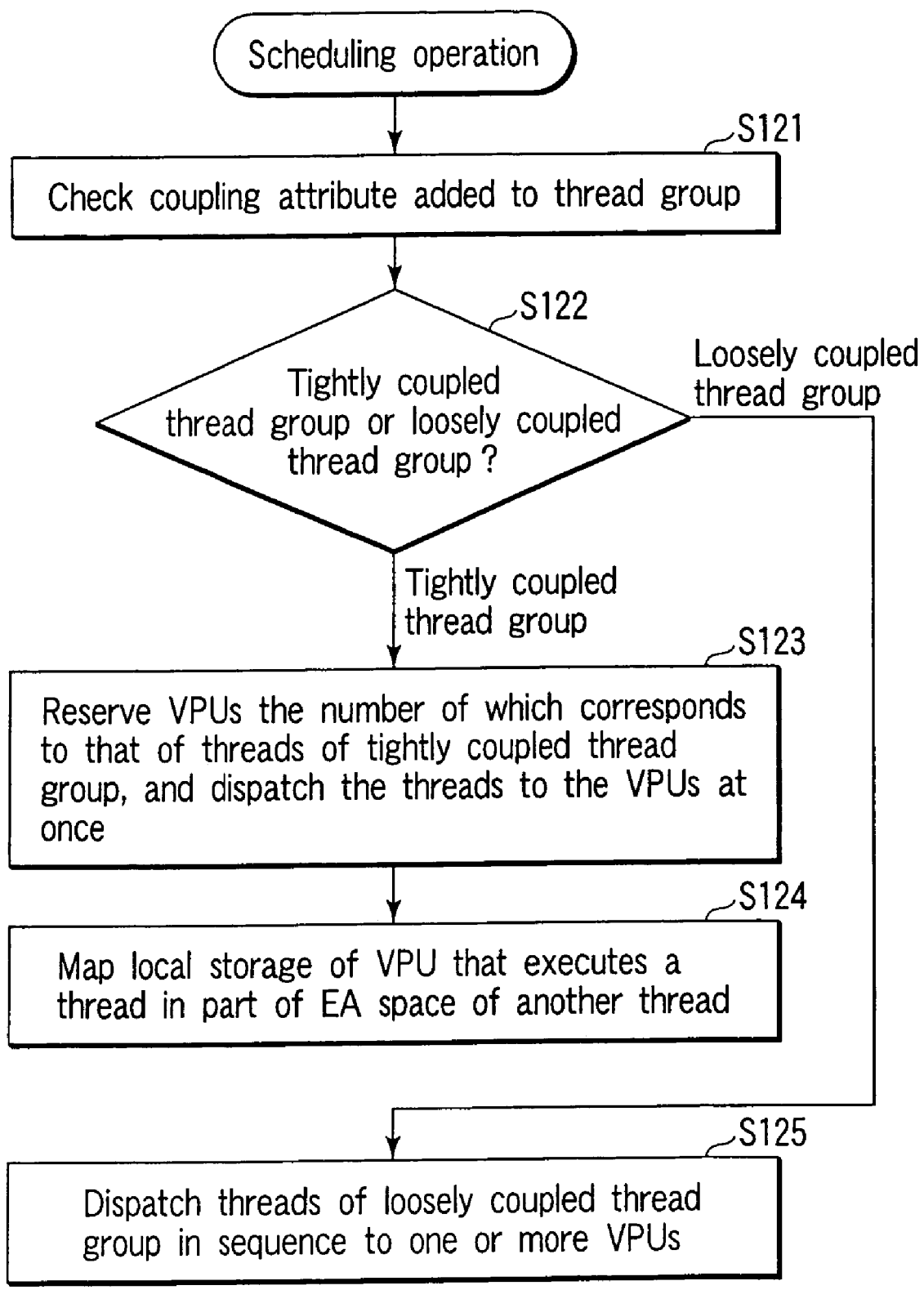
FIG. 37 is a flowchart showing a procedure for performing a scheduling operation in the real-time processing system according to the embodiment of the present invention.

A scheduling operation performed by the VPU runtime environment 401 will now be described with reference to the flowchart shown in FIG. 37. The scheduler in the VPU runtime environment 401 checks a coupling attribute between threads based on coupling attribute information added to each group of threads to be scheduled (step S121). The scheduler determines whether each thread group is a tightly coupled thread group or a loosely coupled thread group (step S122). The coupling attribute is checked referring to the descriptions of threads in program codes or thread parameters in the above structural description 117. If the tightly and loosely coupled thread groups are each specified, the threads to be scheduled are separated into the tightly and loosely coupled thread groups.

The scheduling of threads belonging to the tightly coupled thread group is performed as follows. In order to execute threads of a tightly coupled thread group, which are selected from the threads to be scheduled, by their respective VPUs at once, the scheduler in the VPU runtime environment 401 reserves an execution term of each of the VPUs, whose number is equal to that of the threads, and dispatches the threads to the VPUs at once (step S123). The scheduler maps an RA space in part of an EA space of a thread using the address translation unit 331 in a VPU that executes the thread (step S124), the RA space corresponding to the local storage of a VPU that executes a partner thread interacting with the former thread. As for the threads belonging to the loosely coupled thread group which are selected from the threads to be scheduled, the scheduler dispatches the threads in sequence to one or more VPUs based on the relationship in input/output between the threads (step S125).

If a tightly coupled thread group, which is a set of threads running in cooperation with each other, is selected based on the coupling attribute information, it can be ensured that the threads belonging to the tightly coupled thread group are executed at once by different processors. Consequently, communication between threads can be achieved by a lightweight mechanism of gaining direct access to, e.g., the registers of processors that execute their partner threads each other. The communication can thus be performed lightly and quickly.

State Transition of Threads

Figure 38:
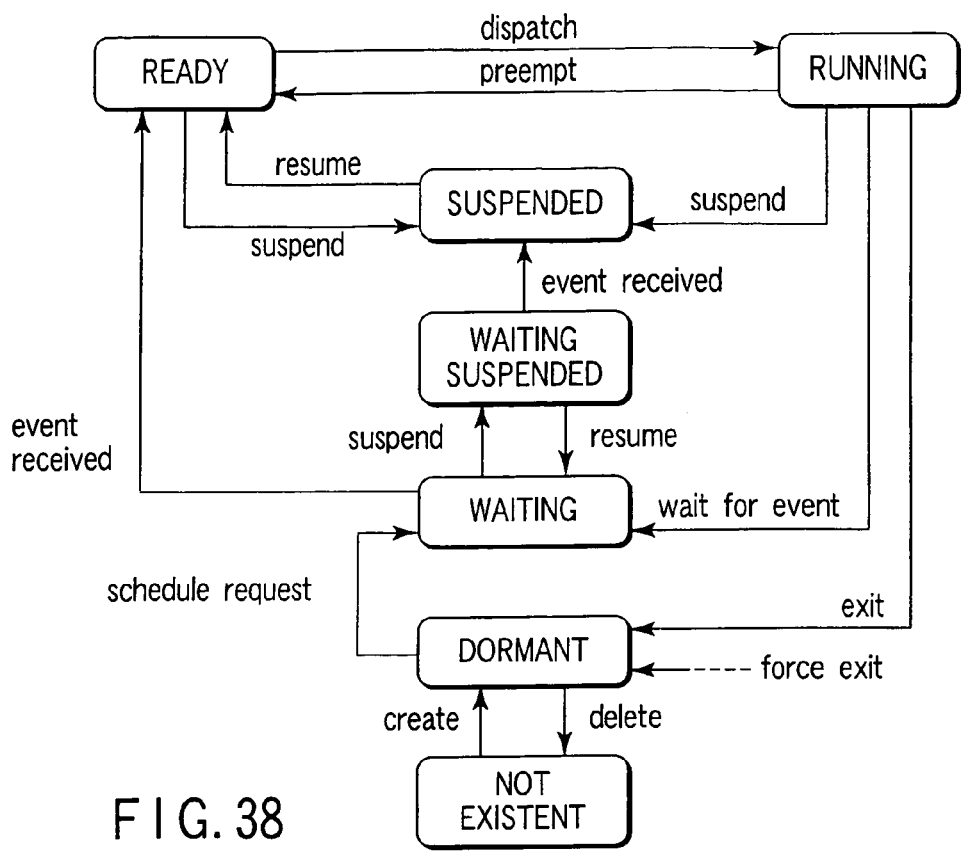
FIG. 38 is a diagram showing a state transition of threads in the real-time processing system according to the embodiment of the present invention.

A thread generally makes a state transition from when it is created until it is deleted. As shown in FIG. 38, a thread makes the following seven state transitions.

1. Not-existent state: This state is logical and does not exist in an effective thread.
2. DORMANT state: A thread is created and does not start running yet.
3. READY state: The thread is ready to start running.
4. WAITING state: The thread waits for conditions to meet to start (resume) running.
5. RUNNING state: The thread is actually running on the VPU or MPU.
6. SUSPENDED state: The thread is forcibly suspended by the VPU runtime environment and other threads.
7. WAITING-SUSPENDED state: The waiting and suspended states overlap each other.

The conditions of transition between the above seven states and the thread contexts involved in the transition are as follows.

[Transition from NOT EXISTENT State to DORMANT State]

This transition is made by creating a thread.

A thread context is created but its contents are in the initial state.

[Transition from DORMANT State to NOT EXISTENT State]

This transition is made by deleting a thread.

If the thread is set to store its thread context, the stored thread context is discarded by the transition.

[Transition from DORMANT State to WAITING State]

This transition is made when the thread requests the runtime environment to schedule the thread.

[Transition from WAITING State to READY State]

This transition is made when an event (e.g., synchronization, communication, timer interruption) for which the thread waits is generated.

[Transition from READY State to RUNNING State]

This transition is made when the thread is dispatched to MPU or VPU by the runtime environment.

The thread context is loaded. When the thread context is saved, it is restored.

[Transition from RUNNING State to READY State]

This transition is made when the running of the thread is preempted.

[Transition from RUNNING State to WAITING State]

This transition is made when the thread suspends its own running to wait for an event using a synchronization mechanism, a communication mechanism and the like.

The thread in every class can be set to store its thread context. When a thread is set to store its thread context, the thread context is saved by the runtime environment when the thread transits from RUNNING state to WAITING state. The saved thread context is maintained unless the thread transits to DORMANT state and restored when the thread transits to the RUNNING state.

[Transition from RUNNING State to SUSPENDED State]

This transition is made when the running of the thread is forcibly suspended in response to an instruction from the runtime environment or other threads.

The thread in every class can be set to store its thread context. When a thread is set to store its thread context, the thread context is saved by the runtime environment when the thread transits from RUNNING state to SUSPENDED state. The saved thread context is maintained unless the thread transits to DORMANT state and restored when the thread transits to the RUNNING state.

[Transition from RUNNING State to DORMANT State]

This transition is made when the thread in itself exits its own running.

When the thread is set to store its thread context, the contents of the thread context are discarded by the transition.

[Transition from WAITING State to WAITING-SUSPENDED State]

This transition is made when the thread is forced to stop by instruction from outside while it is waiting for an event to generate in the WAITING state.

[Transition from WAITING-SUSPENDED State to WAITING State]

This transition is made when the thread resumes running by instruction from outside while it is in the WAITING-SUSPENDED state.

[Transition from WAITING-SUSPENDED State to SUSPENDED State]

This transition is made when the event for which the thread waits in the WAITING state is generated.

[Transition from SUSPENDED State to READY State]

This transition is made when the thread resumes running by instruction from outside.

[Transition from READY State SUSPENDED State]

This transition is made when the thread stops running by external environment.

Execution Term of Thread

Figure 39:
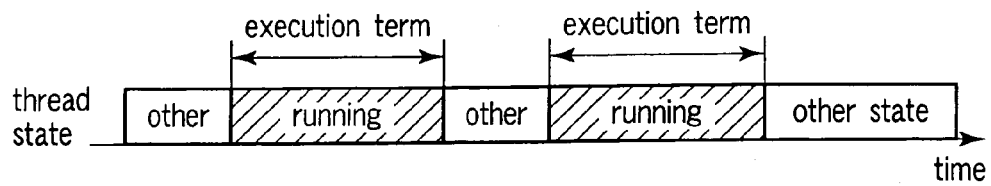
FIG. 39 is a chart illustrating a relationship between a thread and its execution terms in the real-time processing system according to the embodiment of the present invention.

The term of the running state of a thread to which a VPU is allocated is called an execution term. In general, a term from creation to deletion of a thread includes a plurality of execution terms of the thread. FIG. 39 shows an example of thread states varied from creation to deletion. This example includes two execution terms during the presence of the thread. The thread context can be saved and restored using various methods. Most normal threads run so as to save a context at the end of an execution term and restore the context at the beginning of the next execution term. In a certain periodic operation, the thread run so as to create a new context at the beginning of an execution term, use the context during the execution term, and discard the context at the end of the execution term in every period.

Execution Term of Threads belonging to Tightly Coupled Thread Group

Figure 40:
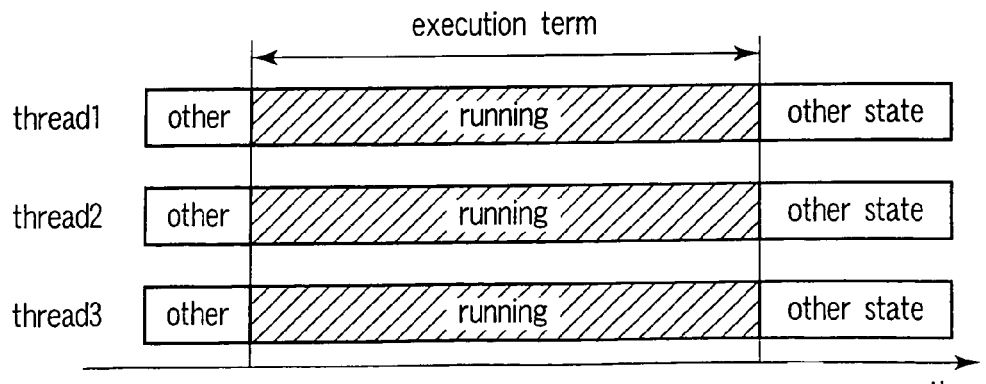
FIG. 40 is a chart of tightly coupled threads running at once in an execution term in the real-time processing system according to the embodiment of the present invention.

FIG. 40 shows execution terms of threads belonging to the same tightly coupled thread group. All the threads belonging to a certain tightly coupled thread group are scheduled by the VPU runtime environment 401 such that they can run at once in one execution term. This tightly coupled thread group is used chiefly for hard real-time threads. In order to achieve the operation, therefore, the VPU runtime environment 401 designates processors used at once and their number when an execution term is reserved for the hard real-time class. Moreover, the VPU runtime environment 401 makes contexts of threads running at once correspondent to the processors, respectively.

The threads, which belonged to the tightly coupled thread group in a certain execution term, can run separately from each other in other execution term by canceling their tightly coupled relationship. Each of the threads has to sense whether it runs as a tightly coupled thread or separately from another thread and perform an operation of communication and synchronization with its partner thread. Each of the threads is provided with an attribute that indicates preemptive or non-preemptive. The preemptive attribute permits a thread to be preempted during its execution term and, in other words, permits the thread to stop running. The non-preemptive attribute ensures that a thread cannot be preempted during its execution term. The non-preemptive attribute varies in meaning from thread class to thread class. In the hard real-time class, when a thread starts to run, nothing but the thread in itself can stop the running until its execution term ends. In the soft real-time class, preemptiveness is essential and thus the non-preemptive attribute is not supported. In the best effort class, a thread can be protected against being preempted from another best effort class, but it can be preempted from a higher-level class such as the hard real-time class and soft real-time class.

Execution Models of Threads

The execution models of threads can roughly be classified into two models: a periodic execution model as shown in FIG. 41 and an aperiodic execution model as shown in FIG. 42. In the periodic execution model, a thread is executed periodically. In the aperiodic running model, a thread is executed based on an event. The periodic execution model can be implemented using a software interrupt or an event object such as synchronization primitives. In the hard real-time class, the periodic execution model is implemented using a software interrupt. In other words, the VPU runtime environment 401 jumps to an entry point of a thread determined by a given method with timing to start a periodic operation or calls a callback function registered in advance by a given procedure. In the soft real-time class, the periodic execution model is implemented using an event object. In other words, since the VPU runtime environment 401 notifies a generation of a previously-registered event object in each period, a soft real-time thread waits an event object in each period, and perform a given operation upon generation of the event, thereby realizing a periodic execution model. In the best effort class, the periodic execution model can be implemented using either one of a software interrupt or an event object. The actual execution does not always start at the beginning of each period, but may be delayed within constraints.

Using an event model, the aperiodic execution model can be realized as the periodic execution model. In the soft real-time class and best effort class, the aperiodic execution model differs from the periodic execution model only in the timing with which an event is notified and these models are the same in the implementing method. In the hard real-time class, the minimum inter-arrival time and the dead line, which are necessary for securing time requirements, strongly constrain the operation of the system; accordingly, the aperiodic execution is restricted.

Context Switching

In the real-time processing system according to the present embodiment, one of methods for switching a context at the end of the execution term of a VPU thread can be selected. Since the costs for switching the context are very high, the selection of one method improves the efficiency of switching. The selected method is used at the end of the reserved execution term of a thread. When a context is switched during the execution term or at the time of preemption, all contexts of the current thread need to be saved in whatever case and restored when the thread resumes running next. For example, there are following methods of switching a VPU context.

1. Discard of Contexts

No contexts are saved.

2. Complete Saving of Contexts

All contexts of a VPU, including the states of the register and local storage of the VPU and those of the DMA controller in the memory controller, are saved.

3. Graceful Saving of Contexts

The context switching is delayed until all operations of the DMA controller in the memory controller in a VPU are completed. After that, the contents of the register and local storage in the VPU are saved. In this method, all the contexts of the VPU as well as the complete saving are saved.

One scheduler can be implemented to schedule both MPU and VPU threads and different schedulers can be done to schedule their respective MPU and VPU threads. Since the MPU and VPU threads differ in costs for switching a context, the implementation of different schedulers becomes more efficient.

Scheduling in Hard Real-Time Class

The scheduling of threads in the hard real-time class is performed using a reservation graph of an extended task graph. FIG. 43 shows an example of the task graph. The task graph represents a relationship between tasks. In FIG. 43, the arrows between tasks indicate the dependence of the tasks (relationship in input/output between the tasks). According to the example of FIG. 43, tasks 1 and 2 can freely start to run, a task 3 can start to run after both the tasks 1 and 2 stop running, and tasks 4 and 5 can start to run after the task 3 stops running. The task graph has no concepts of contexts. For example, when the tasks 1 and 4 should be processed using the same context, it cannot be described in the task graph. The following reservation graph of the extended task graph is therefore used in the real-time processing system of the present embodiment.

Figure 45:
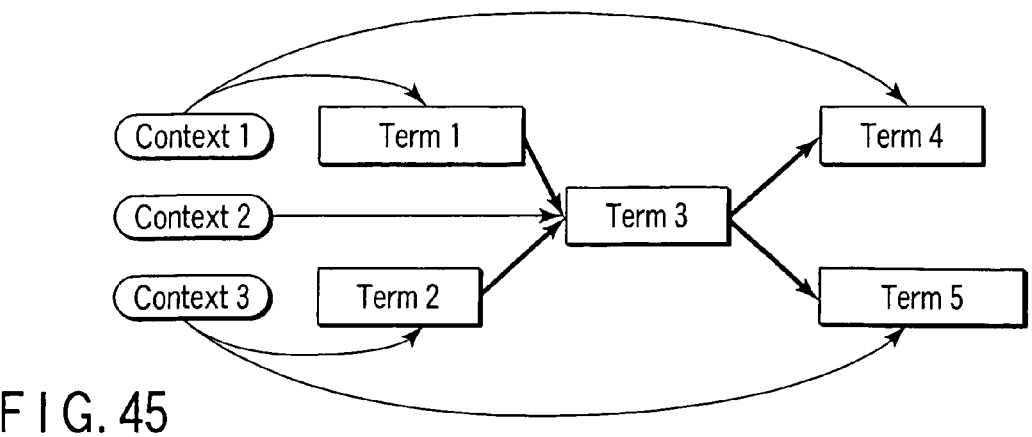
FIG. 45 is an illustration of an example of a reservation graph used in the real-time processing system according to the embodiment of the present invention.

First, consider the task graph to be a relationship between not tasks but execution terms. By relating a context to each of the execution terms, a thread corresponding to the context runs in the execution term. If the same context is related to a plurality of execution terms, its corresponding thread runs in each of the execution terms. In the example shown in FIG. 44, the context of thread 1 is related to execution terms 1 and 2, and the thread 1 runs in each of the execution terms 1 and 2. An attribute indicative of constraints of hard real-time ensured by the runtime environment is added to each of arrows between the execution terms. Using a reservation graph so created, operation models and constraints such as time requirements of a real-time application can be described without making any modifications to the model of the real-time application. FIG. 45 shows an example of the reservation graph created based on the graph shown in FIG. 44. Contexts 1, 2 and 3 in FIG. 45 correspond to those of threads 1, 2 and 3 in FIG. 44, respectively.

Scheduling in Soft Real-Time Class

The scheduling of threads in the soft real-time class is performed using a fixed priority scheduling method in order to allow the running patterns of threads to be predicted. Two different scheduling algorithms are prepared for the scheduling method: one is fixed priority FIFO scheduling and the other is fixed priority round robin scheduling. In order to execute a higher-priority thread by priority, even while a lower-priority thread is running, the lower-priority thread is preempted and immediately the higher-priority thread starts to run. In order to avoid a priority inversion problem that occurs in a critical section, it is desirable to perform a synchronization mechanism such as a priority inheritance protocol and a priority ceiling protocol.

Scheduling in Best Effort Class

The scheduling of threads in the best effort class is performed using dynamic priority scheduling and the like.

Hierarchical Scheduler

Figure 46:
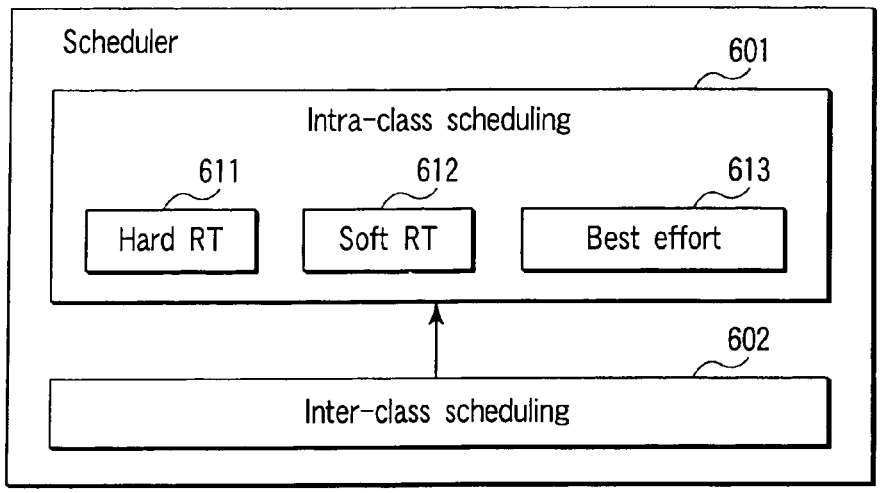
FIG. 46 is a diagram illustrating a hierarchical scheduler used in the real-time processing system according to the embodiment of the present invention.

The scheduling function in the VPU runtime environment 401 can be fulfilled as a hierarchical scheduler as shown in FIG. 46. In other words, thread-level scheduling has two hierarchies of thread inter-class scheduling and thread intra-class scheduling. Thus, the scheduler in the VPU runtime environment 401 has a thread intra-class scheduling section 601 and a thread inter-class scheduling section 602. The thread inter-class scheduling section 602 schedules threads spreading over thread classes. The thread intra-class scheduling section 601 schedules threads belonging to each of thread classes. The section 601 includes a hard real-time (hard RT) class scheduling section 611, a soft real-time (soft RT) class scheduling section 612 and a best effort class scheduling section 613.

The thread inter-class scheduling and thread intra-class scheduling have a hierarchical structure. First, the thread inter-class scheduling operates to determine which thread class is executed and then which thread in the thread class is executed. The thread inter-class scheduling employs preemptive fixed priority scheduling. The hard real-time class has the highest priority, with the soft real-time class and the best effort class following in that order. When a thread in a higher-priority class is ready to run, a lowest-priority thread is preempted. Synchronization between thread classes is achieved by a synchronous primitive provided by the VPU runtime environment 401. In particular, only the primitive can be used in a hard real-time thread to prevent a block from occurring in the hard real-time thread. When a best effort thread blocks a soft real-time thread, it is processed as a soft real-time thread to prevent priority from being inverted between thread classes. Furthermore, the use of, e.g., the priority inheritance protocol prevents another soft real-time thread from blocking the best effort thread.

Thread Parameters

In the real-time processing system according to the present embodiment, threads are scheduled using various parameters. The parameters common to the threads in each class are as follows:

Class of threads (hard real-time, soft real-time, best effort);
Resources for use (number of MPUs or VPUs, bandwidth, physical memory size, I/O device);
Priority; and
Preemptive or non-preemptive.

The following are parameters for the threads in the hard real-time class:

Execution term;
Dead line;
Period or minimum inter-arrival time; and
VPU context switching method.

Figure 47:
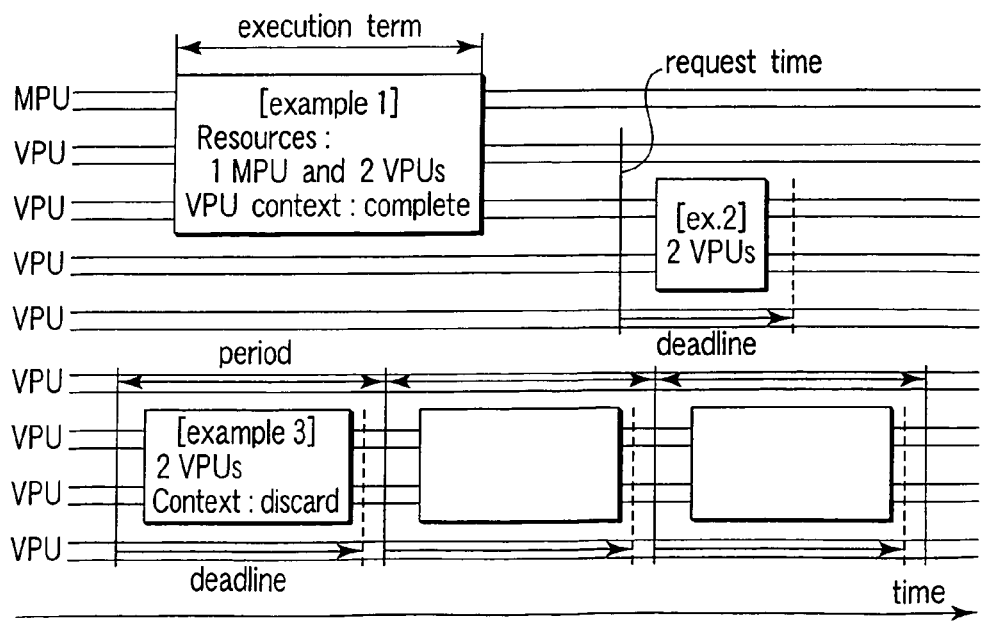
FIG. 47 is a chart illustrating examples of parameters used for scheduling in the hard real-time class by the real-time processing system according to the embodiment of the present invention.

FIG. 47 shows examples of fundamental parameters for the hard real-time class. In example 1 to designate an execution term shown in the uppermost part of FIG. 47, one MPU and two VPUs are reserved at once in the designated execution term, and the context of each of the VPUs is completely saved. In this case, the threads run at the same time on the three processors and, after the execution term, the contexts of VPU threads as well as that of an MPU thread are completely saved. In the upper right of FIG. 55, example 2 shows a method of designating a deadline to ensure that an operation represented by the number of VPUs and their execution term is performed before the deadline. The deadline is designated by relative time starting at the request time when a reservation request is made. In the lowermost part of FIG. 41, example 3 shows a method of designating a periodic execution. In this example, an execution term that designates two VPUs 12 is periodically repeated, and the contexts of VPU threads are discarded after the execution term for each period, with the result that all operations are performed by new contexts. Moreover, the deadline is designated by relative time starting at the beginning of the period.

For example, there are following constraints as other parameters used in the hard real-time class:

Timing constraints (absolute timing constraint and relative timing constraint);
Precedence constraint; and
Mutual exclusive constraint.

The timing constraints provide a unit which delays execution timing. The absolute timing constraint is a condition for designating delay time with reference to static timing, such as the start time of a period, as shown in FIG. 48. The relative timing constraint is a condition for designating permissible delay time with reference to dynamic timing and an event, such as the start time and end time of a certain, as shown in FIG. 49. Since the precedence constraint can be achieved by designating delay time as 0 or longer with reference to the end time of a certain execution term using the relative timing constraint, it can be considered to be a special one for the relative timing constraint.

The mutual exclusive constraint is a condition for ensuring that execution terms do not overlap each other, as shown in FIG. 50. The mutual exclusive constraint makes it possible to lessen the prediction impossibility of the execution term, which is caused by a lock. In other words, all threads common to some resources are prevented from running at once to obviate a lock regarding the resources.

Synchronization Mechanisms for Threads

In the real-time processing system according to the present embodiment, the following synchronous primitives are used as synchronization mechanisms for threads:

Semaphore;
Message queue;
Message buffer;
Event flag;
Barrier; and
Mutex.

The other synchronous primitives can be used. The real-time processing system of the present embodiment provides the following three methods to achieve the above synchronization mechanisms:

The synchronization mechanisms are implemented on the memory (main storage) 14 or the local storage 32 of a VPU using an instruction such as a TEST & SET;

The synchronization mechanisms are implemented by hardware mechanisms such as a mail box and a signal register; and The synchronization mechanisms are implemented using a mechanism provided as a service by the VPU runtime environment.

Since the synchronization mechanisms have advantages and disadvantages, it is desirable to selectively use them according to the attributes of threads as shown in FIG. 51. In other words, a synchronization mechanism implemented using the memory (main storage MS) 14 that is shared and accessed by the MPU and VPUs can be used for threads in all classes. In contrast, a synchronization mechanism implemented on the local storage LS of a VPU 12 can be used only for threads belonging to the tightly coupled thread group. This is because only the threads belonging to the tightly coupled thread group ensure that their partner threads for synchronization run at the same. For example, if a thread belonging to the tightly coupled thread group is used for a synchronization mechanism implemented on the local storage of a VPU that executes the partner thread, the execution of the partner thread is ensured when the synchronization mechanism is used. Thus, the local storage of the VPU that executes the partner thread always stores information for the synchronization mechanism.

A synchronization mechanism using a unit other than the memory (main storage MS) and local storage LS can be implemented by a hardware mechanism or a service of the VPU runtime environment 401. Since the threads belonging to the tightly coupled thread or those in the hard real-time class require a high-speed synchronization mechanism, the synchronization mechanism implemented by the hardware mechanism is desirable to use in the threads. In contrast, the synchronization mechanism provided by the runtime environment is desirable to use in the threads belonging to the loosely coupled thread group or those belonging to the soft real-time class and best effort class.

Automatic Selection of Synchronization Mechanism

In the real-time processing system according to the present embodiment, the above synchronization mechanisms can automatically be selected or switched in accordance with the attribute and status of threads. This operation is performed by a procedure as shown in FIG. 52. While threads for synchronization belong to the tightly coupled thread group (YES in step S201), a high-speed synchronization mechanism that is implemented by the memory 14, the local storage 32 of each VPU 12 or the hardware mechanism is used (steps S202, S203, S204, S205). When the threads change in status to cancel their tightly coupled relationship (NO in step S201), the high-speed synchronization mechanism is switched to a synchronization mechanism that is implemented as a synchronization mechanism on the memory 14 or a service of the VPU runtime environment 401 (steps S206, S207, S208).

The above switching can be provided for programs running on the VPUs 12 in the form of a library or as a service of the VPU runtime environment 502 in each of the VPUs 12. A plurality of synchronization mechanisms can be switched as follows. The synchronization mechanisms can be secured in advance and used selectively or new synchronization mechanisms can be secured when the switching is performed.

For a synchronization mechanism using local storages of VPUs 12, threads needs to be executed at once by the VPUs like threads belonging to the tightly coupled thread group. This constraint is eased as follows. While a thread is not running, the contents of the local storage are stored in the memory 14 when the thread runs last, and mapping is so controlled that the stored contents are indicated by the entries of the page table or segment table indicating the local storage. According to this method, while the partner thread is not running, the thread can continue running as if there is a local storage related to the partner thread. When the thread starts to run by allocating a VPU 12 thereto, the contents stored in the memory 14 are restored to the local storage of the VPU 12 to change the mapping of a corresponding page table or segment table. Using a backup copy of the local storages of the VPUs 12, the synchronization mechanism using the local storages of VPUs 12 can be used even for threads that do not belong to the tightly coupled thread group.

Reservation Graph

FIG. 53 shows a reservation graph corresponding to the data flow shown in FIG. 9. In FIG. 53, six boxes represent execution terms. The upper left number on each of the boxes indicates the ID of an execution term to be reserved. The symbol in each box indicates the identifier of a thread context related to the execution term. The lower right number on each box indicates the length (cost) of the execution term. The arrows connecting the boxes all denote precedence constraints. In other words, an arrow extending from one box to another box indicates that an operation in the execution term of the latter box starts after an operation in that of the former box is completed. A chain of execution terms can thus be represented. The number with each arrow denotes an ID of a buffer used for data transfer between execution terms connected by the arrow, and the value with each number denotes the size of a buffer. The following are procedures 1 to 7 for performing operations in accordance with the reservation graph shown in FIG. 53.

1. Create a thread context that executes the DEMUX program 111 and call its identifier DEMUX.
2. Create a thread context that executes the A-DEC program 112 and call its identifier A-DEC.
3. Create a thread context that executes the V-DEC program 113 and call its identifier V-DEC.
4. Create a thread context that executes the TEXT program 114 and call its identifier TEXT.
5. Create a thread context that executes the PROG program 115 and call its identifier PROG.
6. Create a thread context that executes the BLEND program 116 and call its identifier BLEND.
7. Create a reservation request having a data structure as shown in FIG. 54 and sends it to the VPU runtime environment 401 to make a reservation.

According to each of the above procedures 1 to 6, if a program is designated to run as a thread, the VPU runtime environment 401 assigns necessary resources to the program to create a thread context. The handle of the thread context is returned and thus referred to as an identifier.

FIG. 54 shows a reservation request containing buffer data written as BUFFER and execution term data written as TASK. The buffer data is used to declare a buffer on the memory 14 for data transfer between execution terms. In the buffer data, "Id" indicates buffer number, "Size" indicates buffer size, "SrcTask" shows execution term number that writes data and "DstTask" shows execution term number that reads data. In the execution term data, "Id" represents execution term number, "Class" indicates thread class (VPU shows VPU thread and HRT shows hard real-time class. In addition to these, there are MPU showing MPU thread, SRT showing soft real-time class, BST showing best effort class and so on), "ThreadContext" denotes thread context corresponding to the execution term, "Cost" indicates length or cost of the execution term, "Constraint" represents various constraints based on the execution term, "InputBuffer" shows a list of identifiers of buffers read in the execution term and "OutputBuffer" indicates a list of identifiers of buffers written in the execution term. The "Constraint" also can include "Precedence" showing precedence constraint, "Absolute Timing" showing absolute timing constraint, "Relative Timing" showing relative timing constraint and "Exclusive" showing mutual exclusive constraint. The "Constraint" has a list of numbers of execution terms of partner threads for constraints.

The buffer area reserved by the reservation request shown in FIG. 54 is allocated to the main memory 14 and released therefrom by the VPU runtime environment 401. The allocation of the buffer area is performed when a thread that writes data to the buffer area starts to run. The release of the buffer area is performed when a thread that reads data from the buffer area exits. The thread can be notified of the address of the allocated buffer using an address, a variable or a register that is predetermined when the thread starts to run. In the real-time processing system of the present embodiment, when the program module 100 shown in FIG. 7 is provided, the structural description 117 shown in FIG. 8 is read out of the program module 100 and, based on the structural description 117, a thread context is created by the above procedures and a reservation request as shown in FIG. 54 is created and issued, thereby providing a function of executing the program module 100. This function allows the operation of dedicated hardware described by the program module 100 as shown in FIG. 7 to be performed by processing software by a plurality of processors. A program module having a structure as shown in FIG. 7 is created for each hardware to be implemented and then executed by an apparatus having a function conforming to the real-time processing system of the present embodiment, with the result that the apparatus can be operated as desired hardware. As another example, an operation of creating the reservation request shown in FIG. 54 is described in the application program, and the application program can create a reservation request by itself and transfer it to the VPU runtime environment 401.

Providing the reservation request shown in FIG. 54, the VPU runtime environment 401 determines which VPU 12 executes each task with which timing in a period. This is scheduling. Actually, a plurality of reservation requests can be provided at once; therefore, operation timing is determined to prevent them from contradicting each other (prevent given constraints from not being satisfied). Assuming that only the reservation request shown in FIG. 54 is made when there are two VPUs 12 as shown in FIG. 55, the scheduling is performed such that the VPU 0 sequentially performs DEMUX, V-DEC, PROG and BLEND operations which cannot be done in parallel and after the DEMUX operation, the VPU1 performs the A-DEC and TEXT operations that can be done in parallel.

Software Pipeline

Figure 57:
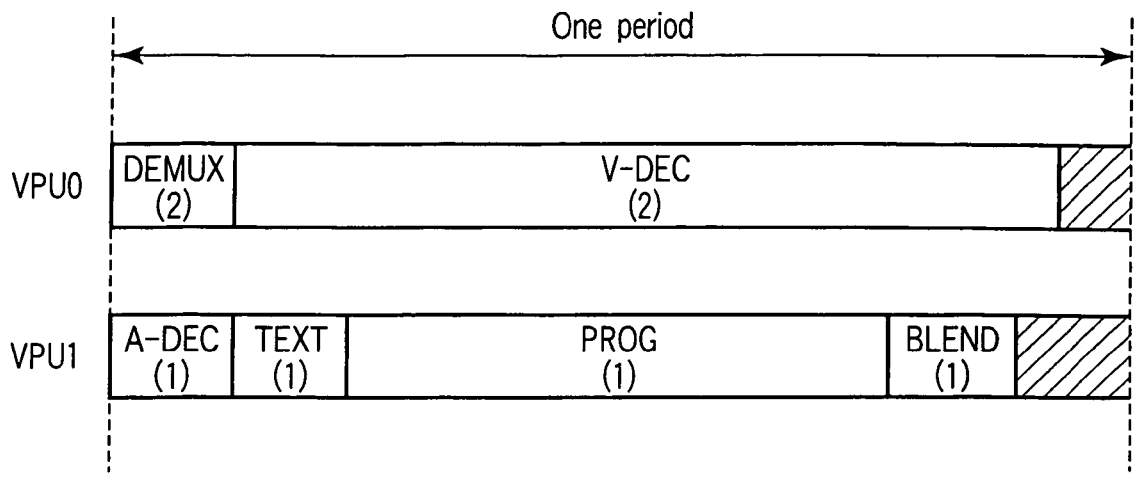
FIG. 57 is a chart illustrating a second example of scheduling of software pipeline type performed by the real-time processing system according to the embodiment of the present invention.

If there is no time enough to perform the DEMUX, V-DEC, PROG and BLEND operations in sequence within one period, software pipeline processing is carried out over a plurality of periods. For example, as shown in FIG. 56, the VPU 0 performs the DEMUX and V-DEC operations in the first period and the VPU 1 performs the A-DEC, TEXT, PROG and BLEND operations in the second period. In the second period, the VPU 0 performs DEMUX and V-DEC operations in the next frame in parallel with the A-DEC, TEXT, PROG and BLEND operations. In other words, as shown in FIG. 57, the pipeline processing is performed in which the VPU 1 performs the A-DEC, TEXT, PROG and BLEND operations upon receipt of outputs from the DEMUX and V-DEC operations in the preceding period while the VPU 0 is performing the DEMUX and V-DEC operations. Adopting the pipeline operation allows a real-time operation to be completed in each period in a shorter time.

Figure 58:
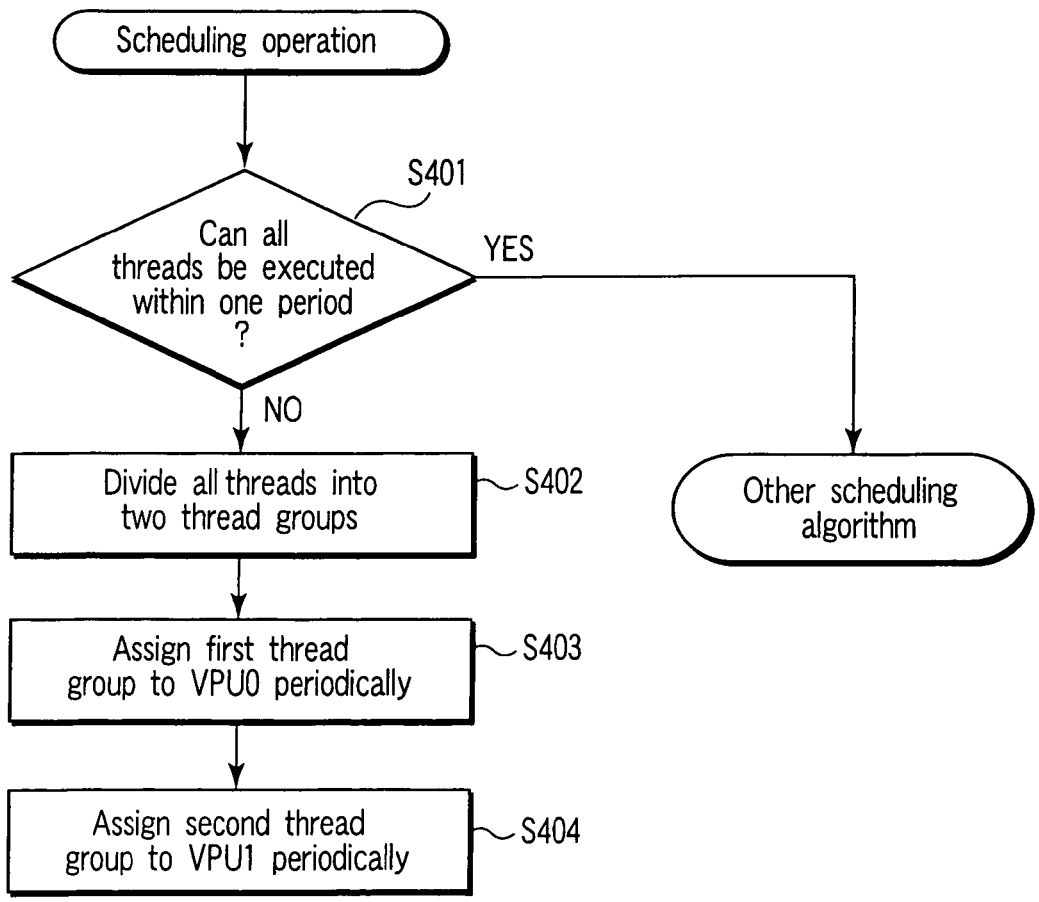
FIG. 58 is a flowchart of procedures for the scheduling of software pipeline type performed by the real-time processing system according to the embodiment of the present invention.

FIG. 58 is a flowchart of procedures for scheduling to achieve a software pipeline operation.

The VPU runtime environment 401 determines whether all of the threads DEMUX, V-DEC, PROG and BLEND, which need to be executed in sequence, can be done within one period (step 401). The length of one period is preset to the VPU runtime environment 401 as an execution condition of the program module 100. The length can be described explicitly in the structural description 117. In step S401, the total execution term of the threads DEMUX, V-DEC, PROG and BLEND is predicted based on the costs of these threads. The predicted total execution term is compared with the length of one period.

If the VPU runtime environment 401 determines that the threads DEMUX, V-DEC, PROG and BLEND cannot be executed within one period (NO in step S401), it divides all the threads DEMUX, V-DEC, A-DEC, TEXT, PROG and BLEND for executing the program module 100 into two groups (referred to as first and second thread groups hereinafter) that can be executed in sequence, based on the order of execution of the threads DEMUX, V-DEC, A-DEC, TEXT, PROG and BLEND (step S402). The first thread group is a set of one or more threads executed before the second thread group, and the second thread group is a set of one or more threads executed after the first thread group. In the present embodiment, the threads DEMUX and V-DEC belong to the first thread group and the threads A-DEC, TEXT, PROG and BLEND belong to the second thread group to satisfy the precedence constraints between the threads and make the total execution term of each of the groups not longer than the time interval corresponding to one period.

The VPU runtime environment 401 performs the scheduling operation to periodically assign the execution term of each of the threads belonging to the first thread group (DEMUX and V-DEC) to the VPU0 such that the VPU0 executes the first thread group periodically at time intervals of 1/60 second (step S403). In step S403, periodic execution of each of the threads DEMUX and V-DEC is reserved for the VPU0. Then, the VPU runtime environment 401 performs the scheduling operation to periodically assign each of the threads belonging to the second thread group (A-DEC, TEXT, PROG and BLEND) to the VPU1 such that the VPU1 executes the second thread group periodically at time intervals of 1/60 second with a one-period delay relative to the first thread group (step S404). In step S404, periodic execution of each of the threads A-DEC, TEXT, PROG and BLEND is reserved for the VPU1.

Two processors VPU0 and VPU1 execute the first thread group (DEMUX and V-DEC) and the second thread group (A-DEC, TEXT, PROG and BLEND) in pipeline mode. Consequently, the first thread group and the second thread group are executed in parallel while the second thread group is delayed one period relative to the first thread group, thus outputting frame data processing results for each period of 1/60 second.

Figure 59:
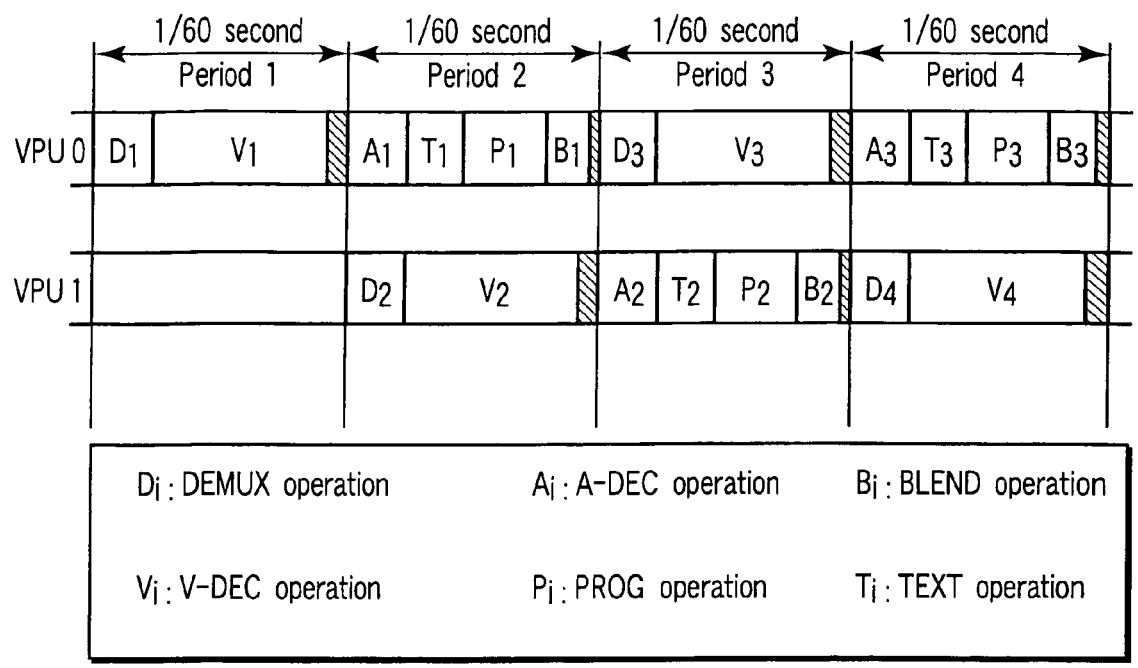
FIG. 59 is a chart illustrating a third example of scheduling of software pipeline type performed by the real-time processing system according to the embodiment of the present invention.

In the above example, the VPU0 always executes the first thread group (DEMUX and V-DEC) and the VPU1 always executes the second thread group (A-DEC, TEXT, PROG and BLEND). As shown in FIG. 59, however, scheduling can be carried out to periodically replace a processor to which the first thread group is assigned and a processor to which the second thread group is assigned. In the scheduling operation, execution start timing of each of the first and second thread groups and different processors for executing the first and second thread groups are determined for each period to execute the first and second thread groups in parallel on the processors while the second thread group is delayed by one period relative to the first thread group.

Power Saving Control Using Pipeline Operation

Using a pipeline operation as described above, real-time operations can efficiently be assigned to a plurality of VPUs to complete the real-time operations in each period in as short time as possible. It is thus possible to operate the VPUs at a lower operating speed.

FIG. 60 shows an example in which two programs for performing the digital broadcast receiving operation indicated by the reservation graph in FIG. 53 are executed by VPU0 and VPU1 at once. In FIG. 60, $D_{1-1}$, $V_{1-1}$, $P_{1-1}$, $A_{1-1}$, $T_{1-1}$ and $B_{1-1}$ represent threads DEMUX, V-DEC, PROG, A-DEC, TEXT and BLEND of period 1 in the first program, respectively, and $D_{2-1}$, $V_{2-1}$, $P_{2-1}$, $A_{2-1}$, $T_{2-1}$ and $B_{2-1}$ represent threads DEMUX, V-DEC, PROG, A-DEC, TEXT and BLEND of period 1 in the second program, respectively.

If there are four VPUs (VPU0, VPU1, VPU2 and VPU4), the threads DEMUX, V-DEC, PROG, A-DEC, TEXT and BLEND is scheduled on the four VPUs using the software pipeline operation such that the execution terms assigned to one period end as equally as possible, as shown in FIG. 61. In FIG. 61, two VPUs VPU0 and VPU1 execute the threads DEMUX and V-DEC in the first program and the one-period-old thread PROG, A-DEC, TEXT and BLEND in the first program in parallel. Further, two VPUs VPU2 and VPU3 execute the threads DEMUX and V-DEC in the second program and the one-period-old threads PROG, A-DEC, TEXT and BLEND in the second program in parallel. With such scheduling, none of the VPUs execute their corresponding threads in the latter half of every period. Using this spare time, all the VPUs can decrease in operating speed.

The control of the operating speed of each of VPU0, VPU1, VPU2 and VPU3 is performed by the following procedure. First, one of thread groups in which a time interval from the start of each period to the completion of the execution term in the period is the longest is selected based on both the execution start timing of each period of each of the thread groups determined by scheduling and information indicative of costs required for executing the thread groups by the VPU at the maximum (100%) operating speed. Then, a ratio of time interval T from the start of each period to the completion of the execution term of the selected thread group in each period to the time interval corresponding to one period is computed. Based on the computed ratio, the operating speed of each of VPUs used for the software pipeline is set to an operating speed that is lower than the maximum (100%) operating speed.

Reservation Graph Having a Hierarchical Structure

Though the reservation graph shown in FIG. 53 has no hierarchical structure, a reservation graph having a hierarchical structure can be used as shown in FIG. 63. In FIG. 63, the execution term A precedes the execution term B and the execution term B precedes the execution term C. In the execution term B, the execution term D precedes execution terms E and F. Resolving the hierarchy, the execution term A precedes the execution term D and the execution terms E and F precede the execution term C.

Reservation Request Made in Consideration of Tightly Coupled Thread Group

Figure 65:
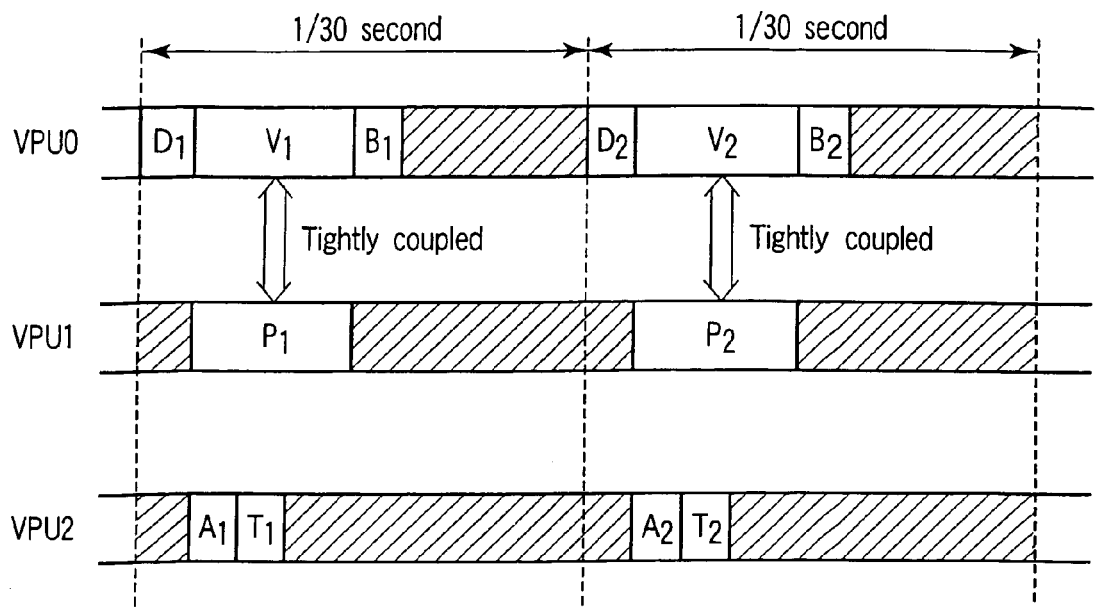
FIG. 65 is a chart showing an example of scheduling performed by the real-time processing system according to the embodiment of the present invention on the basis of the reservation request shown in FIG. 64.

In the reservation graph shown in FIG. 53, when a thread executing the V-DEC and a thread executing the PROG belong to the tightly coupled thread group, a reservation request indicative of the coupled attribute is created as shown in FIG. 64. In this reservation request, "TightlyCoupled" indicates an ID of the execution term corresponding to the partner thread. The above threads are therefore scheduled as shown in FIG. 65 such that they can be executed at once by different VPUs. In this case, the threads can communicate with each other via a local storage and thus no buffers need to be provided on the memory 14. In the scheduling shown in FIG. 65, a thread group of DEMUX, V-DEC and BLEND is completed the latest. The VPU0, VPU1 and VPU2 are therefore decreased in operating speed at the same rate such that the time interval from the start of each period to the completion of execution of the thread group of DEMUX, V-DEC and BLEND is lengthened to the time interval corresponding to one period. Thus, the execution terms of V-DEC and PROG in a tightly-coupled relationship coincide with each other.

Scheduling Algorithm Based on Structural Description

There now follows descriptions as to a procedure for reserving an execution term of each thread based on the structural description incorporated into the program module.

FIG. 8 shows an example of the structural description 117 incorporated in the program module 100 shown in FIG. 7. With the structural description 117, the VPU runtime environment 401 performs the following steps.

1. The programs that are written in the module field of the structural description 117 are loaded to generate threads that execute the programs. In the present embodiment, one thread is generated for each of entries of the structural description 117. If the structural description 117 includes entries having the same module name, a plurality of threads that execute the same module are generated so as to correspond to their respective entries. In the example of FIG. 8, all threads are generated to belong to one process; however, the threads can belong to different processes or thread groups can belong to different processes.

2. A reservation request having a data structure as shown in FIG. 54 is created based on the information of the structural description 117.

3. The reservation request is sent to the VPU runtime environment to schedule the threads and start to run the threads.

The above step 2 of creating the reservation request is performed as follows.

First, BUFFER records are created to correspond to the output fields of the structural description 117 in a one-to-one basis and added to the reservation request. For instance, in the example of FIG. 8, the second output data of the DEMUX module is supplied to the V-DEC through the 1-MB buffer, so that a BUFFER record whose Id is 2 as shown in FIG. 54 is created. In this BUFFER record, the buffer size is described as 1 MB in Size field, reference to TASK record whose Id is 1 and which corresponds to a DEMUX module that writes data to the buffer is described in SrcTask field, and reference to TASK record whose Id is 3 and which corresponds to a V-DEC module that reads data from the buffer is described in DstTask field.

Then, TASK records are created to correspond to the module fields of the structural description 117 on a one-to-one basis and added to the reservation request. For instance, in the example of FIG. 8, a TASK record whose Id is 3 as shown in FIG. 54 is created as one corresponding to the V-DEC module. This TASK record has the following information.

Class field: Flag to indicate what attribute is used to execute a thread designated in the TASK record.

In this field, "VPU" represents a thread that runs on the VPU and "HRT" shows a thread in the hard-real time class. These information items are set based on the information described in the thread parameters of the structural description 117 shown in FIG. 8.

ThreadContext field: Flag to designate a thread context of a thread whose running is to be reserved in the TASK record. More specifically, a program module designated in the module field of the structural description 117 is loaded, a thread that executes the program module is generated by the VPU runtime environment 401, and an identifier (a pointer or the like) of the thread context of the thread is recorded in the "ThreadContext" field.

Constraint field: Flag to record constraints of the TASK record. When the constraint is precedence constraint, a required number of Ids of another TASK record preceded by the TASK record is designated after the "Precede" field. For example, a TASK record whose Id is 3 precedes a TASK record corresponding to the PROG module whose Id is 5.

InputBuffer field: Flag to designate a required number of Ids of the Buffer record of a buffer from which data is read by the thread designated by the TASK record.

OutputBuffer field: Flag to designate a required number of Ids of the Buffer record of a buffer to which data is written by the thread designated by the TASK record.

If the structural description is provided as discussed above, its corresponding reservation request is created.

When the reservation request is sent to the scheduler in the VPU runtime environment 401, the scheduler creates a schedule necessary for performing the reservation request. This schedule represents which VPU is allocated to which thread with which timing and how long the VPU is allocated in a period as shown in FIG. 55. Actually, the schedule can be represented by a reservation list as shown in FIG. 66.

Figure 66:
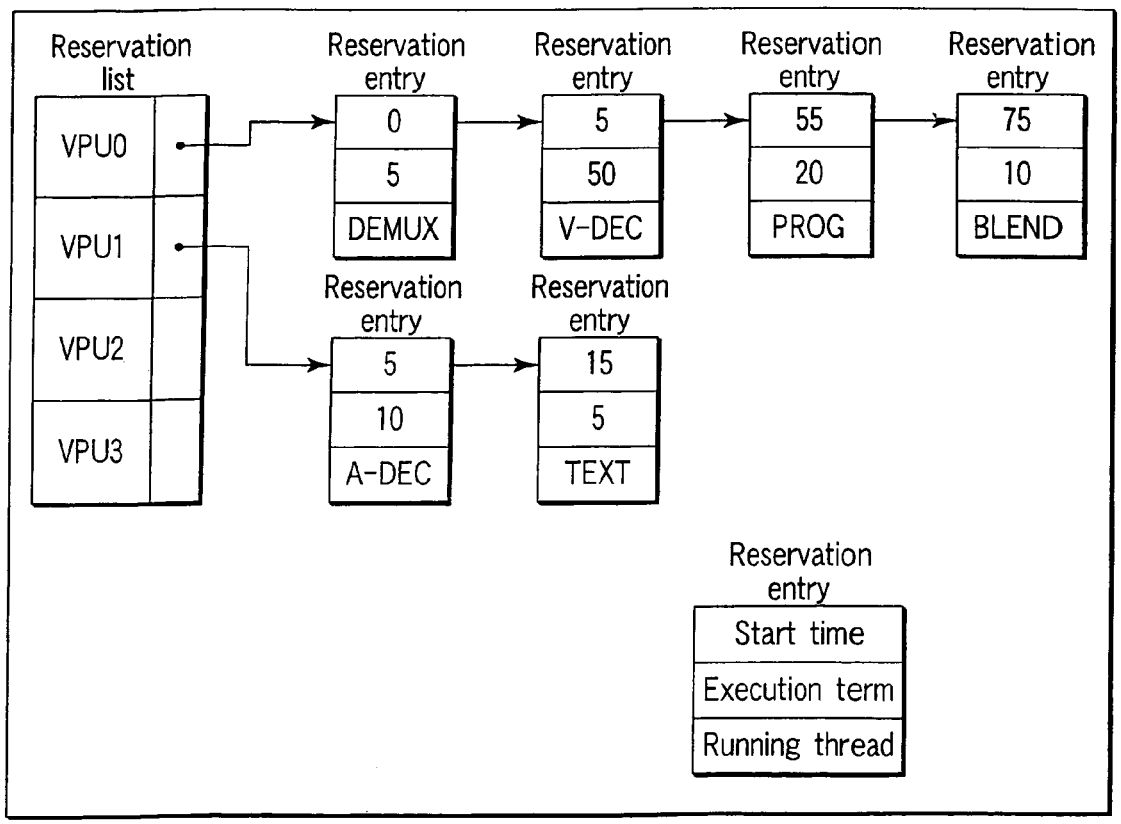
FIG. 66 is a diagram showing an example of a reservation list used in the real-time processing system according to the embodiment of the present invention.

The reservation list shown in FIG. 66 includes reservation entries related to the respective VPUs. Each of the reservation entries includes a start time field indicating when a thread is executed by VPU in each period (execution start timing of the thread), an execution term field indicating how long the VPU is allocated to the thread (execution term of the thread), and a running thread field indicating an identifier of the thread. The reservation entries are sorted in order of start time according to the VPUs and linked to the reservation list.

Figure 67:
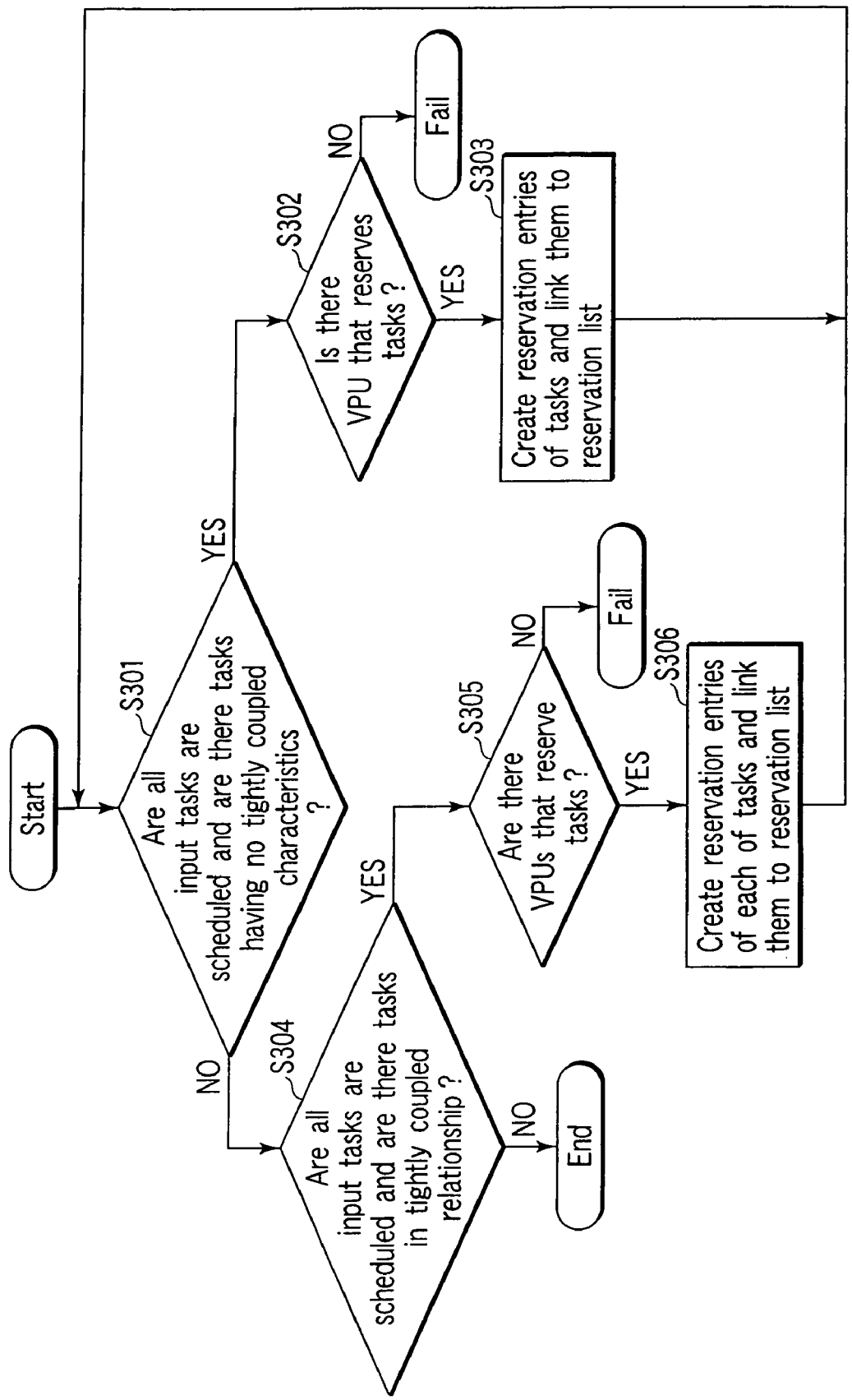
FIG. 67 is a flowchart showing a procedure for reserving an execution term in the real-time processing system according to the embodiment of the present invention.

The procedure for creating a reservation list as shown in FIG. 66 from the reservation request shown in FIG. 54 or FIG. 64 can be carried out by the flowchart shown in FIG. 67.

Basically, the TASK records in the reservation request have only to be sequenced in consideration of the relationship in input/output using BUFFER and the running time of VPUs has only to be assigned to each of the TASK records in the order of data flow. It is then necessary to simultaneously allocate the VPUs to the Tasks belonging to the tightly coupled thread group.

The procedure is shown in FIG. 67. Upon receiving a reservation request, the VPU runtime environment 401 schedules all the tasks designated by TASK records in the reservation request by the following steps (in other words, the VPU runtime environment 401 creates a reservation list for reserving a VPU to which each task is assigned and the execution start timing and execution term of the task).

Step S301: The VPU runtime environment 401 selects a task whose all of preceding tasks (input tasks) have been already scheduled, and which have no tightly coupled attributes, from among tasks that are not scheduled. If a task is preceded by no input tasks, it is determined as one whose input tasks have been already scheduled.

If there is a task whose input tasks have been already scheduled, and which have no tightly coupled attributes, the VPU runtime environment 401 selects it and moves to step S302. If not, it moves to step S304.

Step S302: If there is a VPU that can assign the execution start timing and execution term of the selected task under satisfactory constraints, the VPU runtime environment 401 moves to step S303. If not, the VPU runtime environment 401 fails in the scheduling and makes a notification of the fail.

Step S303: The VPU runtime environment 401 creates reservation entries of the selected task and links them to the reservation list.

Step S304: The VPU runtime environment 401 selects tasks whose all input tasks have been already scheduled, and that belong to a tightly coupled group, from among tasks that are not scheduled. If tasks are preceded by no input tasks, they are determined as ones whose input tasks have been already scheduled.

If there are tasks whose input tasks have been already scheduled, and which belong to the tightly coupled group, the VPU runtime environment 401 selects them and moves to step S305. If not, it ends scheduling.

Step S305: If there are VPUs that can reserve all tasks included in the selected tasks at once (to have the same execution start timing and the same execution term), the VPU runtime environment 401 moves to step S306. If not, the VPU runtime environment 401 fails in the scheduling and makes a notification of the fail.

Step S306: Reservation entries of all tasks of the selected set of tasks are created and linked to the reservation list.

The steps of scheduling for one reservation request has been described. Actually, a plurality of reservation requests are usually present at once in one system. In this case, the reservation requests can be scheduled through the above steps and, more favorably, they can be done simultaneously through the above steps.

The present embodiment has been described taking the program module describing the operations of a digital TV broadcast receiver as an example. If, however, a program module describing the operations of various types of hardware is prepared, the operations of hardware can be performed by software.

The MPU 11 and VPUs 12 provided in the computer system shown in FIG. 1 can be implemented as parallel processor mixed on one chip. In this case, too, the VPU running environment executed by the MPU 11 or the VPU running environment executed by a specific VPU or the like can control scheduling for the VPUs 12.

The software pipeline operation can be performed by three VPUs. A plurality of chained tasks for performing a real-time operation are divided into first to three task groups to be processed in sequence. Each of the task groups is periodically assigned to at least one of the VPUs such that the three VPUs periodically execute the three task groups in pipeline mode. If VPU1, VPU2 and VPU3 are used, the VPU0 periodically executes the first task group, the VPU1 periodically executes the second task group with a one-period delay relative to the first task group, and the VPU2 periodically executes the third task group with a one-period delay relative to the second task group. A task group whose execution is completed the latest in each period is selected from among the first to third task groups. The VPU0, VPU1 and VPU2 decrease in operating speed based on the ratio of the time interval from the start of each period to the completion of the execution term of the selected task group in the period to the time interval corresponding to one period.

A plurality of VPUs can execute the tasks of a task group in parallel. If a task group includes a plurality of tasks, a plurality of VPUs can execute the tasks in parallel.

If the programs running as the VPU running environment or the programs of the operating system including the VPU running environment are stored in a computer readable storage medium and then introduced and executed in a computer including a plurality of processors each having a local memory, the same advantages as those of the foregoing embodiment of the present invention can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of performing a real-time operation including a plurality of chained tasks periodically at specific time intervals using a plurality of processors, the method comprising:
   dividing the chained tasks into a plurality of task groups which are executable in parallel, the division based on a relationship among the tasks regarding an order of task execution;
   performing a scheduling operation of determining (i) execution start timing of each of the task groups in each time period of time periods corresponding to the specific time intervals and (ii) which processors will execute the respective task groups in said each time period to perform said plurality of task groups in parallel using the plurality of processors;
   selecting one of the task groups whose time interval from start of the each time period to completion of an execution time in the each time period is longest, based on the execution start timing of each of the task groups and cost information concerning a time required to execute each of the task groups by a corresponding one of the processors at a first operating speed;
   computing a ratio of the time interval corresponding to the selected one of the task groups to each of the specific time intervals; and
   performing an operating speed control operation of setting operating speeds of the processors which execute the task groups to a second operating speed that is lower than the first operating speed in order to decrease the operating speeds of the processors at the same rate.

2. The method according to claim 1, wherein performing the operating speed control operation includes determining the second operating speed based on the first operating speed and the computed ratio, the second operating speed being determined to meet conditions that execution of the selected one of the task groups in each of time periods corresponding to the specific time intervals is completed before a next one of the time periods starts.

3. The method according to claim 1, wherein performing the operating speed control operation includes controlling a frequency of a clock signal supplied to each of the processors to operate each of the processors at the second operating speed.

4. The method according to claim 1, wherein the dividing includes dividing the chained tasks into a first task group and a second task group based on a relationship among the tasks in order of task execution, the second task group being executed after the first task group, and performing the scheduling operation includes determining execution start timing of each of the first task group and the second task group in the each time period to periodically execute the first task group at the specific time intervals and periodically execute the second task group at the specific time intervals with a one-period delay relative to the first task group.

5. An information processing system which performs a real-time operation including a plurality of chained tasks periodically at specific time intervals, the system comprising:
   a plurality of processors;
   means for dividing the chained tasks into a plurality of task groups which are executable in parallel, the division based on a relationship among the tasks regarding an order of task execution;
   means for performing a scheduling operation of determining (i) execution start timing of each of the task groups in each time period of time periods corresponding to the specific time intervals and (ii) which processors will execute the respective task groups in said each time period to perform said plurality of task groups in parallel using the plurality of processors;
   means for selecting one of the task groups whose time interval from start of the each time period to completion of an execution time in the each time period is longest, based on the execution start timing of each of the task groups and cost information concerning a time required to execute each of the task groups by a corresponding one of the processors at a first operating speed;
   means for computing a ratio of the time interval corresponding to the selected one of the task groups to each of the specific time intervals; and
   means for performing an operating speed control operation of setting operating speeds of the processors which execute the task groups to a second operating speed that is lower than the first operating speed in order to decrease the operating speeds of the processors at the same rate.

6. The information processing system according to claim 5, wherein the means for performing the operating speed control operation includes means for determining the second operating speed based on the first operating speed and the computed ratio, the second operating speed being determined to meet conditions that execution of the selected one of the task groups in each of time periods corresponding to the specific time intervals is completed before a next one of the time periods starts.

7. The information processing system according to claim 5, wherein the means for performing the operating speed control operation includes means for controlling a frequency of a clock signal supplied to each of the processors to operate each of the processors at the second operating speed.

8. The information processing system according to claim 5, wherein the means for dividing includes means for dividing the chained tasks into a first task group and a second task group based on a relationship among the tasks in order of task execution, the second task group being executed after the first task group, and the means for performing the scheduling operation includes means for determining execution start timing of each of the first task group and the second task group in the each time period to periodically execute the first task group at the specific time intervals and periodically execute the second task group at the specific time intervals with a one-period delay relative to the first task group.

9. A computer-readable media having program code stored thereon, when the code is executed by a computer the computer performs a real-time operation including a plurality of chained tasks periodically at specific time intervals using a plurality of processors, the operation comprising:
   dividing the chained tasks into a plurality of task groups which are executable in parallel, the division based on a relationship among the tasks regarding an order of task execution;

performing a scheduling operation of determining (i) execution start timing of each of the task groups in each time period of time periods corresponding to the specific time intervals and time (ii) which processors will execute the respective task groups in said each time period to perform said plurality of task groups in parallel using the plurality of processors;

selecting one of the task groups whose time interval from start of the each time period to completion of an execution time in the each time period is longest, based on the execution start timing of each of the task groups and cost information concerning a time required to execute each of the task groups by a corresponding one of the processors at a first operating speed;

computing a ratio of the time interval corresponding to the selected one of the task groups to each of the specific time intervals; and performing an operating speed control operation of setting operating speeds of the processors which execute the task groups to a second operating speed that is lower than the first operating speed in order to decrease the operating speeds of the processors at the same rate.

10. The computer readable media according to claim 9, wherein the dividing step includes dividing the chained tasks into a first task group and a second task group based on a relationship among the tasks in order of task execution, the second task group being executed after the first task group, and the performing the scheduling operation step includes determining execution start timing of each of the first task group and the second task group in the each time period to periodically execute the first task group at the specific time intervals and periodically execute the second task group at the specific time intervals with a one-period delay relative to the first task group.

* * * * *